(12) United States Patent　(10) Patent No.: US 8,976,955 B2
Liberman Ben-Ami et al.　(45) Date of Patent: Mar. 10, 2015

(54) SYSTEM AND METHOD FOR TRACKING WEB INTERACTIONS WITH REAL TIME ANALYTICS

(75) Inventors: Hadas Liberman Ben-Ami, Kadima (IL); Leon Portman, Rishon Lezion (IL); Yuval Marco, Kadima (IL); Yosef Golan, Askhelon (IL); Shlomi Haba, Petah Tiqva (IL); Iftach Smith, Hod Hasharon (IL); Yizhar Ronen, Hod HaSharon (IL); Yohay Etsion, Tel Aviv (IL); Igor Cher, Rehovot (IL); Naama Damty, Zichron-Yackov (IL); Assaf Frenkel, Ramat HaSharon (IL); Uzi Baruch, Maale Adumim (IL)

(73) Assignee: Nice-Systems Ltd., Ra'anana (IL)

( * ) Notice: Subject to any disclaimer, the term of this patent is extended or adjusted under 35 U.S.C. 154(b) by 173 days.

(21) Appl. No.: 13/305,279

(22) Filed: Nov. 28, 2011

(65) Prior Publication Data

US 2013/0136253 A1　May 30, 2013

(51) Int. Cl.
*H04M 3/00*　(2006.01)
*H04M 5/00*　(2006.01)

(52) U.S. Cl.
USPC ................ 379/265.09; 379/265.01; 709/224

(58) Field of Classification Search
USPC ........ 379/265.09, 242, 265.01; 709/224, 225; 706/60; 705/10
See application file for complete search history.

(56) References Cited

U.S. PATENT DOCUMENTS

| | | | |
|---|---|---|---|
| 5,535,256 A | 7/1996 | Maloney et al. | |
| 6,346,952 B1 | 2/2002 | Shtivelman | |
| 6,721,416 B1 | 4/2004 | Farrell | |
| 6,741,697 B2 | 5/2004 | Benson et al. | |
| 6,748,072 B1 | 6/2004 | McGraw et al. | |
| 6,904,143 B1 | 6/2005 | Peterson et al. | |
| 6,922,466 B1 | 7/2005 | Peterson et al. | |
| 6,922,689 B2 | 7/2005 | Shtivelman | |
| 6,959,078 B1 | 10/2005 | Eilbacher et al. | |
| 6,970,554 B1 | 11/2005 | Peterson et al. | |
| 6,981,040 B1 | 12/2005 | Konig et al. | |
| 7,035,926 B1 * | 4/2006 | Cohen et al. | ................. 709/225 |
| 7,165,105 B2 | 1/2007 | Reiner et al. | |
| 7,200,614 B2 | 4/2007 | Reid et al. | |
| 7,246,078 B2 | 7/2007 | Vincent | |
| 7,370,004 B1 | 5/2008 | Patel et al. | |
| 7,616,756 B2 | 11/2009 | Blackwood et al. | |
| 7,644,134 B2 | 1/2010 | Cohen et al. | |
| 7,844,504 B1 | 11/2010 | Flockhart et al. | |
| 7,853,800 B2 | 12/2010 | Watson et al. | |
| 7,949,574 B2 | 5/2011 | Patel et al. | |
| 7,958,234 B2 * | 6/2011 | Thomas et al. | ............... 709/224 |
| 7,962,551 B2 | 6/2011 | Mukundan et al. | |
| 7,962,616 B2 | 6/2011 | Kupferman et al. | |
| 8,271,332 B2 | 9/2012 | Mesaros | |
| 8,326,694 B2 | 12/2012 | Patel et al. | |

(Continued)

*Primary Examiner* — Thjuan K Addy

(74) *Attorney, Agent, or Firm* — Pearl Cohen Zedek Latzer Baratz LLP

(57) ABSTRACT

A device, system and method is provided for monitoring a user's interactions with Internet-based programs or documents. Content may be extracted from Internet server traffic according to predefined rules. Extracted content may be associated with a user's Internet interaction. The user's Internet interaction may be stored and indexed. The user's Internet interaction may be analyzed to generate a recommendation provided to a contact center agent while the contact center agent is communicating with said user for guiding the user's interaction, for example, in real-time. Traffic other than Internet server traffic may also be used.

29 Claims, 55 Drawing Sheets

(56) References Cited

U.S. PATENT DOCUMENTS

| | | |
|---|---|---|
| 8,352,396 B2 | 1/2013 | Forman et al. |
| 8,396,834 B2 | 3/2013 | Bahadori et al. |
| 8,408,061 B2 | 4/2013 | Thomas |
| 2002/0083167 A1* | 6/2002 | Costigan et al. ............... 709/224 |
| 2002/0087385 A1* | 7/2002 | Vincent ........................... 705/10 |
| 2007/0208682 A1* | 9/2007 | Mancisidor et al. ............ 706/60 |
| 2011/0184905 A1 | 7/2011 | Phillips et al. |
| 2012/0195422 A1 | 8/2012 | Famous |
| 2012/0303598 A1 | 11/2012 | Newnham et al. |
| 2012/0303621 A1 | 11/2012 | Newnham et al. |
| 2013/0024405 A1 | 1/2013 | Newnham et al. |
| 2013/0080358 A1 | 3/2013 | Newnham et al. |
| 2013/0080377 A1 | 3/2013 | Newnham et al. |
| 2013/0110750 A1 | 5/2013 | Newnham et al. |

* cited by examiner

| My Universe | Business Analyzer | Reporter | Monitor | Insight Manager | Clear Sight | PBO Requests | ToolBox |
|---|---|---|---|---|---|---|---|

1400

Scheduler Rules

| | Group By: None ▽ | | | | New ✓ x ⋮ |
|---|---|---|---|---|---|
| Scoring | Rule Name | Description | Activation | Last Updated... | Last Updated Ti... |
| Classification | New Negative Recoding Plan | | | | |
| Scheduler | New Quality Time Interval Recording Plan | | | | |
| Storage | New Quality Recording Plan | | | | |
| | New Selective Recording Plan | | | | |

FIG. 14A

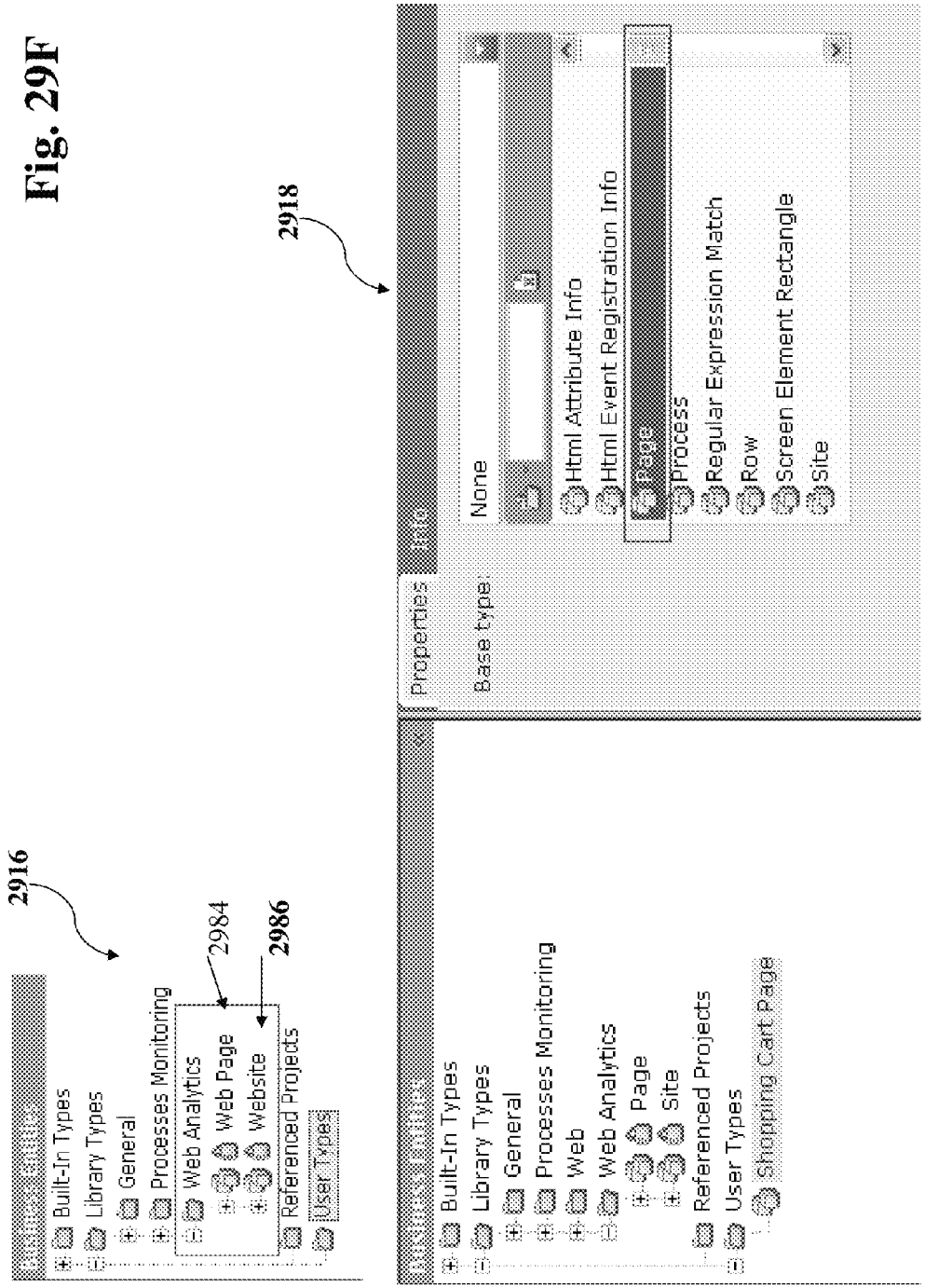

Fig. 29V

SYSTEM AND METHOD FOR TRACKING WEB INTERACTIONS WITH REAL TIME ANALYTICS

FIELD OF THE INVENTION

Embodiments of the invention relate to systems and methods for web or Internet traffic capture using passive sniffing, configuration and web elements capture, web elements extraction and analysis, session management, customer resolving, web content viewing and client notification based on the customer's web browsing.

BACKGROUND OF THE INVENTION

Company call centers or online support forums put customers in contact with company agents for customer service, for example, to provide technical support, sell products or schedule appointments. Customers are typically ordered in a queue and served on a first come first serve basis. Each customer is typically teamed up with or connected with the next available agent from a pool of agents in order to optimize service and provide the fastest agent response time. However, the customer may be matched with a new agent each time the customer contacts a support center. Such variation in agents may be frustrating for customers who may have to repeat information for each new agent and may also be inefficient for the agents who may have to be updated on issues already resolved by previous agents.

Further variability may be introduced when customers use multiple different channels of communication, such as the Internet and call centers, for customer service. For example, customers often shop online (using one channel of communication to research products), but buy over the phone (using another channel of communication to purchase products). However, if a customer contacts a call center after extensive Internet research, for example, to make a final purchase over the telephone, the call center agent has no information about the customer's Internet sessions. That is, agents contacted via one channel may have no way to track a customer's history across another channel. Therefore, agents remain uninformed or depend on the customer to report their history, a slow and unreliable process.

SUMMARY OF THE INVENTION

A device, system and method is provided for monitoring a user's interactions with Internet-based programs or documents. Content may be extracted from Internet server traffic according to predefined rules. Extracted content may be associated with a user's Internet interaction. The user's Internet interaction may be stored and indexed. The user's Internet interaction may be analyzed to generate a recommendation provided to a contact center agent while the contact center agent is communicating with said user, e.g., in real-time, for guiding the user's Internet interaction. Traffic other than Internet server traffic may also be used.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 14A-14C schematically illustrate interfaces for configuring a rule scheduler in accordance with an embodiment of the invention;

Figure 1:
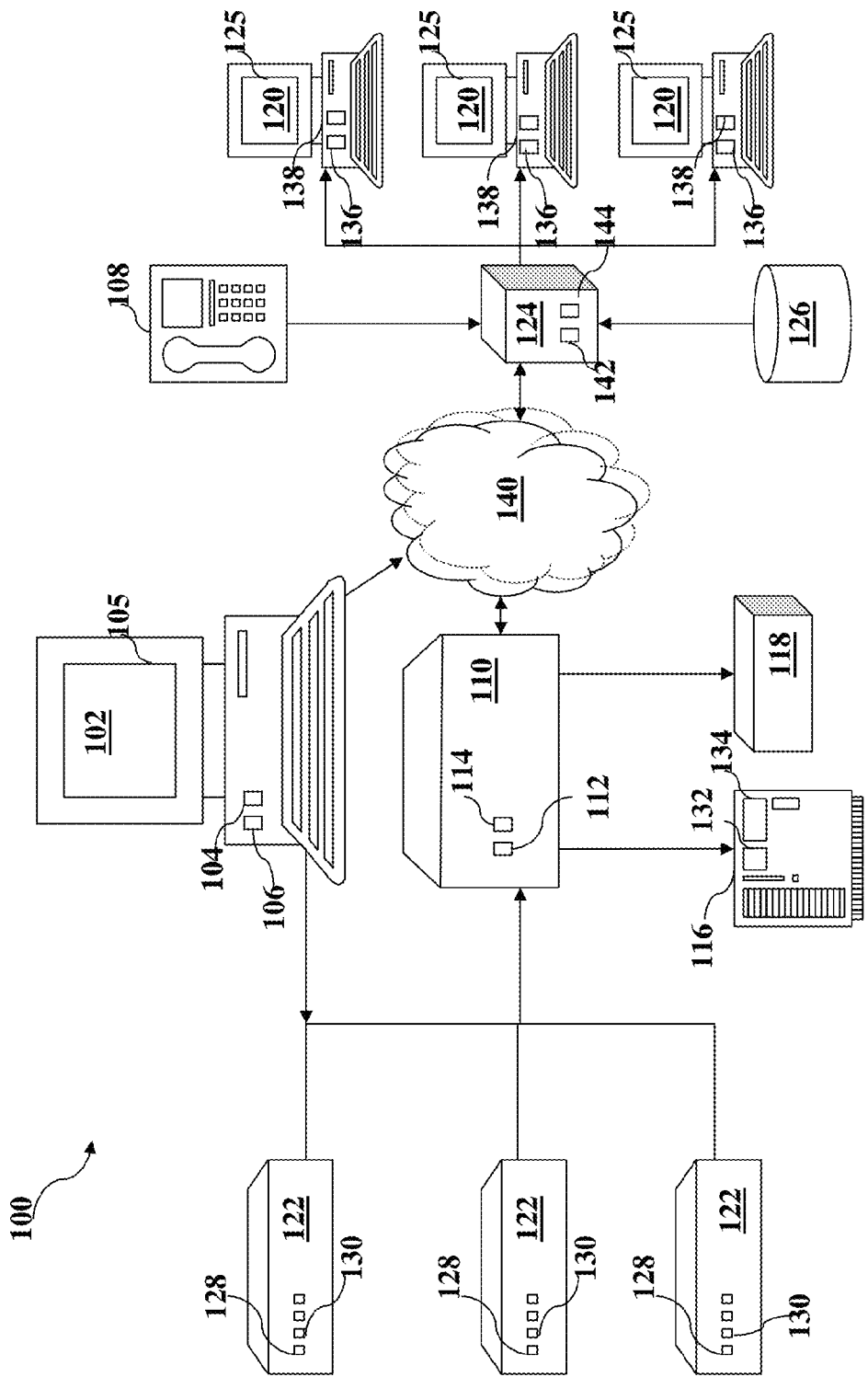
FIG. 1 schematically illustrates a system for monitoring a user's web or cross-channel interactions in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, a telephone call may include devices and networks beyond the "plain old telephone system" (POTS), such as VOIP telephone calls using personal computers. "Calling" in the context of a person taking action may including using a traditional telephone or other device such as a VOIP telephone, cellular telephone, or other device, to speak with another person. Further, embodiments of the invention may allow for a user to contact an agent via other methods, such as on-line chat. "Calling" in the context of a process or processor taking action may mean, for example, executing a software process, requesting a software process perform some function or return some result, etc.

Overview

Embodiments of the invention provide a system and method for tracking and analyzing interactions of each customer over the World Wide Web ("web") including the Internet and/or an Intranet (when used herein, the web may be used interchangeably with the Internet and/or Intranet, as web is a system of interlinked hypertext documents accessed via the Internet and/or Intranet). For example, each time a user or customer interacts with the web or Internet, for example, selecting a search term, "browsing" or accessing a webpage, viewing a product description via the Internet, etc., such interactions may be recorded. Data may be extracted from each web interaction, for example, according to, matching or corresponding to a set of predefined parameters, features or rules for tracking web interactions, such as, the amount of time a webpage was viewed, a number of times or which different items are selected on a webpage, the order in which the webpage was viewed, the number of repeated viewings over a time span, the presence or frequency of certain keywords, etc. The predefined extracted features may be fixed or designed by a company support team or process optimization (PO) designer and may be adapted on a session-by-session basis. Capturing and extracting web content features may be executed using a passive or server-side web browser sniffer or capture device. A user's interaction with the web or with the Internet may include remote access of web documents, interaction with remote programs via the Internet, interaction with other users or institutions via interaction with remote programs via the Internet, etc.

Embodiments of the invention may analyze interactions and extract web content for each customer or user to build one or more session summaries. A session may include a series of interactions executed by a customer, for example, ending when the customer logs off, closes the browser used for viewing, completes a transaction, or finishes viewing a document. A session may end, for example, after a predetermined session duration of time, after customer inactivity for a predetermined time, or after a maximum number of interactions. Embodiments of the invention provide a session summary which may include, for example, a description of the customer's interactions including title of webpage(s), webpage universal resource locator (URL), date/time webpage(s) created, product(s) viewed, prices offered, product categories (used vs. new, wholesale vs. retail, etc.), customer search words, customer highlighting or selection of products, etc.

Customer interactions may be tracked using "cross-channel" analysis, e.g., across multiple channels of communication. For example, a web summary of a user's online (e.g., Internet or web) session may be retrieved upon receipt of an incoming call from the same user or when initiating a call session to the same user. Similarly, a call summary of a user's call center session may be retrieved upon the user initiating an online customer service session. In general, an agent providing support to a user may retrieve summaries for all sessions across all communication channels or a subset of a session, for example, within a specified time period, conducted over specific communication channels (such as, only web interactions or only call center interactions), relevant to the current session topic (such as, including key-words in the extracted data that match key-words of the current session), etc. Web browsing on a user's private computer may be captured or recorded by using passive sniffing devices, probes or other capturing modules. The capturing modules may be initiated automatically or after gaining permission from the user. The agent or the support program designer may select which session summaries to review. In some embodiments, a list of session summaries may be provided for selection to an agent that may be ordered according to session relevance, for example, based on the frequency and/or number of matching key-words in the session compared to the current session.

In some embodiments, each live agent may be provided with an automated agent, for example, to prompt the live agent with dialogue, strategies to resolve issues, and other instructions or recommendations for interacting with a user. The automated agent recommendations may be based on the user's cumulative single-channel or cross-channel web and/or call center history. Such embodiments may provide a semi-live/semi-automated agent by providing the live agent with automated tasks. The automated information may include, not only the current customer's history, but also one or more corresponding ideal session histories or summaries for comparison, for example, to predict optimal future session paths to recommend to the customer. The ideal histories may be based on real-life session summaries generated by other satisfied customers or may be modeled sessions generated in a computer-training environment by a computer programmer or trainer. The ideal session histories may be retrieved from a pool of session histories that most closely matches the topics, key-works and/or other features used in the current customer's session. The ideal session histories may be fixed, e.g., including a linear path of webpages to browse, or dynamic, e.g., including tree-structured or matrix paths, where each chosen webpage path leads to different options, and thus different outcomes.

Customer interactions may be tracked in real-time, for example, while the contact center agent is communicating with the user or during or concurrently with the customer interactions or at a small time delay thereafter (e.g., on the order or a few second or milliseconds).

Agents may include real-life interactive personnel, automated computer agents, avatars, voice or text prompts, etc., or a combination semi-live/semi-automated agent. In one embodiment, an automated agent may track a user's session in real-time and/or provide recommendations, for example, from a recommendations database, that may be linked to conditions detected in the user's session. The recommendations may be sent to the agent in real-time or while the contact center agent is communicating with the user, for example, using a telephone, Internet or other user-agent connection. In another embodiment, an automated agent may use one or more ideal session histories, where for each customer webpage interaction, the automated agent may recommend or re-direct (upon user verification) the customer to the next optimal predicted webpage or interaction defined by the ideal session histories.

Embodiments of the invention provides systems and methods for "recording" or tracking customer-specific and/or session-specific web activity, for example, by capturing Hypertext Markup Language (HTML) web traffic data (e.g., representing user interactions across the Internet with remote documents or programs), extracting information from the data, and filtering, extracting or saving relevant information for analysis and playback. The data may describe the cross-channel customer behavior of the customer and may be used to discern the behavior of customer groups across the different channels in order to optimize channel usage. The analyzed data for a customer may be provided to an agent serving or communicating with the customer. The agent may be connected to the customer via for example a telephone call center (which may include a telephone call via a computer) and may receive the customer's web session data. In some embodiments, the customer's web session data may define the customer's past web interactions. The agent may receive a real-time guidance message (e.g., generated by a PO Client), notifying the agent that the customer has interacted with the web server in the past. The real-time guidance message may offer up-sell or cross-sell options, for example, according to the analysis of the web interaction and business rules in a recommendations database. The real-time guidance message may also offer to play back past web interaction. In some embodiments, the customer's web session data may define the customer's current or ongoing web interactions. For example, a customer interacting with an agent may have been or may begin interacting with a web server, for example, with or without the agent's knowledge or according to the agent's instructions. The agent may receive a real-time guidance message (e.g., generated by the PO Client), notifying the agent that the customer is interacting with the web server. The real-time guidance message may offer to "shadow browse" the customer, for example, simulating the customer's web session for the agent to view. Embodiments of the invention may be used for technical support, selling, "up-selling" or "cross-selling," filling in surveys, etc., although other applications may be used.

System Configuration

Reference is made to FIG. 1, which schematically illustrates a system 100 for monitoring a user's web or cross-channel interactions in accordance with an embodiment of the invention.

System 100 may include one or more user computers 102 for interacting over the web (e.g. via the Internet), one or more web servers 122 for hosting or distributing information over the web (e.g. via the Internet), one or more web capture servers 110, analysis servers 116 and/or storage centers 118 for monitoring user's interactions with Internet-based programs or documents. System 100 may also include one or more additional user devices 108, such as telephone, SMS message or text enabled devices, for the user to interact over another network, such as, a telephone or messaging network. User computers 102 may include for example web browsing software to enable a user to access remote websites via the Internet.

User computer 102, e.g., controlled by a user, may access documents, websites and web pages provided by web servers 122 via a network 140, such as the web or Internet. Web servers 122 may include applications for retrieving and viewing web content on user computer 102. In one embodiment, the user may be a customer browsing webpages, which are supported by web servers 122. Web capture servers 110 may record, copy, or capture user traffic on web servers 122, for example, using a passive sniffing device or other device (e.g., probe 410 of FIG. 4). An interactions center 124 may be responsible for recording and managing rules, monitoring and scheduling telephone or web-connections and populating a database 126 with user interaction data. Interactions center 124 may be installed on a dedicated server. In one embodiment, analysis server 116 and interactions center 124 may be installed on the same server.

A client installed on agent device 120 (e.g., PO client 420 of FIG. 4) may identify "interesting" or significant content, interactions or information exchanged with Internet accessible programs, documents or webpages from the captured traffic that satisfies, corresponds to or matches predefined rules or criteria. Interesting content may be defined (e.g., by a client at agent device 120, such as, PO client 420 of FIG. 4), for example, as content or information which conforms to or passes certain rules or criteria, is matched to certain patterns, or by other criteria. For example, the rules or criteria may define the web elements to be extracted and/or the webpages or websites from which the data elements may be extracted. In one embodiment, the rules or criteria may be generated by an agent or system designer (e.g., using a PO designer, such as, PO designer 1706 of FIG. 17), and may be uploaded via the agent client to analysis servers 116 to extract the data elements from the web traffic according to those rules.

The client at agent device 120 may request the interesting information, for example, including information from closed (past) web sessions from database 126 (e.g., via server 424 of FIG. 4) and information from open (ongoing) web sessions from analysis server 116.

Analysis server 116 may extract metadata, embedded tags, URLs or other information attached to recorded, copied, or captured webpages or websites for ongoing or current web sessions. Analysis server 116 may identify which user executed those interactions and may attach user profile data, user identification codes or other user-related data to the extracted or saved interaction content or documents. In this manner or other manners content or interactions may be associated with or linked to a user or customer. Analysis server 116 may compile or assemble each user's associated content to generate a summary of the user's web-interaction history, for example, which may be sent in real-time to the agent client. Analysis server 116 may analyze, edit, and index the extracted or saved interaction content, for example, to create an organized and uniform repository of user histories, e.g., in database 126, that may be easily accessed by customer service agents. In some embodiments, analysis server 116 may assign indicators or categories to interactions, for example, such as, the user that executes the interaction, topics or keywords in the interaction (e.g., product X, service Y, financial/billing issues, etc.), the channel of communication for the interaction (e.g., web, telephone, messaging, in person, etc.) and/or the time of the interaction (e.g., the exact time of the interaction, if the interaction occurred in the past hour/day/month/year, the time difference since the previous interaction for the same topic, etc.). Analysis server 116 may determine which user interactions are relevant to the current issue by matching their identifiers to relevancy criteria received from the agent client. For example, analysis server 116 may retrieve all interactions for a specific user, on a specific topic, in any communication channel within the past hour. The relevancy criterion for selecting interactions may be predefined, statistically computed to generate a predetermined number of interactions or "hits," or selected by the agent.

Users may be connected via user computers 102 (for web connections) and/or user devices 108 (for other network connections) with live or automated agents at agent devices 120. Agents may provide users with customer support, conduct transactions for purchasing products or services, fill out surveys, or provide other products or services. Agent devices 120 may be connected to database 126 storing information related to users' interaction histories over the web and/or other networks. When an agent is connected to a user, the agent may automatically or, after sending a request, gain access to the user's interaction history. Database 126 may also store recommendations for users. Agent devices 120 may automatically retrieve the recommendations from database 126 having a predefined correlation with the user with which the agent is currently communicating. The recommendations may be communicated automatically while the agent is communicating with the user, for example, via an automated agent or to prompt a live agent to manually communicate the recommendations to the user. Agents may be guided through user interactions and prompted with recommendations or scripts, for example, to standardize and optimize agent support.

In some embodiments, agent devices 120 may "shadow-browse" a user computer, for example, providing agent devices 120 with real-time playback of user computer 102 interactions so that the agent may monitor or guide user interactions in real time. The playback may include a simulated screen-shot of user computer 102, a table or control panel listing interaction details, such as, URLs, product descriptions, user commands, etc., and/or a user interaction summary. In some embodiments, analysis server 116 may provide "channel containment" analysis, for example, describing the reasons that users switch from one communication channel (e.g., Internet) to another (e.g., telephone). Channel containment analysis may allow a company to use the identified problems in each channel to improve customer support (e.g., by re-designing web pages, providing more information on each channel) to keep more customers in their original channel (e.g., Internet). Analysis server 116 and/or interactions center 124 may track end-to-end first contact resolution, for example, to determine if a user's problem or issue is resolved completely (from end-to-end) within a first contact with an agent device 120, or if the user does not resolve their issue or is transferred or re-connected multiple times to one or more support channels to resolve their issue. Analysis server 116 may provide "churn prediction," for example, where by analyzing one or more (e.g., Internet or cellular telephone) interactions, the center may predict whether or not a company or service provider is at risk of losing its customer.

User computer 102 and agent device 120 may be personal computers, desktop computers, mobile computers, laptop computers, and notebook computers or any other suitable device such as a cellular telephone, personal digital assistant (PDA), video game console, etc., and may include wired or wireless connections or modems. Although user computer 102 and agent device 120 are described to be computer devices with a web connection, they may alternatively be telephone or messaging devices or a combination of telephone, messaging and/or computer, for example, so that the agent and user may interact via multiple communication networks. User computer 102 and agent device 120 may include one or more input devices, for receiving input from a user or agent (e.g., via a pointing device, click-wheel or mouse, keys, touch screen, recorder/microphone, other input components) and output devices 105 and 125 (e.g., a monitor or screen) for displaying data to a user and agent, respectively.

User computer 102, web capture server 110, analysis server 116, agent device 120 web servers 122 and interactions center 124, may each include one or more controller(s) or processor(s) 106, 112, 132, 136, 128, and 142, respectively, for executing operations and one or more memory unit(s) 104, 114, 134, 138, 130 and 144, respectively, for storing data and/or instructions (e.g., software) executable by a processor. Processor(s) 106, 112, 132, 128, 136 and 142 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 104, 114, 134, 138, 130 and 144 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Web capture server 110, analysis server 116, storage centers 118, agent device 120, and interactions center 124, may each be, for example, software executed on one or more processors, and while this software may be in one processing device or server, it is not necessarily executed by the same processor or within the same computing device.

Agent Interface

Figure 2:
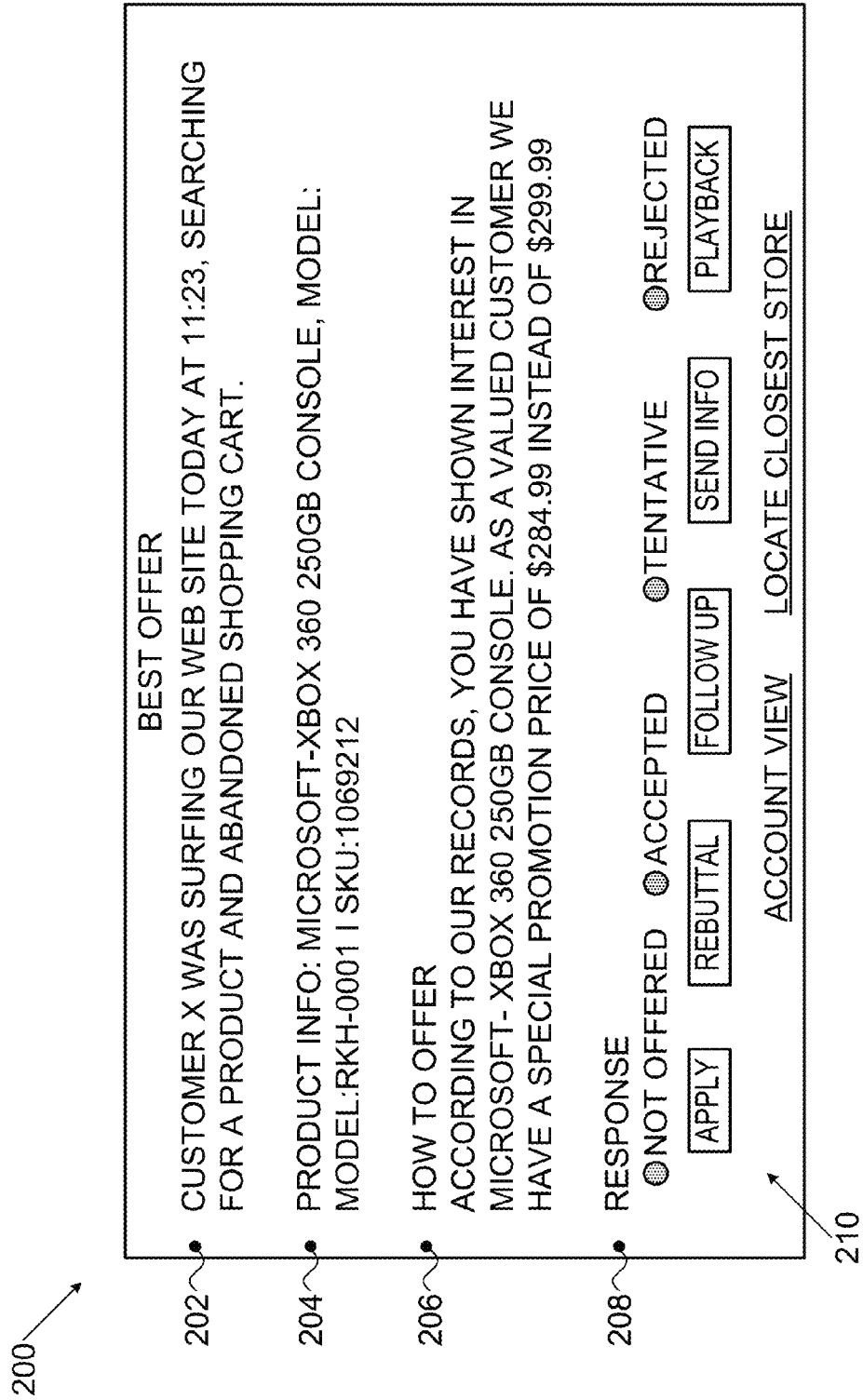
FIG. 2 schematically illustrates an interface provided to a customer agent in accordance with an embodiment of the invention.

Reference is made to FIG. 2, which schematically illustrates an interface 200 provided to a customer agent in accordance with an embodiment of the invention.

Interface 200 may be a prompt or an "automated agent" provided to a live agent via a device (e.g., agent device 120 FIG. 1). Interface 200 may display a summary 202 of a history of a current customer's one or more relevant or interesting web or cross-channel interactions. Relevant or interesting interactions may be determined by rule matching or matching identifiers, in which the interactions are selected that are assigned identifiers (e.g., topic, time, product, etc.) that match identifiers associated with the current interaction or that match key-words entered by the agent. The summary of the customer's interactions may include a description of the customer activity and/or details 204 of the matching interaction, for example, product or service details. Interface 200 may also display one or more recommendation(s) 206 for the agent to communicate with the user, for example, to provide technical support, offer deals, or up-sell the same or similar product or service. Interface 200 may also include a customer response field 208 to register the customer's response to the agent recommendations. Interface 200 may update the recommendations based on the customer response, for example, automatically or when requested by the agent, to provide alternative recommendations if the response was negative or similar recommendations if the response was positive (or tentative). Interface 200 may include agent options 210, such as, "rebuttal" to retrieve an automated rebuttal to customer inquiries, "follow-up" to register a follow-up interaction with the customer to reiterate the current interaction or sale offer, "send Info" to automatically send sale or interaction details to the user at a registered contact point (e.g., via email, text or telephone) or "playback" to play the customer's current or previous relevant web interaction for the agent. Other fields and interfaces may be displayed.

Interface 200 may be displayed to an agent, for example, as a dedicated window, an embedded window (e.g., using a customer relationship management (CRM) system), a pop-up window, a webpage, an application page, and/or any combination or variation thereof.

Cross-Channel Workflow

Figure 3:
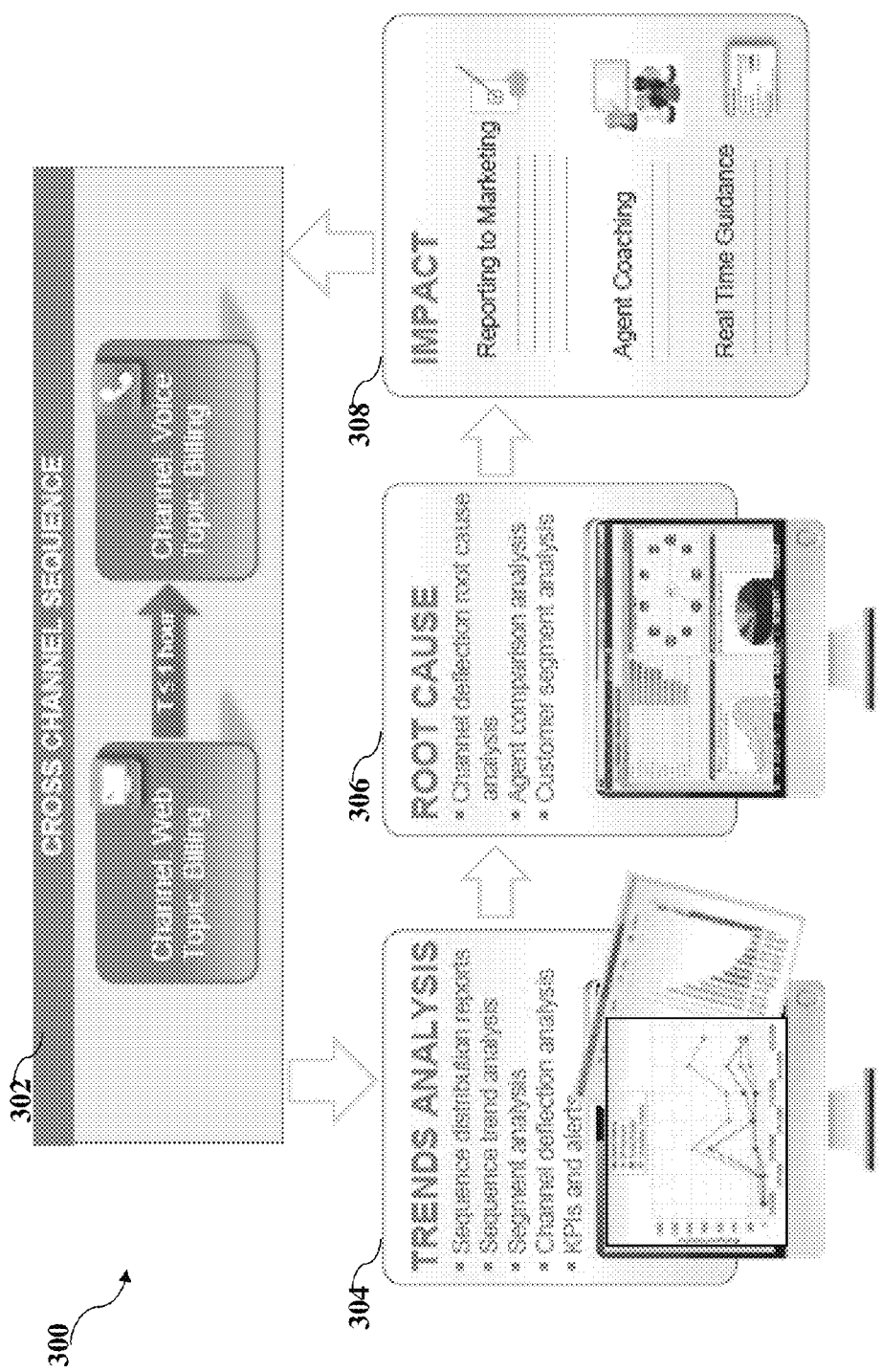
FIG. 3 schematically illustrates a cross-channel analytics workflow in accordance with an embodiment of the invention.

Reference is made to FIG. 3, which schematically illustrates a cross-channel analytics workflow 300 in accordance with an embodiment of the invention. Workflow 300 may be executed at interactions center 124 (to manage rules for monitoring agent-user interactions), analysis server 116 (to extract the data according to the rules), a PO client (to enable real-time guidance) of FIG. 1. Workflow 300 may include cross-channel sequencing 302, trend analysis 304, root cause analysis 306 and/or impact reporting 308.

Cross-channel sequencing 302 may sequence or index customer cross-channel interactions, for example, according to topics, key-words, communication channel, time, etc., to create an organized and uniform database of customer interactions that may be easily searched to detect relevant interactions.

Trend analysis 304 may include generating sequence distribution reports, sequence trend analysis, segment analysis, channel deflection analysis, key performance indicators (KPIs) and/or alerts.

Root cause analysis 306 may identify a probable root cause of channel-deflection, in which the user switches from one communication channel to another, for example, calling a contact center after viewing the company web site. Root cause analysis 306 may also include agent comparison analysis and/or customer segment analysis.

Impact reporting 308 may include automatically generating marketing, business or technology reports, coaching agents by providing immediate automated tips or by providing follow-up training sessions specifically targeted to improve the agent's areas of weakness, and real-time guidance by providing a real-time prompt or recommendations to agents while they serve or communicate with a customer (e.g., via interface 200 of FIG. 2).

Trend analysis 304, root cause analysis 306, and impact reporting 308 may each be, for example, software executed on one or more processors, which may or may not be located in the same computing device.

System Components

Figure 4:
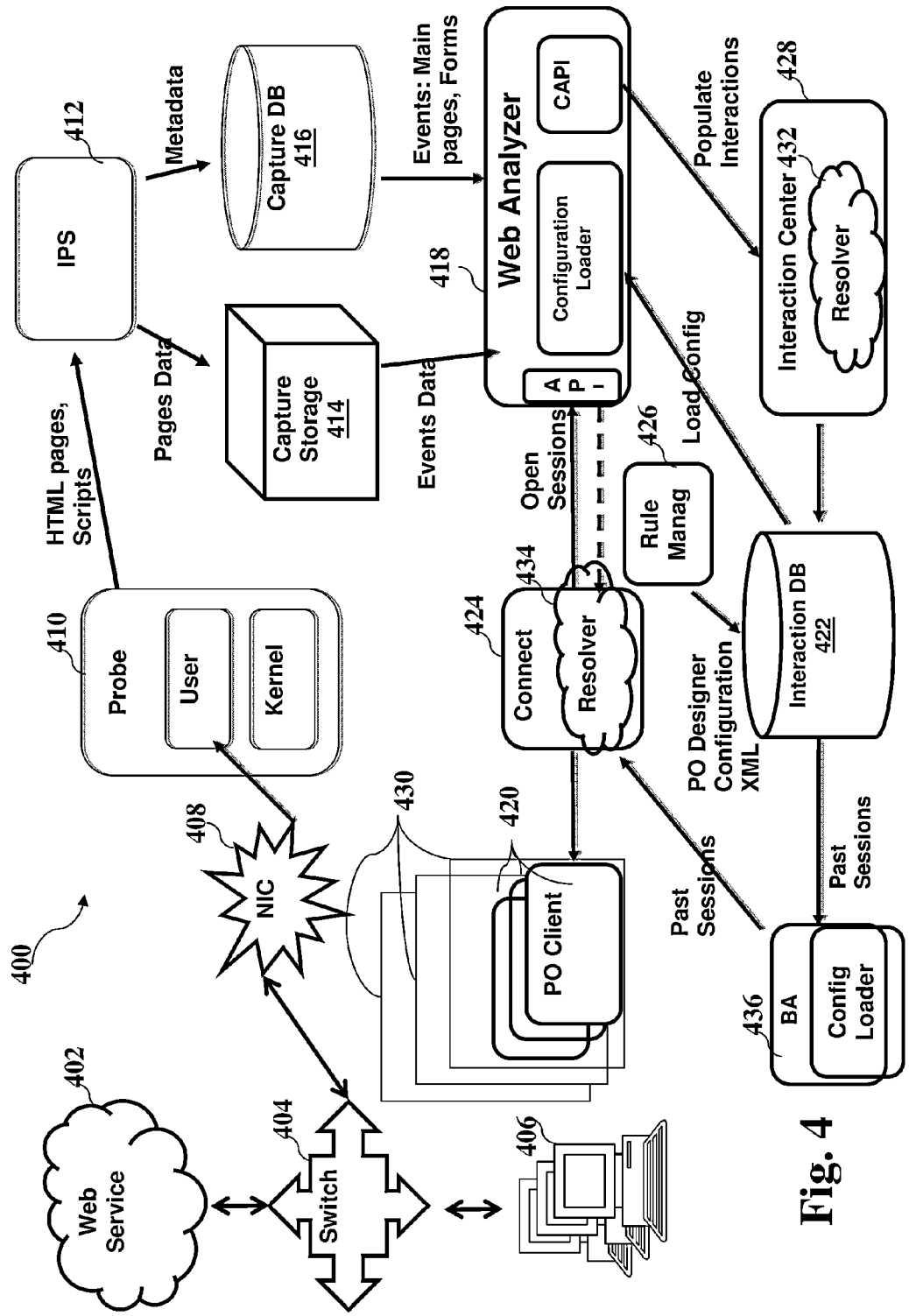
FIG. 4 schematically illustrates a system for monitoring a user's web interactions in accordance with an embodiment of the invention.

Reference is made to FIG. 4, which schematically illustrates a system 400 for monitoring a user's web interactions in accordance with an embodiment of the invention. Components and processes of FIG. 4 may be executed using devices and processors of FIG. 1, such as, for example, web capture server 110, analysis server 116, agent device 120, and interactions center 124 and their processors 112, 132, 136 and 142.

System 400 may include a web server 402 (e.g., web server 122 of FIG. 1) providing web content or documents (e.g., interactions with programs, documents, or users accessed via the Internet) and a switch 404 for user computers 406 (e.g., user computers 102 of FIG. 1) to connect and interact with web server 402. System 400 may include a network interface card (NIC) 408 to connect a probe 410 to switch 404. Probe 410 may monitor user computers' 406 web interactions, for example, by recording, copying, passively sniffing or capturing web pages, scripts and any other web content according to capture criteria. Probe 410 may execute a targeted search of interactions, for example, in a user or kernel operating system (OS) modes. Probe 410 may transfer interactions data, for example, including packets of HTML pages and scripts, to internet processing server (IPS) 412. IPS 412 may process the interactions packets and sort or extract targeted information, for example, into page data and/or metadata (e.g., URLs, cookies, etc.). Switch 404, NIC 408, probe 410 and/or IPS 412 may be components of or connected to one or more capture servers (e.g., capture servers 110 of FIG. 1) and may be operated by one or more processors 112 thereof. A capture storage 414 (e.g., storage center 118 of FIG. 1) may save the captured page data (e.g., in a storage hierarchy) and a capture database 416 (e.g., database 126 of FIG. 1) may save the captured metadata, although other or additional data elements may also be saved.

A web analyzer 418 (e.g., analysis server 116 of FIG. 1) may retrieve data from capture storage 414 and/or capture database 416 and may analyze the data, identify, filter, save or extract interesting elements, such as, products and products prices, that satisfy, match or correspond to rules set by a rule manager 426 and create user sessions. Web analyzer 418 may automatically and passively determine the user identity of web interactions, for example, by passively sniffing metadata (e.g., cookies) or the web pages themselves. A "sniffer" or "packet analyzer" may refer to a device or executable software adapted to capture, intercept and/or log traffic passing over a digital network, such as, the Internet. "Passive" may refer to an act, such as, sniffing, executed independently of the act. For example, a passive sniffer may intercept and record network traffic independently or separately from the network traffic users (e.g., user computers 406) and providers (e.g., web server 402). Web analyzer 418 may also automatically and passively divide the interactions into distinct user sessions for an agent device 430 (e.g., agent device 120 FIG. 1), for example, via a PO client 420. PO client 420 may determine when a previous session ends (e.g., when no user feedback is received for a predetermined period of time) and when a new session begins (e.g., when user feedback is received after a delay). PO client 420 may communicate with web analyzer 418 via a connection server 424. PO client 420 may be installed on any device in system 400, for example, including user computers 406, agent devices 430 and/or web analyzer 418.

User computers 406 interactions with web servers 402 may be recorded as data, such as, URLs of accessed web pages, metadata of accessed web pages, links selected, etc. PO client 420 may determine the rules for identifying or extracting information, such as, screen elements, metadata or other web objects, from the interaction data. Web analyzer 418 may store or save identified, filtered or extracted interaction data (e.g., which match or correspond to rules) in an interactions database 422 (e.g., database 126 of FIG. 1) based on configuration rules or criteria provided to web analyzer 418, for example, via a configuration loader module or PO client 420. For example, web analyzer 418 may include an interface, such as a call server application programming interface (CAPI), to trigger an interaction center 428 (e.g., interaction center 124 of FIG. 1) to populate interactions database 422 with relevant interactions that satisfy the configuration rules. In one example, a configuration rule may specify interactions where the user browses a page for a description of product X. Configuration rules may be the same or different for each user session, each customer service interaction, and/or each agent device 430. In some embodiments, web analyzer 418 may save all webpages in a web session or may save only the subset of webpages that satisfy the rules defined by rule manager 426.

A customer resolver 432 and/or 434 may be provided to identify which interactions belong to which customers or users, for example, by matching customer identifiers or extracted data to data in a customer database. Each matched interaction may be assigned a customer identification (ID) defining the associated customer in a mapping table, which may store the interaction ID, customer ID, associated key-words, associated identifiers, etc. Accordingly, when the interaction center connects an agent to a customer, the agent may easily access interactions linked to the customer via the customer ID. The agent may refine a search to access only a subset of the customer's relevant interactions, for example, by specifying interaction criteria or rules, such as, interaction topics, key-words, communication channel, time, etc. For example, a rule may be to access "all sessions in the past week for a specific customer" or "all sessions that include a product X." Customer resolver 432 may be connected to or disposed in interaction center 428 and alternatively or additionally, customer resolver 434 may be connected to or disposed in connection server 424.

A business analyzer (BA) 436 (e.g., analysis server 116 of FIG. 1) may automatically generate marketing, business or technology impact reports, or collect data for such impact analysis, for example, based on completed or past user sessions.

Interaction center 428 may include a customer resolver module interfacing with agent device 430 to provide agents with relevant user interactions from interactions database 422. Agent device 430 may query BA 436 via connection server 424 for closed sessions and web analyzer 418 for open sessions. BA 436 and web analyzer 418 may supply agent device 430 with a list of closed and open sessions, respectively, for a specified user upon request. In some embodiments, interactions database 422 may store additional non-web interactions, such as telephone, email or messaging interactions, which may be provided to the agent device for additional cross-channel analysis to improve customer service. Agent device 430 may be provided with interaction details, including, for example, a history of the user's past web interactions, a summary of those interactions, a playback module to view simulations of those interactions and a guide listing recommendations to optimize those interactions. Interaction details may be provided to agent device 430 via an interface (e.g., via interface 200 of FIG. 2).

Some embodiments of the invention may allow agent device 430 to track open session interactions on user computer 406 in real-time using PO client 420 (installed on agent device 430). PO client 420 may transfer or make data available in real-time from open or current sessions (e.g., as well as past sessions). PO client 420 may transfer the data from each user computer 406 to one or more agent device 430, for example, which are assigned to provide the user support. Agent device 430 may view a user's past session data as a history of relevant interactions, as a summary report of those interactions, or as a playback simulation of the interactions. In addition or alternatively, agent device 430 may view the user's current session data as a history or summary report updated in real-time or as a real-time interaction simulation in a shadow browsing interface. Agent device 430 may also be provided with a guide updated in real-time with recommendations targeted to the user's real-time interactions. By extracting user data via PO client 420 installed in a user computer 406, the user profile may be automatically known and transmitted to agent device 430, for example, without the user defining their identity, which may enhance both security and privacy issues in system 400.

In one example, a user browses a website for a product or service X (e.g., X=a financial loan) and then calls (e.g. places a telephone call to) a provider of product or service X (e.g., a bank) at a later time. The user may be connected to an agent and the agent's device 430 may automatically (or after sending a request) access a summary of the web interaction, a link to shadow browse the user to view the user's current or real-time interactions and/or guidance tools to make recommendations, for example, for the agent to sell the user a product or service that is the same, similar or related to X.

Switch 404, NIC 408, probe 410, IPS 412, web analyzer 418, PO client 420, interactions database 422, connection server 424, rule manager 426, interaction center 428, agent device 430, customer resolvers 432,434 and business analyzer (BA) 436 may each be, for example, software executed on one or more processors, and while this software may be in one processing device or server, it is not necessarily executed by the same processor or within the same computing device.

Web Analyzer

A web analyzer (e.g., web analyzer 418 of FIG. 4) may analyze new web events from a capture database (e.g., capture database 416 of FIG. 4) and may insert the analyze interactions (sessions) into an interaction database (e.g., interactions database 422 of FIG. 4). The web analyzer may execute, for example, one or more of the following tasks:

Collect new pages from the capture database.
Session management.
Identify when new session starts.
Handle session termination.
Data extraction.

Perform webpage data extraction according to a PO client configuration.

Customer identification (e.g., from web cookie and/or from data extraction).

Supply list of open sessions for specific identifier upon request.

Interactions population via a database server using the CAPI.

Figure 5:
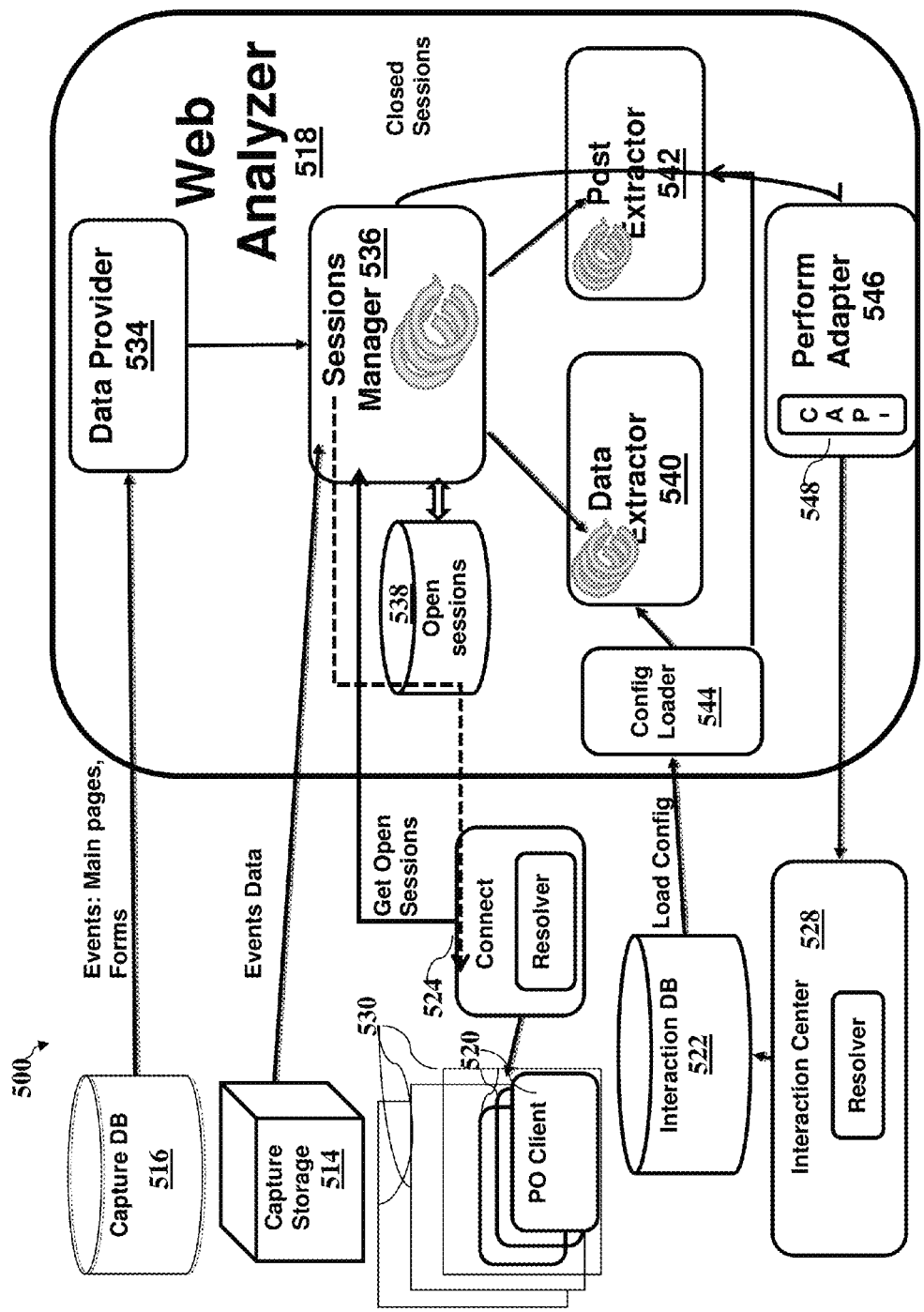
FIG. 5 schematically illustrates a system including a web analyzer in accordance with an embodiment of the invention.

Reference is made to FIG. 5, which schematically illustrates a system 500 including a web analyzer 518 in accordance with an embodiment of the invention.

System 500 may include a web analyzer 518 (e.g., web analyzer 418 of FIG. 4), a capture storage 514 (e.g., capture storage 414 of FIG. 4), a capture database 516 (e.g., capture database 416 of FIG. 4), a PO client 520 (e.g., PO client 420 of FIG. 4), a connection server 524 (e.g., connection server 424 of FIG. 4), an interactions database 522 (e.g., interactions database 422 of FIG. 4) and an interaction center 528 (e.g., interaction center 428 of FIG. 4). Web analyzer 518 may include a data provider 534, a session manager 536, an open sessions database 538, a data extractor 540, a post extractor 542, a configuration loader 544 and a perform adapter 546 including a CAPI 548. Other or additional components or devices may be used. Web analyzer 518 may be implemented as a system administrator plug-in in interaction center 528.

Data provider 534 may retrieve web interaction events, for example, including page data (e.g., main pages, forms, etc.) from capture database 516 and post data (e.g., webpage metadata, content entered into fields, such as, a user name in a text box, etc.) from capture storage 514, and may provide the events to session manager 536. Session manager 536 may retrieve a list of open sessions from open (current) session database 538 and may define one or more closed (past) sessions for each user. Once the sessions are defined, data extractor 540 and/or post extractor 542 may selectively identify, filter, save or extract web interactions according to rules via configuration loader 544. Data extractor 540 may analyze the page data and post extractor 542 may analyze the post data. Data extractor 540 and post extractor 542 may divide the extracted content into sessions, for example, as defined by session manager 536. Session manager 536 may provide the session details to perform adapter 546, which may transmit the details to interaction center 528, for example, via CAPI 548, to organize the interactions database 522 into sessions or retrieve data based on the sessions.

Figure 10:
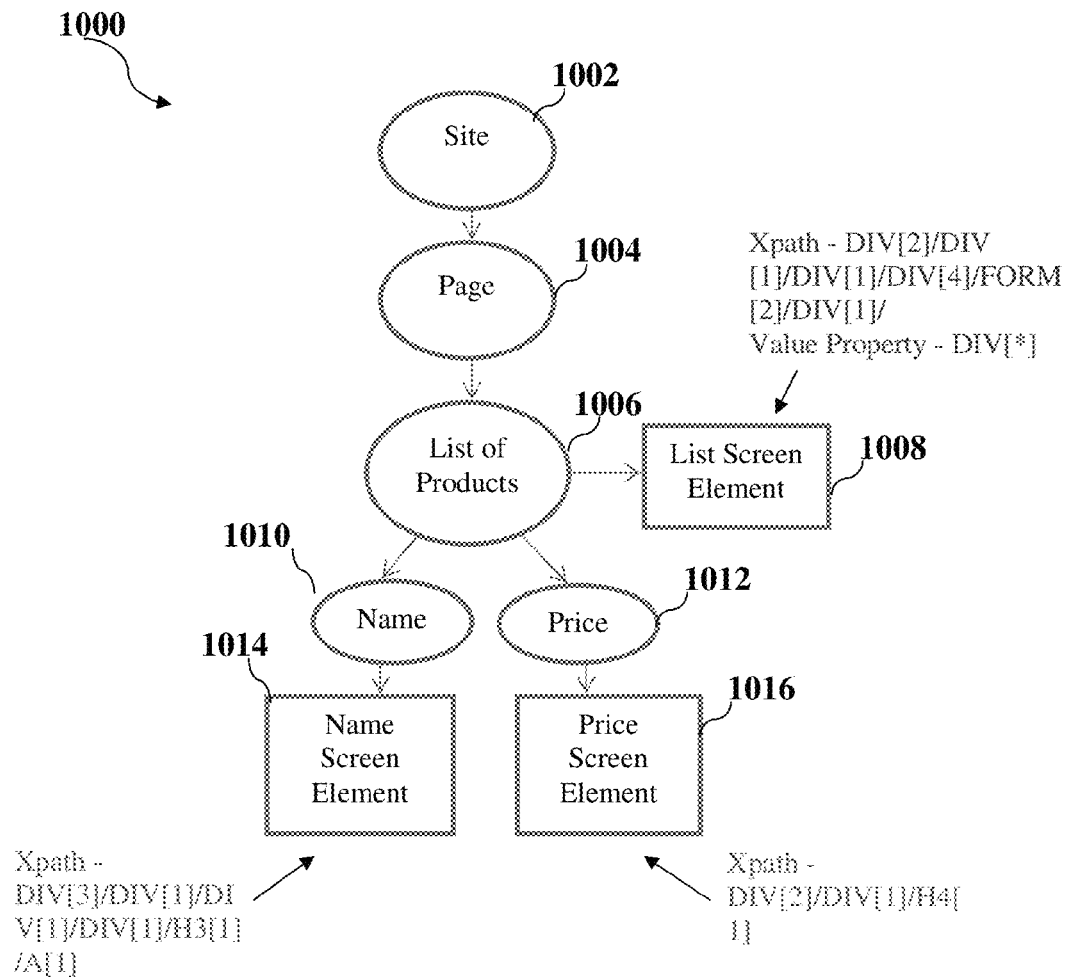
FIG. 10 schematically illustrates a path to locate elements to be extracted from a document in accordance with an embodiment of the invention.
Figure 11:
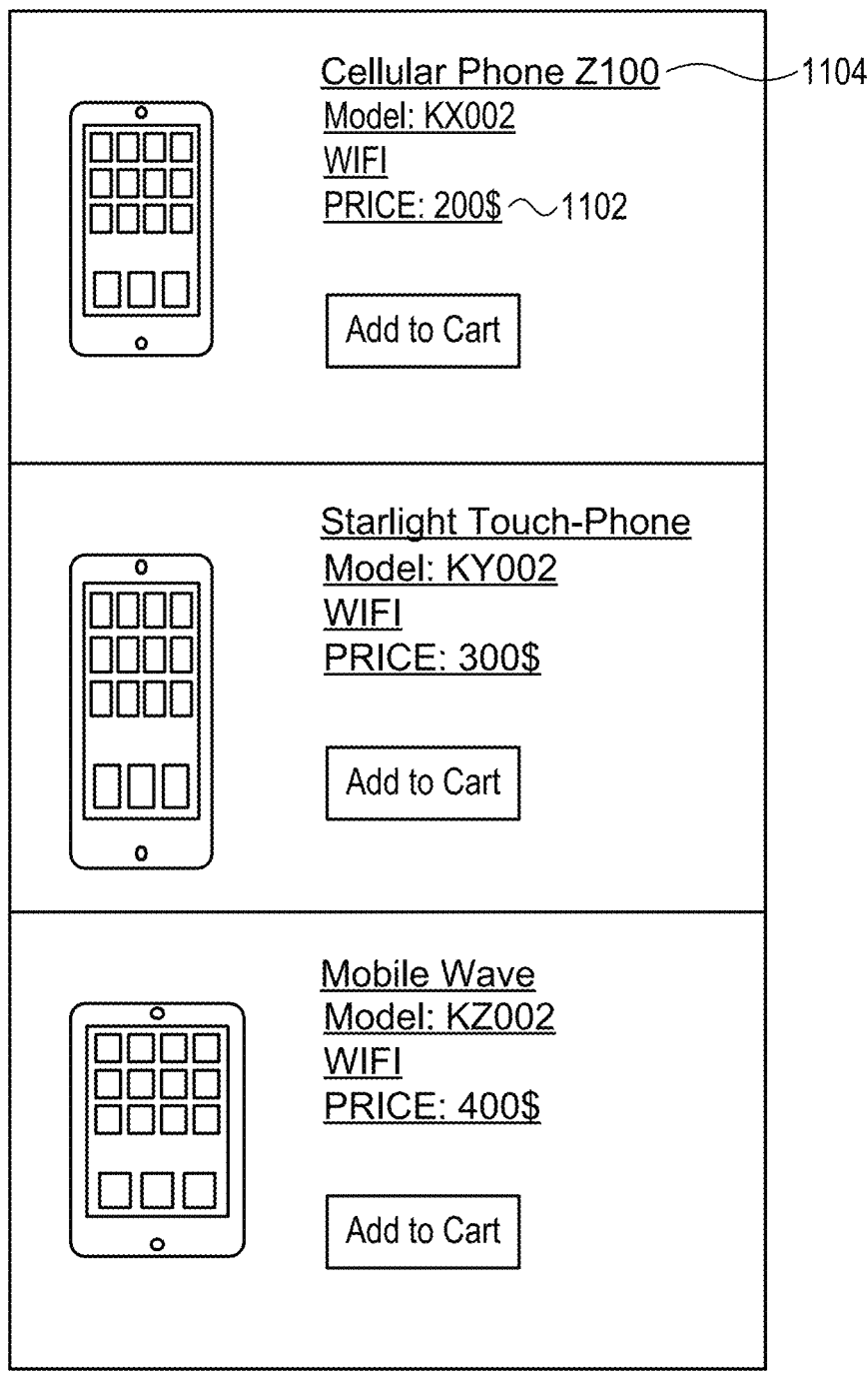
FIG. 11 schematically illustrates an example of a webpage with extracted screen elements defined by the paths of FIG. 10 in accordance with an embodiment of the invention.

Data extractor 540 and/or post extractor 542 may extract a list of elements from each web page, for example, as described in reference to FIGS. 10 and 11.

Components and processes of FIG. 5 may be executed using devices and processors of FIG. 1, such as, for example, web capture server 110, analysis server 116, agent device 120, interactions center 124 and their processors 112, 132, 136 and 142. Components of FIG. 7 may each be, for example, software executed on one or more processors.

Web Analyzer Interfaces

Web analyzer 518 may include a database interface to access capture database 516 and/or database tables and a file storage interface to access capture storage 514 and/or file systems. Web analyzer 518 may poll capture database 516 for new events and then analyze the corresponding files from the file system in capture storage 514.

The database interface may be deployed on the same server as interactions database 522 (or on a different server). The interface may use an authentication platform, or such as, SQL Server authentication or Windows NT authentication, to validate the authenticity of transferred data. During system 500 installation, a new script may create a stored procedure, view and table that may be used by web analyzer 518. The view may aggregate relevant data from various authentication tables. The stored procedure may return new events data based on the view. The table may keep track of what web analyzer 518 has fetched from capture database 516.

The file storage interface may access shared folder on an IPS device. The file storage interface may store HTML pages (e.g., main pages events), for example, as .htm files. The file storage interface may store posts (e.g., form events), for example, as extensible markup language (XML) files. In addition, the file storage interface may store other web resources (e.g., images, java scripts, etc.), for example, as is, to be accessed directly by a document object model (DOM). Other or additional programming languages may be used.

Web analyzer 518 may include an interface with connection server 524 to supply users' current open sessions to connection server 524, for example, as described in reference to FIGS. 6-9.

Figure 6:
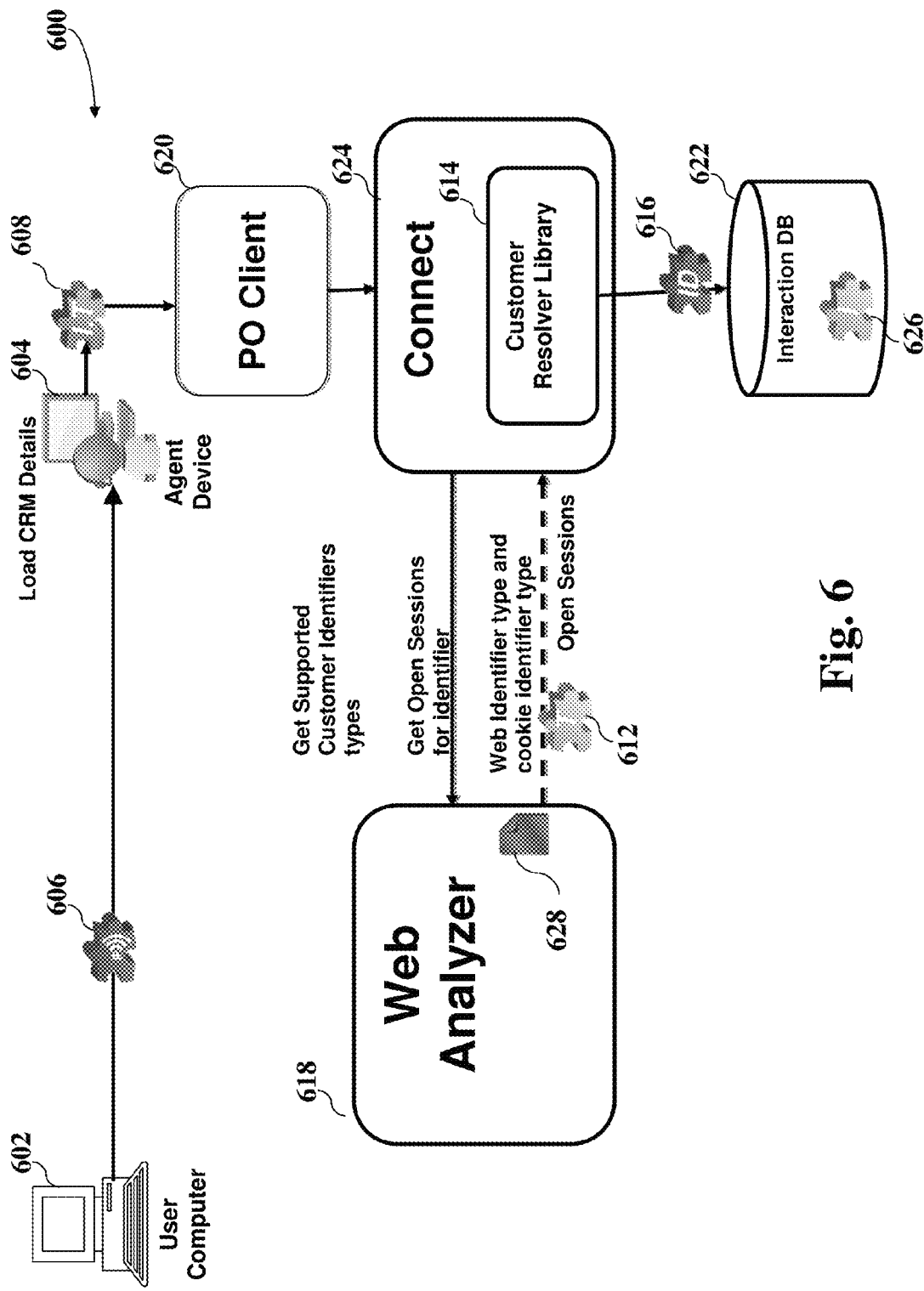
FIG. 6 schematically illustrates an interface between a web analyzer and a connection server in accordance with an embodiment of the invention.

Reference is made to FIG. 6, which schematically illustrates an interface between a web analyzer 618 and a connection server 624 in accordance with an embodiment of the invention. The interface between web analyzer 618 (e.g., web analyzer 418 of FIG. 4) and connection server 624 (e.g., connection server 424 of FIG. 4) may supply connection server 624 with all the current open sessions according to customer identifiers, for example, one identifier for cookie identification and one identifier for web identification. Connection server 624 may, in turn, store the current open sessions at an interaction database, where the sessions may be accessible to an agent device 604 (e.g., agent device 430 of FIG. 4) providing customer support.

In one embodiment, user computer 602 (e.g., user computer 406 of FIG. 4) may connect to agent device 604, for example, using an Internet protocol (IP) connection 606. Agent device 604 may load user or customer data, such as, CRM details, into a PO client 620 (e.g., PO client 420 of FIG. 4) and/or interaction database 622 (e.g., interaction database 422 of FIG. 4), for example, each time a user contacts the agent. PO client 620 may extract transaction data 608, (I,T), from IP connection 606 data, such as, cookies and/or web information. PO client 620 may send transaction data 608 to connection server 624. Connection server 624 may send web analyzer 618 a request for supported customer identifier types. Web analyzer 618 may issue an identifier type 612, (T), such as a web and/or a cockle identifier types. Connection server 624 may send transaction data 608 and/or identifier type 612 to database 622, for example, using a customer resolver library 614. Database 622 may return a user identifier (I) 626 and/or customer ID 616 associated with user computer 602.

Once user identifier 626 is obtained, connection server 624 may send web analyzer 618 a request for open session data 628 associated with user identifier 626. Web analyzer 618 may return current open session data 628 to connection server 624 associated with user identifier 626 and/or identifier type 612.

Examples of requests for open session data 628 sent from connection server 624 to web analyzer 618 may include one or more of the following:

1. Get Current Supported Customer Identifier Types—web analyzer 618 may return current configured customer identifiers in the configuration of web analyzer 618. Such a request may be, for example:
    void  GetCurrentSupportedCustomerIdentifierTypes (out CustomerIdentifierType cookieCustomerIdentifierType, out CustomerIdentifierType pageCustomerIdentifierType.
2. Get Open Sessions Metadata For Customer Identifiers—web analyzer 618 may return current open sessions metadata (e.g., session ID and/or start time and date) according to customer identifiers (e.g., including a list of web identifiers and a list of cookie identifiers) and a website or web server ID. Such a request may be, for example:
    List<OpenWebInteractionMetaData>
    GetOpenSessionsMetaDataForCustomerIdentifiers (List<string>
    cookieCustomerIdentifiers,
        List<string>pageCustomerIdentifiers, int siteID).
3. Get Open Sessions With Session ID—web analyzer interface 610 may return the current open sessions (e.g., complete data) according a to given session ID. Such a request may be, for example:
    List<OpenWebInteractionData>GetOpenSessions WithSessionID (List<string>sessionIDs).

Data Structures in the requests may include, for example:
CustomerIdentityType Enumeration, which may be defined, for example, as follows:
    Unknown=0,
    IDCardNumber=1,
    PhoneNumber=2,
    EmailAddress=4,
    ChatAccount=8,
    WebLogin=16,
OpenWebInteractionMetaData object. Metadata from the web interaction may be used to describe one session identify data with properties defined, for example, as follows:
    String—Session ID
    DateTime—Start Date
PrimitiveData object, which may be defined, for example, as follows:
    String—Key
    String—Value
CompositeData object, which may be defined, for example, as follows:
    PrimitiveData[ ]—PrimitiveDataArray
    CompositeData[ ]—ChildCompositeDataArray
    String—Key
    String—Name
PageData object, which may be defined, for example, as follows:
    PrimitiveData[ ]—PrimitiveDataArray
    CompositeData[ ]—ChildCompositeDataArray
    DateTime—StartDate
    DateTime—EndDate
    string—Title
    string—Key
    string—Name
OpenWebInteractionData object, which may be defined, for example, as follows:
    OpenWebInteractionMetaData—WebInteractionMetaData
    PageData[ ]—Pages
Other or additional data structures may be used in the requests.

Figure 7:
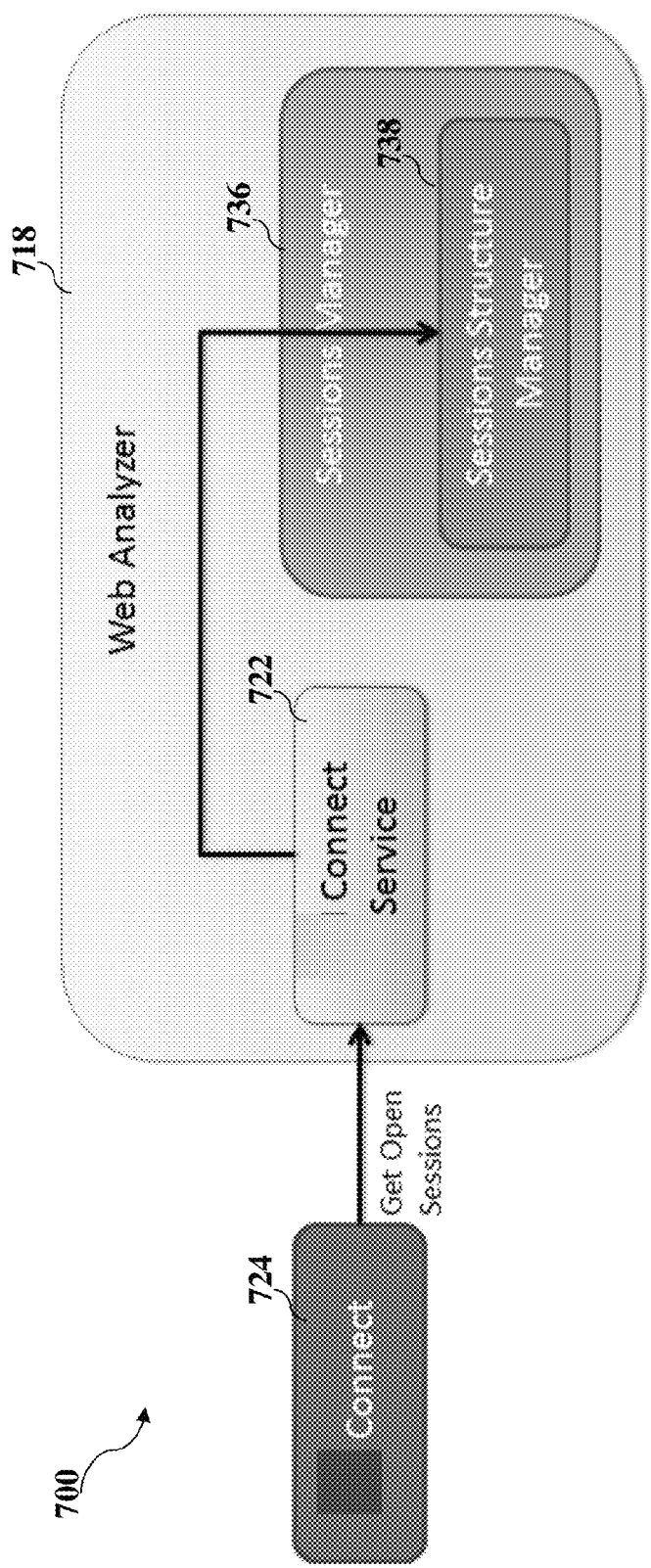
FIG. 7 schematically illustrates a system including a web analyzer and a connection server interacting via a connection service interface in accordance with an embodiment of the invention.

Reference is made to FIG. 7, which schematically illustrates a system 700 including a web analyzer 718 and a connection server 724 interacting via a connection service interface 722 in accordance with an embodiment of the invention.

Web analyzer 718 (e.g., analysis server 116 of FIG. 1) may include connection service interface 722 to provide an interface for agents to query an interaction database (e.g., interaction database 124 of FIG. 1) for open sessions. Connection service interface 722 may use a communication foundation based service, such as, Windows™ communication foundation (WCF), which may be implemented as a singleton service and may be a transmission control protocol (TCP) service. Connection service interface 722 may retrieve all open sessions (or a subset of open sessions) from a session manager 736, for example, as a SessionsManager object, provided by a sessions structure manager 738. Sessions may be converted, for example, to OpenWebInteractionData objects, and then returned to the client.

Components and processes of FIG. 7 may be executed using devices and processors of FIG. 1, such as, for example, web capture server 110 and analysis server 116. Components of FIG. 7 may each be, for example, software executed on one or more processors.

Figure 8:
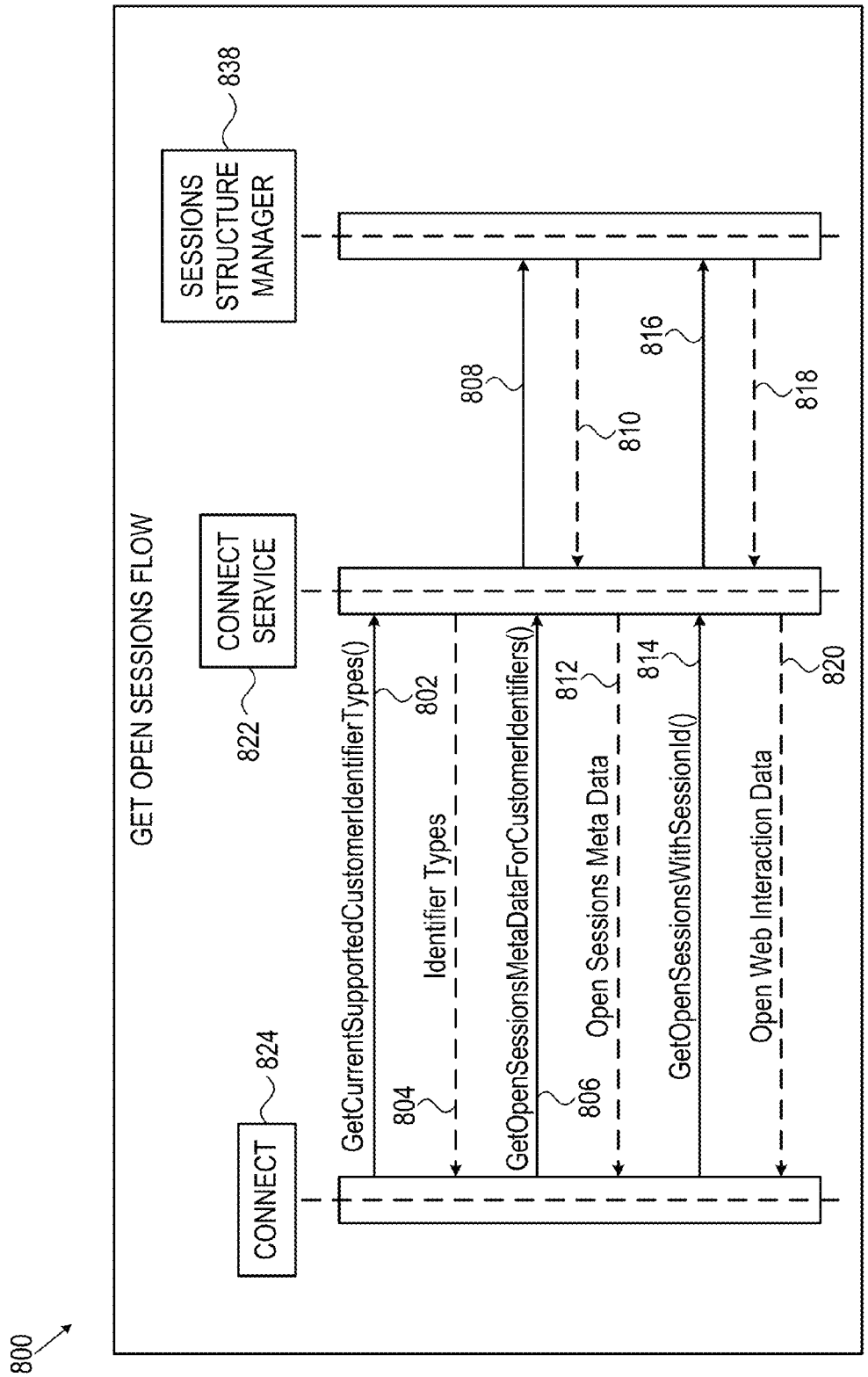
FIG. 8 schematically illustrates a workflow for retrieving open sessions in accordance with an embodiment of the invention.

Reference is made to FIG. 8, which schematically illustrates a workflow 800 for retrieving open sessions in accordance with an embodiment of the invention. Workflow 800 may be executed by a connection server 824 (e.g., connection server 724 of FIG. 7), a connection service interface 822 (e.g., connection service interface 722 of FIG. 7), and a sessions structure manager 838 (e.g., sessions structure manager 738 of FIG. 7).

In operation 802, connection server 824 may send a request to connection service interface 822 for customer identifier types currently supported by a web analyzer (e.g., web analyzer 718 of FIG. 7).

In operation 804, connection service interface 822 may send supported customer identifier types retrieved from the web analyzer and may transmit them to connection server 824.

In operation 806, connection server 824 may send a request to connection service interface 822 for current open sessions metadata according to customer identifiers and/or a website ID.

In operation 808, connection service interface 822 may transfer the customer identifiers and/or a website ID to sessions structure manager 838.

In operation 810, sessions structure manager 838 may return current open sessions metadata to connection service interface 822.

In operation 812, connection service interface 822 may transfer the current open sessions metadata to connection server 824.

In operation 814, connection server 824 may send a request to connection service interface 822 for current open sessions according a given session ID.

In operation 816, connection service interface 822 may transfer the session ID to sessions structure manager 838.

In operation 818, sessions structure manager 838 may return current open sessions web interaction data to connection service interface 822.

In operation 820, connection service interface 822 may transfer the current open sessions web interaction data to connection server 824.

Other operations or orders of operations may be used. Components and processes of FIG. 8 may be executed using devices and processors of FIG. 1, such as, for example, web capture server 110, analysis server 116, agent device 120, interactions center 124 and their processors 112, 132, 136 and 142. Components of FIG. 8 may be, for example, software executed on one or more processors.

Figure 9:
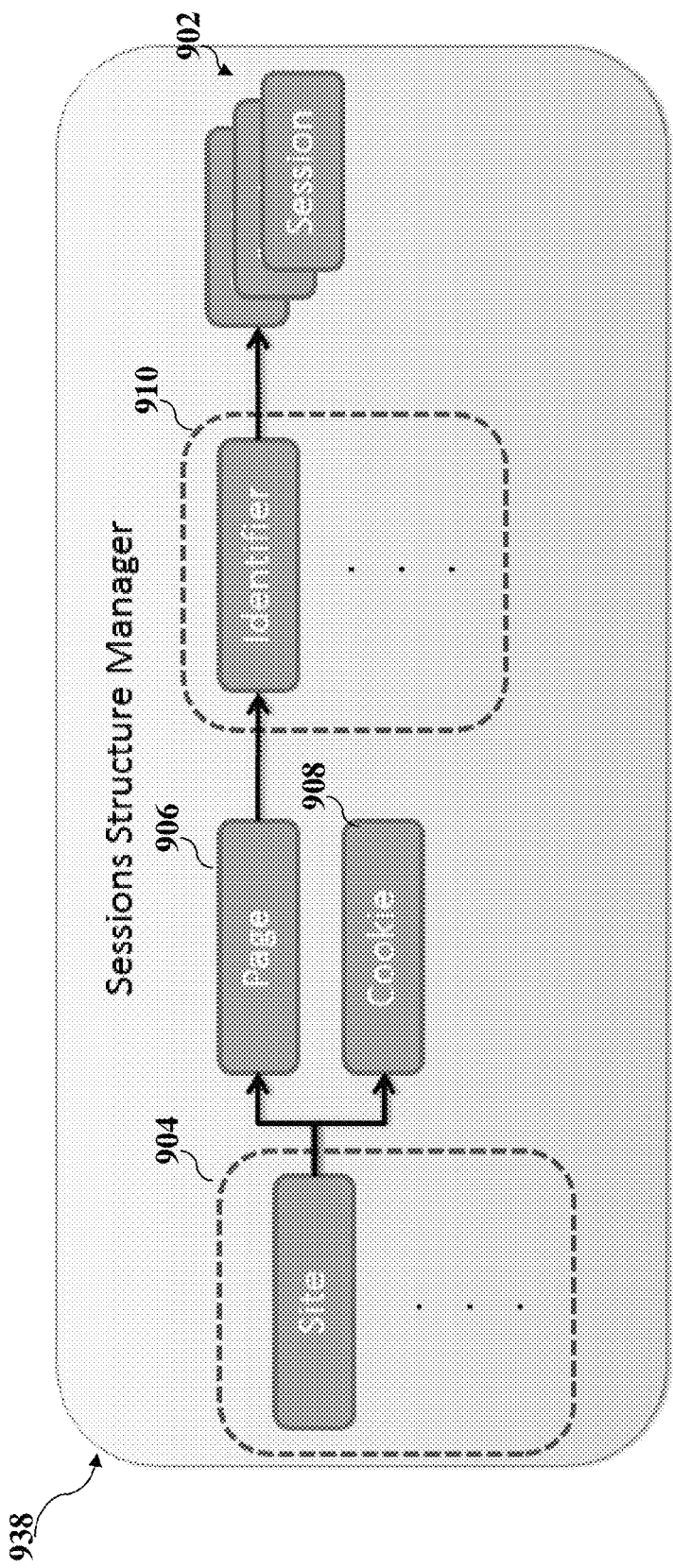
FIG. 9 schematically illustrates a sessions structure manager in accordance with an embodiment of the invention.

Reference is made to FIG. 9, which schematically illustrates a sessions structure manager 938 in accordance with an embodiment of the invention. Sessions structure manager 938 of FIG. 9 may be the same or different than sessions structure manager 738 of FIG. 7 and/or sessions structure manager 838 of FIG. 8.

Sessions structure manager 938 may manage open sessions 902 in a web analyzer, for example, according to one or more of the following indexes:

Site ID 904.
Open session data type, e.g., page 906 or cookie 908.
User Identifier 910, e.g., the extracted identity from the web page or the cookie.

Other or additional indices may be used.

Referring again to FIG. 5, web analyzer 518 may include another interface, for example, CAPI 548, for populating the sessions as interactions in interaction database 522. Web analyzer 518 may use a unique library to generate an interaction ID (e.g., a number representing an interaction record in database 522). CAPI 548 may populate interaction database 522 with a contact ID (e.g., a number representing a contact record database 522, which may be identical to, or derived from, the interaction ID), while web analyzer 518 may populate interaction database 522 with interaction content (e.g., interaction page, interaction data, page data, server event IDs (e.g., interaction, contact and/or customer IDs), etc., which may be unique only inside an interaction). In one embodiment, web analyzer 518 may use an "Insert" mode of CAPI 548 and not an "Open, Close" mode, such that, only closed sessions may be documented to interaction database 522. Web analyzer 518 may provide a user or customer ID (e.g., a number representing a user or customer record in database 522), for example, via a configuration file. Web analyzer 518 may create two participants, one for the user (if an identifier was extracted) and one for a virtual agent (e.g., an agent that represents web analyzer 518 that analyzes data that the user creates when they view a website or webpage). A hostname for CAPI 548 may be a local hostname, which may, for example, be hardcoded. A port for CAPI 548 may include a port taken from a plug-in during the web analyzer 518 start-up.

Other or additional system interfaces may be used.

System Operation and Configuration

Embodiments of the invention may provide a system and method for web recording and fetching new data. In order to fetch new data, a web analyzer may sample an authentication database and may search for new interactions or events that have not yet been processed. For each event fetched by the web analyzer, the analyzer may, for example:

Identify whether the event belongs to a new session or not (e.g., the session ID may be extracted from the associated cookie).

If the event belongs to a new session:
create a new session object and add each subsequent webpage to the new session object; and
attempt to extract the customer identifier from the cookie associated with the webpage.

Locate the configuration for each webpage, for example, using one or more of the following event objects (other or additional event objects may also be used):
a URL for the webpage;
a title of the webpage; and/or
screen elements identified in the webpage (estimated from 10% of all pages).

If the webpage configuration is not found, the analyzer may not save the webpage to the new session object.

The process may continue for each fetched event, for example, until the new session is closed (e.g., after a period of inactivity) or after a maximum session size or number of webpages are stored in the new session object.

Embodiments of the invention may provide a system and method for extracting data from new web recordings. In order to extract data, a web analyzer may, for example:

Load the recorded webpage html to a DOM.

Search webpage for screen elements according to a predetermined criteria stored in a table, for example, "tblWAScreenElementProperty," which may store web configuration details defining screen elements for web analyzer 518 to extract from the webpage. The screen elements may be defined and searched for, for example, using one or more of the following types of criteria (other or additional criteria may also be used):
ID, such as, an element ID;
Name, such as, an element name; and/or
Xpath, such as, "DIV[1]\DIV[2]\TABLE[1]\ ... "

Each element found in the recorded webpage may have its data extracted, for example, based on screen element value or column (e.g., nvcValueProperty) in the property table (tblWAScreenElementProperty).

If more than one element is found for a screen element definition (e.g., repetitive or non-unique elements), data may be extracted from only the first detected one of such elements. Alternatively, data may be extracted from each of the multiple elements.

If a customer identifier is not extracted from the webpage cookie, but a "Customer ID" screen element type is detected in the webpage, the data for such a screen element may be extracted and the session customer identification may be updated based thereon.

Embodiments of the invention may provide a system and method for session termination and data population for extracted web interactions. A web analyzer may, for example, after a predetermined number of minutes of inactivity, close a current session and pass the associated session object to a perform adapter (e.g., perform adapter 546 of FIG. 5). If the session is "web authenticated" or a flag is raised, e.g., "Insert Web Unauthenticated Sessions," the web analyzer may insert a new interaction into an interaction database (e.g., interaction database 522 of FIG. 5), for example, using an interface (e.g., CAPI 548 of FIG. 5). In some embodiments, each session may include a single interaction and a single contact ID, while in other embodiments, each session may include multiple interactions and/or multiple contact IDs. Each webpage URL written to the interaction database may be a URL assigned by an authentication database and may be, for example, concatenated with a file ID (e.g., to enable playback). The perform adapter may pass the bulk of the sessions to the CAPI.

Embodiments of the invention may provide a system and method for the configuration of a system monitoring web interactions. The configuration may be loaded during the start up of the web analyzer. The parameters may be set as recording rules in the rule manager, while some parameters may be configured after installation manually, for example:

User IDs
    Defined in the user admin as mail users.
    Inserted into the database by the interaction center, as is.
    Testing User ID.
    Operational User ID.
Capture database hostname
File access server (FAS) proxy location (URL). The FAS may be a server used for web session playback. A web player may connect to the FAS to play the user sessions from recorded session files in storage. For optimal performance, the FAS may be installed in the same device as the web analyzer, although the FAS may also be installed in other devices.

Embodiments of the invention may include one or more configuration parameters for monitoring web interactions (parameters may be loaded during the start-up of a web analyzer and may be configured manually after the installation. Examples of default parameters are defined in brackets "[ ]". Configuration parameters may include, for example:

Insert "Web Unauthenticated" sessions [False]—inserts session sessions (e.g., into an open sessions database 538 of FIG. 5) for which no user or customer identifier has been extracted for the database.
Insert "User Unauthenticated" sessions [False]—inserts session sessions for which the extracted user data or ID is not found in a customer or user database.
Testing mode flag—indicates whether or not to pass the testing user ID or the operational User ID to the CAPI.
Remove an HTML tag element (e.g., Href) and scripts flag [False]—indicates whether or not to remove all metadata, such as, hyperlinks and java scripts, before data extraction.
Session termination timeout interval [20 minutes]—defines a number of minutes to wait before terminating a session (e.g., from the last fetched event).
insertToPerfomTimeoutInSeconds [10]—Perform Adapter sends interactions to CAPI in bulks (or groups of interactions). If a bulk is not filled by the time specified in this parameter, the bulk may be (or may not be) sent anyway.
eventsPollingTimeout [2 minutes]—the time interval between each polling to the capture database.
maxUnhandledEvents [1000]—the queue size of the session manager.
customerIDType [Email]—the identification format for each customer or user.
Sysadmin host name and port—inserted automatically by a deployment manager during installation.

Other or additional configuration parameters may be used.

Embodiments of the invention may provide a deployment manager for deploying a web analyzer (e.g., web analyzer 518 of FIG. 5) and a customer entity database, for example, using an interaction center (e.g., interaction center 528 of FIG. 5). The interaction center may handle additional media types other than web media, such as, text or messaging media, telephone call recordings, surveys, etc. The interaction center may handle a new deployment package, which is dependent on the interaction center package, but which may be installed separately therefrom. In embodiments where the web analyzer has no plug-in, some configuration parameters may be entered manually after installation.

Embodiments of the invention may provide a system and method for testing the configuration and deployment of systems monitoring web interactions. For example, system 500 of FIG. 5 may be adapted to include emulators or testing modules configured with temporary or testing parameters and setting. For example, emulators or testing modules may be implemented for data provider 534, CAPI 548 and/or configuration loader 538 to test the operation of system 500. Emulators may be adaptive, for example, modifying parameters or function to optimize testing operation. Parameters correlated with optimal system 500 testing operation may be set after testing for actual system operations.

Testing may be executed separately for different types of websites, e.g., one resembling a banking website and one resembling a different commercial website. Testing may include all (or a subset) of the system devices and functionality (e.g., tested end-to-end), for example, including those involving interaction business applications (IBAs) and real-time interaction or guidance capabilities. Testing may be executed to verify performance criteria according to a usage model defining an average or maximum volume of customer web interactions over time (e.g., up to 1 million (M) or 5M page views per day).

The testing flow may be executed as follows (other or additional steps may also be used):
    Record a session (session may include all or a subset of session web pages).
    Send PO client configuration XML file to tester.
    Run or execute tester on recorded session.
    Tester may display web pages and data extraction.

In some embodiments, configuration parameters and/or rules may be imported into the system from a PO client (e.g., PO client 520 of FIG. 5). The rules may be imported to a rule manager (e.g., rule manager 426 of FIG. 4), for example, as part of the rule manager scheduler rules. The PO client configuration XML may be loaded to an administrator database. The system may support only one site per configuration. Configuration parameters may be loaded using a "Configuration Loader" library (e.g., available for a business analyzer). Deleted Types, Objects, and Screen Elements may be marked as deleted.

Embodiments of the invention may include a customer resolver to identify a customer or user that executes each interaction, for example, so that an agent may access all (or a subset of) customer-specific interactions. The customer resolver may include a dynamic link library (DLL), for example, located in and/or accessed by the interaction center (e.g., customer resolver 432 of FIG. 4) and/or in a connection server (e.g., customer resolver 434 of FIG. 4). When the customer resolver is located in the interaction center, a web analyzer may report web interactions to the interaction center, e.g., via a CAPI, using a customer identifier, identifier type and/or tenant ID. The interaction center may use the customer resolver to resolve the identifier to a customer ID. The interaction center may insert the customer ID into a mapping table (in the interaction center) that holds entries that map interactions in the interactions database to customer records or IDs in the customer database. When the customer resolver is located in the connection server, the connection server may query the web analyzer to receive the identifier types that the web analyzer supports. The connection server may use the customer resolver to translate the identifiers it extracts to identifiers with types that the web analyzer supports. The connection server may query the web analyzer for open sessions according to identifiers received from the customer resolver.

The customer resolver may include an API. The customer resolver API may return a customer ID according a given tenent ID, customer identifier and/or identifier type. The customer resolver API may return customer identifiers for a given customer type of a given customer ID. The customer resolver API may get customer identifiers having the types supported by the web analyzer, for example, based on the tenant ID and the identifier and identifier type extracted by the connection server. A tenant may include service suppliers or intermediaries that supply system capabilities to users.

Data Extraction

Reference is made to FIG. 10, which schematically illustrates a path 1000 to locate elements to be extracted from a document in accordance with an embodiment of the invention. Data elements may be extracted at path 1000 location by a data extractor (e.g., data extractor 540 and/or post extractor 542 of FIG. 5) or other devices (e.g., web capture servers 110 of FIG. 1).

The data extractor may use path 1000 to search a web site 1002 for a web page 1004 containing a list of products 1006. The data extractor may retrieve screen elements defined by path 1000 locations. If path 1000 indicates a search for a list of products 1006, the data extractor may extract a list of product screen elements 1008; if the search criteria indicate product names 1010, the data extractor may extract name screen elements 1014; if the search criteria indicate prices 1012, the data extractor may extract price screen elements 1016.

In one example, path 1000 may be an XML path or an Xpath, which may locate screen elements in an HTML or XML document. For example, an Xpath defining a list of products 1006 may be, for example, DIV[2]/DIV[1]/DIV[1]/DIV[4]/FORM[2]/DIV[1]. Every product in the list may be found under the list Xpath in the next DIV, TR tag or other an HTML tag element. For example, the first element may be found under DIV[1], the second element may be found under DIV[2], and so on. In some embodiments, a more complex operation may be used to find the elements. For example, if there are two path variables, x and y, the x index may refer to a start location for extracting elements (e.g., the first element, the second element, etc.) and the y index may refer to a "jump" or difference between consecutive start element location (e.g., extract every second element, every third element, etc.). For example, if x=4 and y=2, the first element may be found under DIV[4], the second element may be found under DIV[6], and so on.

Under every product Xpath, the product details (e.g., name 1010 and price 1012) may be found. For example, the product name 1010 may be found under the Xpath, DIV[3]/DIV[1]/DIV[1]/DIV[1]/H3[1]/A[1], and the product price 1012 may be found under the Xpath, DIV[2]/DIV[1]/H4[1].

The element XML may be divided into different parts, for example, container (the list), language, and product element. In one example to extract a product price 1012 element from a webpage, the Xpath may be: DIV[2]/DIV[1]/DIV[1]/DIV[4]/FORM[2]/DIV[1]/DIV[4,2]/DIV[2]/DIV[1]/H4[1], where the first Xpath part, DIV[2]/DIV[1]/DIV[1]/DIV[4]/FORM[2]/DIV[1], may define the list container, the second Xpath part, DIV[4,2], may define the language and the third Xpath part, DIV[2]/DIV[1]/H4[1], may define the product price. In another example to extract a product name element from a webpage, the Xpath may be: DIV[2]/DIV[1]/DIV[1]/DIV[4]/FORM[2]/DIV[1]/DIV[4,2]/DIV[3]/DIV[1]/DIV[1]/DIV[1]/H3[1]/A[1], where the first Xpath part, DIV[2]/DIV [1]/DIV[1]/DIV[4]/FORM[2]/DIV[1], may define the list container, the second Xpath part, DIV[4,2], may define the language and the third Xpath part, DIV[3]/DIV[1]/DIV[1]/DIV[1]/H3[1]/A[1], may define the product name. The language field of the Xpath may define which elements to extract from the container. The tag name may define relevant tags in the list of elements in the container, the first number may define from which element to start and the second number may define the increment between the elements. For example, for the language defined by the Xpath, DIV[4,2], data extractor 540 may extract every second element starting from the fourth element. It may be appreciated that different webpage document locators may be used other than Xpath and other programming languages may be used other than XML and HTML.

Reference is made to FIG. 11, which schematically illustrates an example of a webpage 1100 with extracted screen elements 1102 and 1104 defined by paths 1014 and 1016, respectively, of FIG. 10 in accordance with an embodiment of the invention. In the example shown in FIG. 11, a product price screen element 1102 and a product name screen element 1104 are extracted from webpage 1100, although alternatively or additionally other types of screen elements may be extracted at other path locations. Webpage 1100 may be provided, for example, by a web server 122 of FIG. 1.

To extract screen elements, a web analyzer (e.g., web analyzer 518 of FIG. 5) may locate all screen elements in webpage 1100 and attempt to extract them from the page. Screen element marked as list may be extracted in three parts, for example:
1. The list (container) may be extracted (e.g., using the list screen element Xpath).
2. All the list products will be extracted (e.g., using the object screen element value property).
3. Recursively review all the list products (e.g., extracted in step 2) and compare them to all the "children" path elements of the list products (e.g., using the screen elements defined in the next term(s) of the Xpath).

In some embodiments, path 1000 of FIG. 10 may also define screen elements that are not to be extracted from webpage 1100 of FIG. 11, for example, for privacy purposes.

System Usage for Web Recording

After face-to-face interactions and telephone calls, the web is the most utilized channel for customers to interact with service organizations. Although the interactions between the customer and the organizational web servers are different in nature than human-human interactions, extremely valuable information may still be extracted from them to later assist the contact center in handling customers.

Web recording systems (e.g., systems 100 and 400 of FIGS. 1 and 4) may allow a capture device (e.g., capture server 110 of FIG. 1 and probe 410 of FIG. 4) to capture web traffic, a web analyzer (e.g., analysis server 116 of FIG. 1 and web analyzer 418 of FIG. 4) to filter or extract requested information from the captured traffic and a database (e.g., interaction database 126 of FIGS. 1 and 422 of FIG. 4) to save relevant extracted information, for example, for later analysis and playback.

Web recording systems may be used to understand cross-channel customer behavior. Many customers use different interaction channels and switch from one channel to another. To optimize channel usage, customer activity may be recorded across different communication channels.

Web recording systems may be used to provide contact center with customers' past web interactions, for example, according to the following steps:
A customer may interact with a web server (e.g., web server 122 of FIGS. 1 and 402 of FIG. 4).

Afterwards, the customer may utilize another channel (e.g. voice, chat, messaging) to interact with an agent.

The agent may receive a real-time guidance message generated by a PO Client (e.g., PO Client 420 of FIG. 4). The guidance message may notify the agent that the customer interacted with the web server in the past.

The real-time guidance message may offer the agent recommendations, for example, up-sell or cross-sell options, according to business rules and the analysis of the customer's past web server interaction.

The real-time guidance message may offer to "play" or simulate the customer's past web interaction for the agent.

Web recording systems may be used to provide a contact center with customers' current or ongoing web interactions, for example, according to the operations such as the following (other operations may be used):

A customer may interact with an agent.

The customer may start interacting with the web server, either without the agent's knowledge or according to the agent's instructions.

The agent may receive a real-time guidance message generated by the PO Client, for example, notifying them that the customer is interacting with the web server.

The real-time guidance message may offer to "shadow browse" the customer, showing the agent each relevant browsing decision the customer makes.

Web recording systems may be used to evaluate an agent's performance, for example, according to the following steps:

A customer may interact with an organization's web site before or after their interaction with an agent.

A supervisor for the agent may play back and evaluate the agent/customer interaction The supervisor may also play back the customer's related web interactions (as part of a sequence or as a complete interaction), for example, in order to fully understand the context or the outcome of the agent-customer interaction before finalizing the evaluation.

Web recording systems may be used to understand a specific customer's cumulative cross-channel interactions, for example, according to the following steps:

A supervisor may investigate a specific customer case by querying the customer's interaction history and playing back the customer's past web interactions.

Web recording systems may accommodate different web interaction capture solutions (separately or together, e.g., in parallel). Some web recording systems may use a probe connected to an IPS (e.g., probe 410/IPS 412 of FIG. 4) to capture web interactions by sniffing traffic from a web server (e.g., web server 402 of FIG. 4) and may filter the traffic. In one example, the system may sniff hypertext transfer protocol (HTTP) traffic of web servers and filter the traffic by URL via a web capture server.

Figure 12:
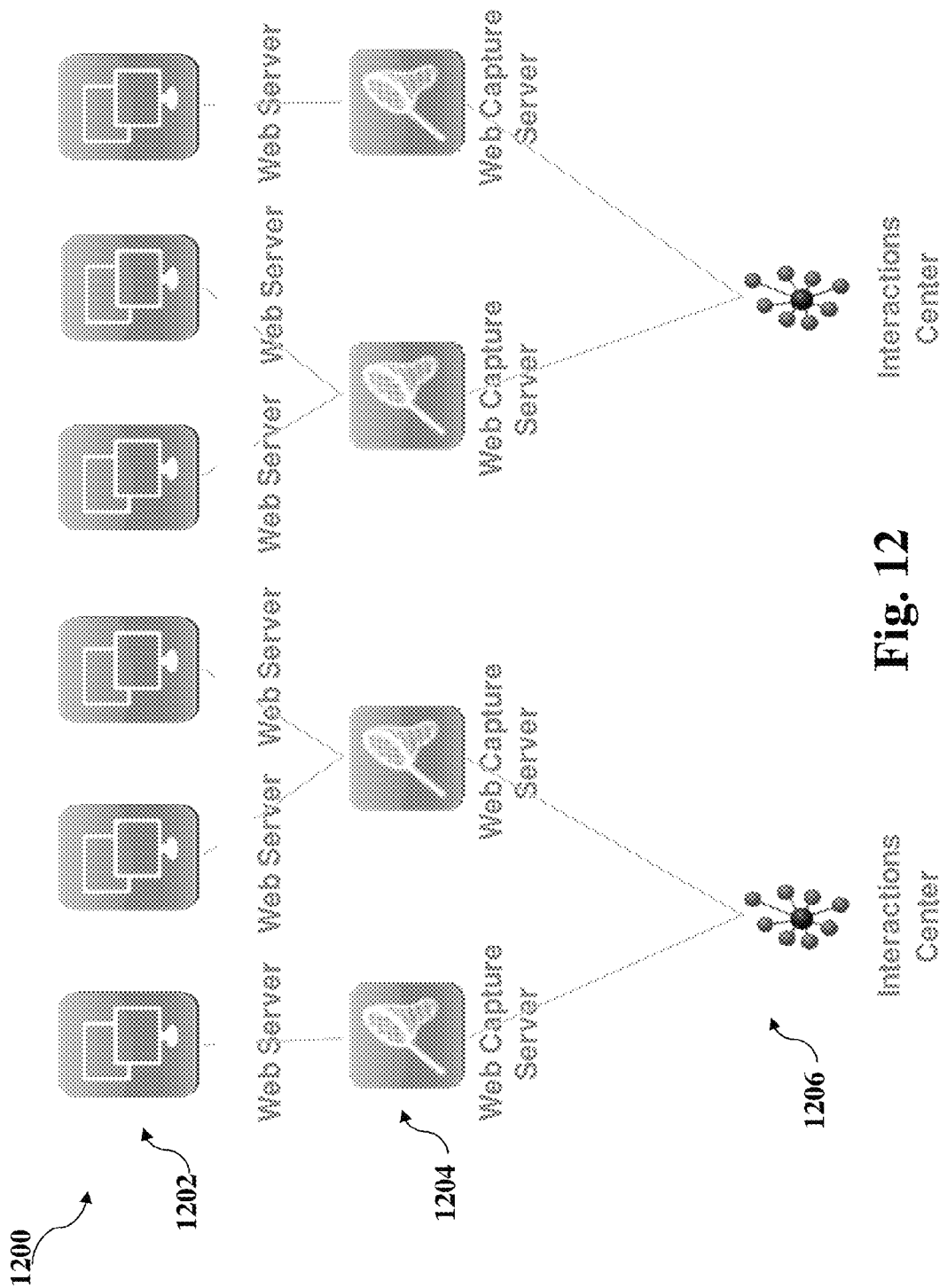
FIG. 12 schematically illustrates a system for capturing a user's web interactions in accordance with an embodiment of the invention.

Reference is made to FIG. 12, which schematically illustrates a system 1200 for capturing a user's web interactions in accordance with an embodiment of the invention. System 1200 includes a plurality of web servers 1202 (e.g., web servers 122 of FIG. 1), a plurality of web capture servers 1204 (e.g., capture server 110 of FIG. 1 including probe/IPS devices), and a plurality of interaction centers 1206 (e.g., interaction centers 124 of FIG. 1). Each web server 1202 may be monitored by one or more web capture servers 1204 and each web capture server may be processed or filtered at one or more interactions center 1206. In one embodiment, each web capture servers 1204 may monitor a user's web interactions, which may include monitoring traffic from multiple web servers 1202 when the customer is interacting with several web servers simultaneously. System 1200 may recognize such a multi-web server scenario and may automatically associate all the related captured web sessions to the same customer.

One or more web analyzers may be provided, for example, as a system administrator plug-in in interactions center 1206. The web analyzers may be able to construct web sessions or group the filtered traffic into sessions, for example, according to standard session parameters derived from metadata such as cookies. The web analyzers may truncate web sessions to include only relevant web pages, which may be referred to as web interactions, and may extract values from these web pages. Each interactions center 1206 may be connected to a PO client, which may be define relevancy criteria, logic and other configuration parameters for the web analyzer to extract, filter, store and otherwise use the users' web interactions data.

System 1200 may authenticate customer sessions for web sessions by extracting (but not necessarily resolving) a unique account or customer identifier. System 1200 may support multiple mechanisms for authenticating customer sessions, for example, by associating a cookie value to a system-defined unique identifier and/or by associating a value extracted from the web pages to a system-defined unique identifier.

Components of FIG. 12 may each be, for example, software executed on one or more processors.

Figure 13:
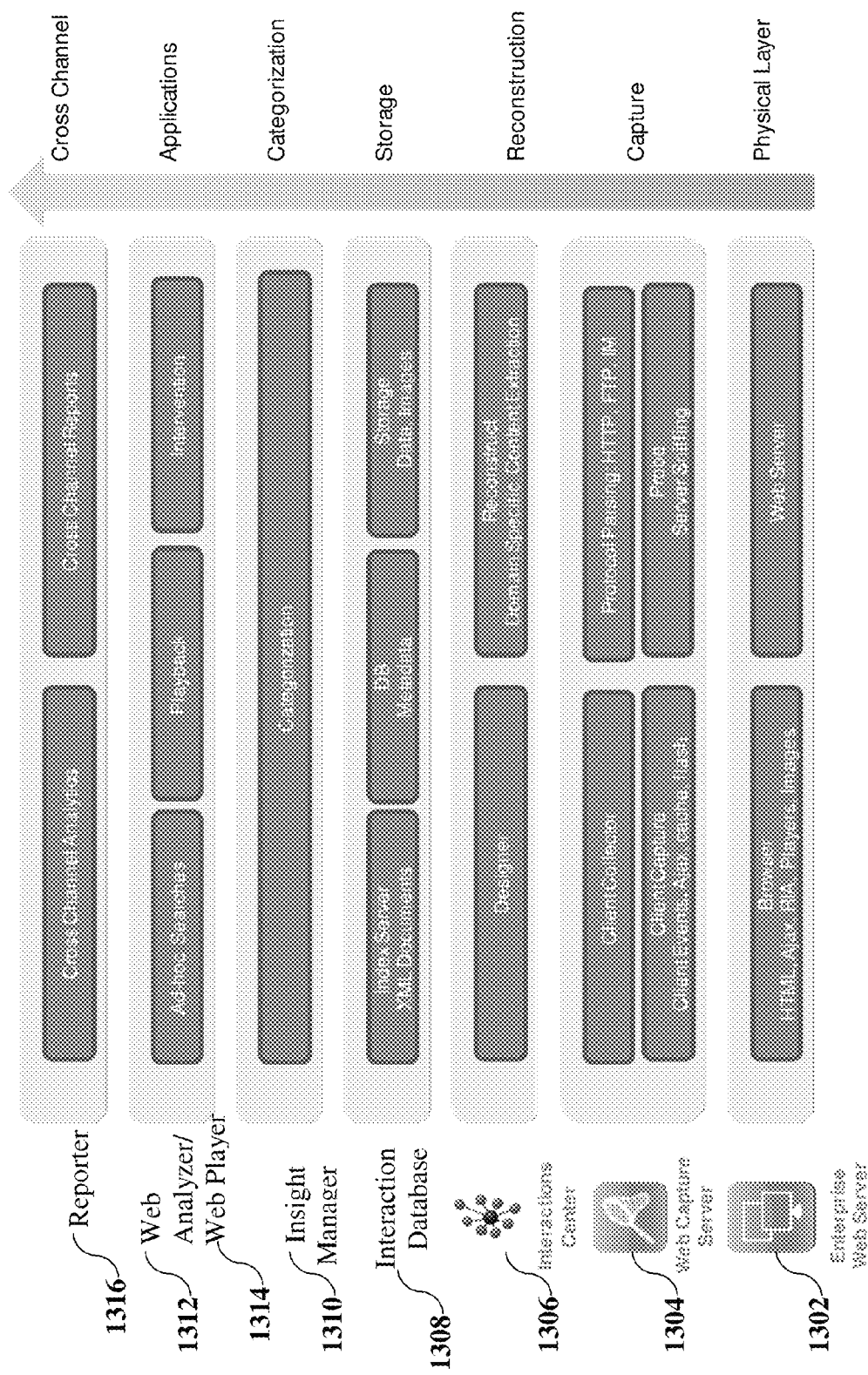
FIG. 13 schematically illustrates the components of the system of FIG. 12 in accordance with an embodiment of the invention.

Reference is made to FIG. 13, which schematically illustrates components of the system of FIG. 12 in accordance with an embodiment of the invention.

A web server 1302 (e.g., web server 1202 of FIG. 12) may provide information, such as, HTML, Capture Asynchronous JavaScript and XML (Ajax), rich internet applications (RIA), web player information, images or other formats of information, which may be hosted on a user computer (e.g., user computer 102 of FIG. 1) via a web browser.

A web capture server 1304 (e.g., web capture server 1204 of FIG. 12) may include a probe server sniffing device or process to capture web traffic, a protocol parsing device to sort the captured traffic based on web protocol (e.g., HTTP traffic, FTP traffic, IM traffic, etc.), a client collector to determine a user or customer ID, and a client capture to collect web events for each customer.

An interactions center 1306 (e.g., interactions center 1206 of FIG. 12) may convert captured web events into web interactions by filtering out relevant web pages that satisfy relevancy criteria and extracting the associated interaction data. Interactions center 1306 may include (or be connected to) a designer or PO client to define data extraction rules, scheduler rules, and/or session rules, a reconstruct module to reconstruct or group interactions into sessions, and a content extraction device to extract web content according to the extraction rules.

An interactions database 1308 (e.g., interactions database 124 of FIG. 1) may store extracted web interactions. Interactions database 1308 may include an index server to index the web interactions for proper storage and retrieval, database metadata including extracted metadata associated with each web interaction, and storage data and images for the interactions.

An insight manager 1310 may categorize the web interactions using a categorization module. A web analyzer 1312 (e.g., analysis server 116 of FIG. 1) may provide applications to an automated or live agent for ad-hoc searching (e.g., of voice and text data) and/or intervening in customer sessions. A web player 1314 (e.g., web player 1710 of FIG. 17) may be used for playing back the web interactions. A reporter module 1316 may perform cross-channel analytics to analyze interactions over multiple communication channels, such as, web, telephone, messaging, etc. Reporter module 1316 may be located in a cross-channel reports block or module (e.g., in agent device 120 or interaction center 124 of FIG. 1). Reporter module 1316 may generate reports of the cross-channel analytics, for example, using a business analyzer (e.g., BA 436 of FIG. 4).

Figure 14B:
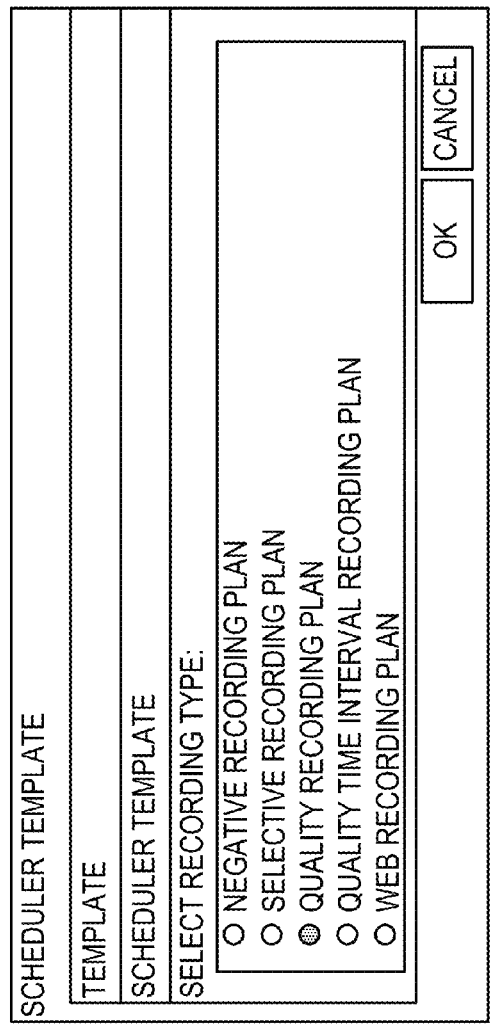
Figure 14C:
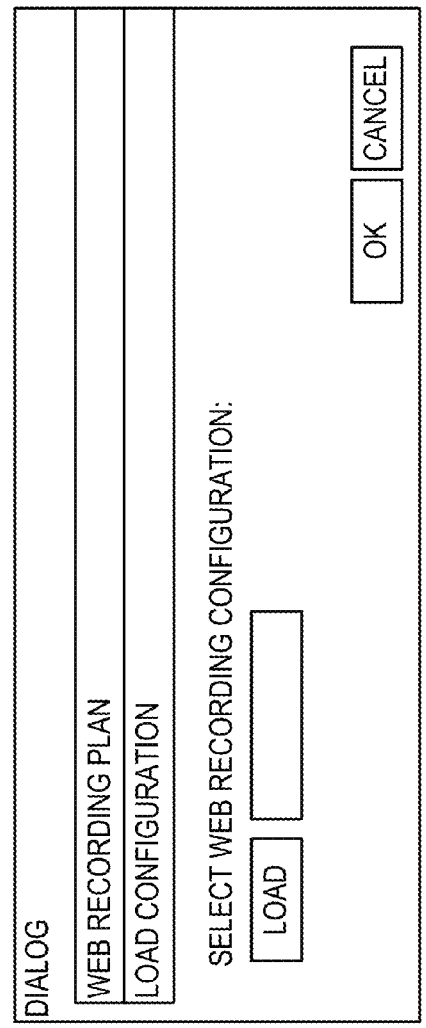

In some embodiments, a system administrator, user or agent may be able to configure web recording rules, for example, as described in reference to FIGS. 14A-14C.

Reference is made to FIGS. 14A-14C, which schematically illustrate interfaces 1400-1404 for configuring a rule scheduler in accordance with an embodiment of the invention. The rule scheduler may define web recording rules, each of which may relate to a specific web analyzer or a group of web analyzers. Interfaces 1400-1404 may be provided, for example, to an agent (e.g., at agent device 120 of FIG. 1), client (PO client 420 of FIG. 4) or product developer (e.g., PO designer 1706 of FIG. 17), to select scheduler rules and configuration parameters.

Figure 15:
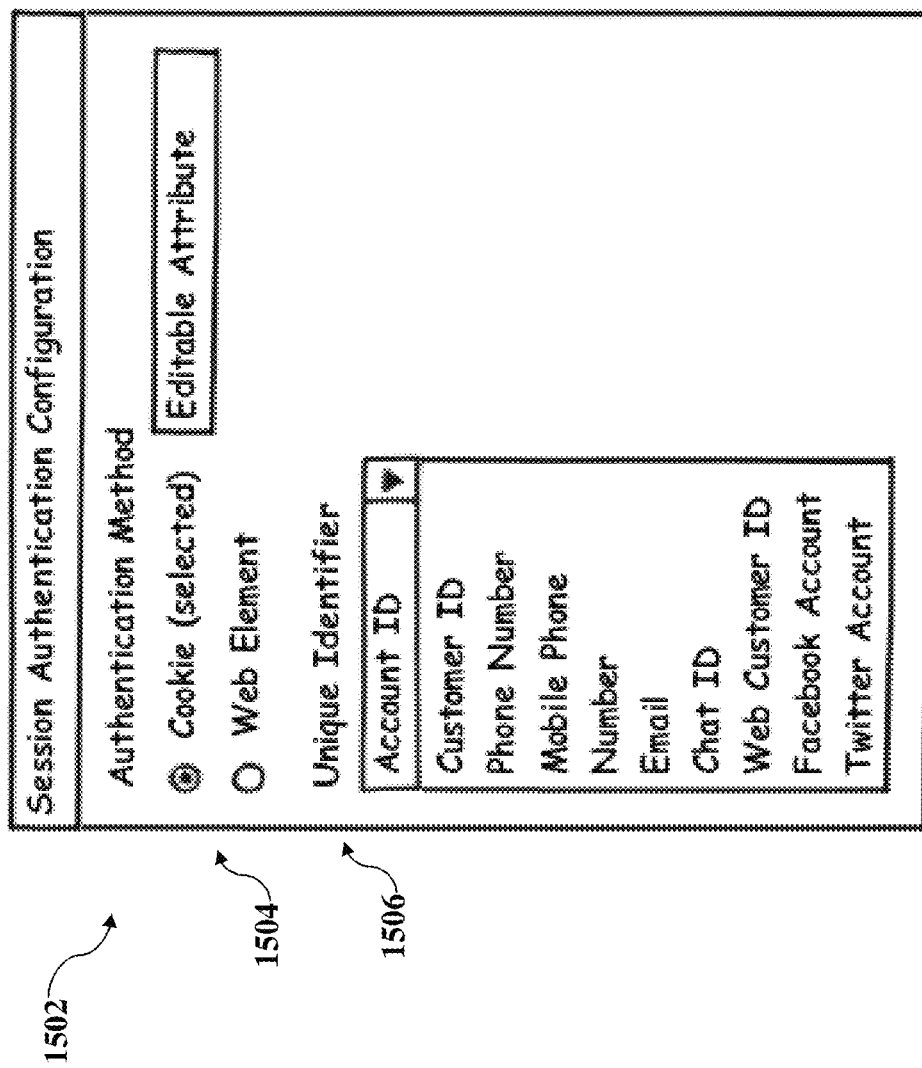
FIG. 15 schematically illustrates an interface for configuring session authentication parameters in accordance with an embodiment of the invention.

Web recording rules in the rule scheduler may include, for example, one or more of the following (other or additional scheduler rules may also be used):

- Web sites (domains) to be identified and recorded, for example, by the web analyzer.
- Web agents to be associated with the interactions (e.g., tenant specific). These may be identified, for example, by the interaction center.
- Web analyzer definition files created by the PO Client.
- Whether or not to create web interactions from web sessions that are not customer-authenticated.
- Whether or not the web interactions include only web pages defined by the PO client or all captured web pages.
- A customer-authentication method 1504 (e.g., cookie or web element) and an associated customer identifier 1506, such as, a unique account ID, customer ID, telephone number, mobile phone number, general number, email, chat ID, web customer ID, account information, etc. Customer-authentication method 1504 and customer identifier 1506 may be set at interface 1502 of FIG. 15.

An agent may be able to configure the web storage rules in a rules manager (e.g., rule manager 426 of FIG. 4). Rules manager may add a new media type ("Web") using a Filter→General definitions in the storage rules filter definition dialog, which may render other media types, call direction definitions, evaluation filter definitions and desktop analytics filter definitions disabled. Storage rules may define which interactions to archive by the storage center. Rules manager may change archive web interactions according to account and customer information filters. In addition, the expressions tab in the storage rules filter definition dialog and the file name mask tab in the storage action dialog may be expanded to include a web sites (domain) attribute.

Web Interaction Playback

Figure 16A:
FIGS. 16A-16B schematically illustrate playback interfaces for viewing user web sessions in accordance with an embodiment of the invention.
Figure 16B:
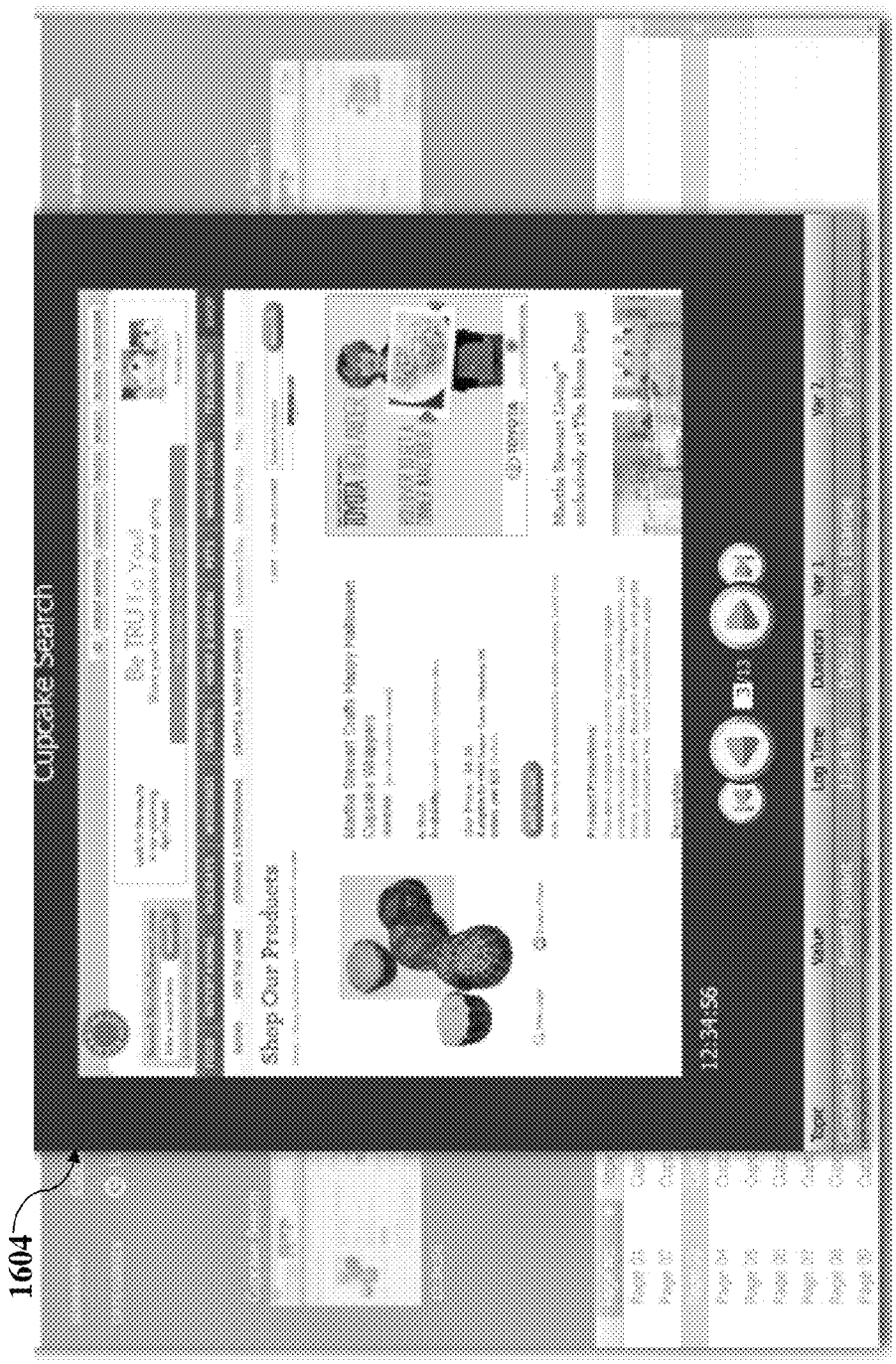

Reference is made to FIGS. 16A-16B, which schematically illustrate playback interfaces 1602-1604 for viewing user web sessions in accordance with an embodiment of the invention. Playback interfaces 1602-1604 may be provided, for example, to an agent at an agent device (e.g., agent device 120 of FIG. 1) to provide customer service to the user.

Playback interface 1602 may provide a simulation of the user's web interactions over one or more sessions, for example, including one or more web page screenshots 1606 browsed by the user, associated web interaction data (e.g., including topic, value of the extracted element, log time/initial browse time, duration/total browse time, and one or more additional variables or criteria), a summary 1610 of the session or web page interaction, and controls 1612, for an agent to operate the session simulation (e.g., to scan or skip forward or backwards through the web pages viewed). Each web page 1606 may include a still image or screenshots of the web page and/or a video of the user interacting with the page, for example, moving a cursor over the page, entering information into data fields, etc. In some embodiments, relevant or target information in the page (e.g., extracted screen elements 1102, 1104 of FIG. 11) may be highlighted or otherwise marked. Web page 1606 may expand from a thumbnail in interface 1602 to a larger, e.g., full-size or mid-size, image or video of the web page in interface 1604.

Web interactions may be provided to a virtual web agent that may represent the organization side of the interaction. In hosted environments, each tenant may have their own web agent for associating web interactions. Tenants (e.g., users providing system capabilities to other users) may only have visibility and access to their own web interactions.

An agent (e.g., at agent device 430 of FIG. 4) may use playback interfaces 1602-1604 to query and play back past web interactions (e.g., from a business analyzer or interactions database). The playback information may be stored in an interaction database (e.g., database 422 of FIG. 4) and/or a capture storage (e.g., storage 414 of FIG. 4 for storing html files). The agent (e.g., agent device 430 of FIG. 4) may use a PO client (e.g., PO client 420 of FIG. 4) to select the specific user session to view. Playback interfaces 1602-1604 may play back past and/or ongoing web interactions, for example, allowing a PO client to send a relevant notification to the agent, including web interaction information. Visibility to ongoing interactions may have a predetermined maximum delay of, for example, 10-30 seconds, from the time the user starts interacting with the website. An agent may be able to play back a past web interaction via a link provided in a real-time guidance message created by the PO client. An agent may able to play back an ongoing web interaction (e.g., by shadow browsing) via a link provided in a real-time guidance message created by the PO client, for example, with a predetermined maximum delay of 5-20 seconds. While playing back ongoing web interactions, the web player may be constantly updated with new user browsing data and may allow showing either all pages browsed by the user or only relevant pages defined in the PO client (e.g., configurable via the web player). An agent may be able to play back a web interaction while browsing the website in real-time to compare system behavior (e.g., by "co-browsing"). The agent may be able to play back multi-website scenarios in one playback window (e.g., by multi-session unified playback).

Other play back interfaces or functionality may be used.

System Specifications

Web interaction capture solutions may include, for example, the following (other or additional solutions may be used):

- Automatically alerting a user of web recording on web sites.
- Identifying channel containment for analyzing the reasons that users switch from one communication channel (e.g., the web) to another (e.g., telephone).
- Giving real-time guidance to agents based on current and past web interactions of the same customer.

Allowing agents to view a customer's session.

Some benefits of web recording solutions include, for example, the following (other or additional benefits may be found):

Non-intrusive server side capture as opposed to the most of the vendors, which perform direct integration and require changes to be done in the web server implementation.

Generic solution, e.g., not oriented to certain vertical or horizontal web sites.

Provides customer resolving and cross channel correlation, which many vendors cannot offer, as they do not have access to the customer repository or to the customer's multi channel interactions.

Web recording systems may support up to N (e.g., N=5) multiple channel interactions performing web recording. Each multi-channel interactions center may be targeted to support multiple web capture servers and handle usage models (e.g., a model of the target amount or rate of traffic that may be monitored by the system, such as, 100,000 user sessions per day). Up to N multi-channel interactions centers may be supported in a linked web recording system configuration. In one example, web recording systems may support customers with up to 5 million page views per day and 200,000 web interactions per day using 85 GB of data per day (e.g., without images). The Multi-channel Interactions Center handling web recording may also be able to handle voice and text recording in conjunction with the web recording, for example, by re-appropriating and reducing web recording capacity or by increasing system capacity. A maximum of one (or more) storage center (e.g., interaction database 422 of FIG. 4) may be used to store all web interactions in the web recording system.

For system security, the user may be able to define, for example, in the PO client, specific screen elements that are not to be extracted from web pages or available for playback. Such screen elements may adhere to privacy standards across industries, such as, financial privacy standards, e.g., payment card industry (PCI) standards, medical information privacy standards, technological privacy standards, etc.

Web recording systems may support one or more of the following resiliency mechanisms (other or additional resiliency mechanisms may also be used):

Multi-channel interactions center cluster.

Multi-channel interactions center geo-cluster.

Storage center redundancy.

Virtualization for multi-channel interactions center.

NIC teaming for the multi-channel interactions center.

Web recording systems may support any usage scenarios when voice interactions are imported using a platform agnostics solution.

Web recording systems may use "certified server" specifications to support the multi-channel interactions center and/or web capture server. The "certified server" specifications may define hardware (HW)/software (SW) specifications including, for example, one or more of the following (other or additional HW/SW specifications may also be used):

HP G6 server or equivalent.

2 Quad Core Nehalem 2.26 GHz processors.

4 GB DDR-3 RAM.

2x4p1GBps NIC.

The multi-channel interactions center may also be supported as a virtual machine.

Web recording capabilities may be integrated into or licensed to other systems, for example, using a licensing manager software or plug-in, such as, KeyGen. A "Web Recording" option may be added (e.g., under application server license→rule mngr→scheduler). A "Web Analytics" option may be added (e.g., under application server license→interaction analytics→multichannel). In some embodiments, a system administrator user interface related to web recording may be hidden if the web recording capability is not licensed.

For deployment, a site readiness tool may verify readiness for web capture server installation and the deployment manager may deploy both the multi-channel interactions centers and the web capture servers. For maintenance, both the multi-channel interactions centers and the web capture servers may be monitored by a monitoring tool or sentinel. A log collector may collect log entries of the web analyzer and web capture server.

In alternative or additional embodiments, web recording systems may include features, for example, as follows:

Capture web interactions via client-side tagging.

Provide HTTP secure (HTTPS) decrypt devices, which may be deployed on the customer websites, capture HTTPS packets, decrypt them using private keys and send the decrypted packets to web capture servers.

Configure the IPS/Probe solution via a system administrator and not locally.

Capture Ajax based controls and relate them to associated web interactions.

Encrypt web interactions as part of the system-wide media encryption process.

Redundancy solution in which multiple probes capture the same or overlapping web traffic yet only one web interaction is created to reduce redundancy.

Real-Time Guidance

An agent may provide a customer with real-time guidance based on the user's past or current web interactions. The real-time guidance may notify the agent that the user has interacted with a web server in the past or is currently interacting with the web server in the present. The real-time guidance message may offer recommendations for agent to communicate to the user, for example, including up-sell or cross-sell options. The real-time guidance message may also offer to play back past web interactions and/or shadow-browse current web interactions. Real-time recommendations and/or playback may be provided, for example, while the contact center agent is communicating with said user or during or concurrently with the customer interactions or at a small time delay thereafter (e.g., on the order or a few second or milliseconds). The agent may be fully automated (e.g., an automated pre-recorded voice response, web message, SMS message, pop-up window or email system) or semi-automated (e.g., an automated guide prompting a live agent to communicate).

Figure 17:
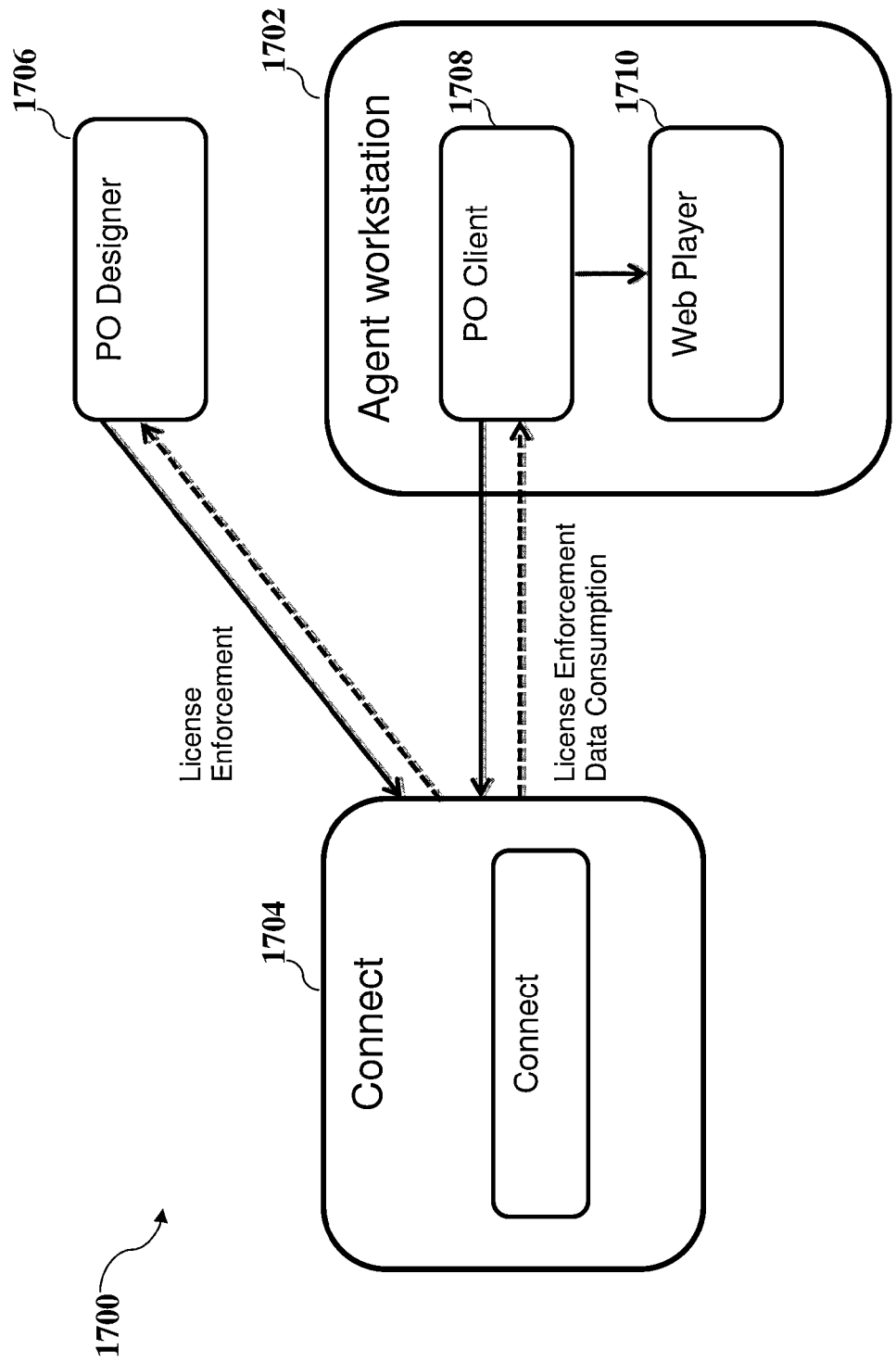
FIG. 17 schematically illustrates a system for providing real-time guidance in accordance with an embodiment of the invention.

Reference is made to FIG. 17, which schematically illustrates a system 1700 for providing real-time guidance in accordance with an embodiment of the invention. Real-time guidance functionality may be provided, for example, via FIG. 1 using web capture server 110, analysis server 116, agent device 120, and interactions center 124 and/or their processors 112, 132, 136 and 142.

System 1700 includes an agent workstation 1702 (e.g., agent device 120 FIG. 1), a PO client 1704 (e.g., PO client 620 of FIG. 6) and a connection server 1704 (e.g., connection server 624 of FIG. 6). Agent workstation 1702 may use connection server 1704 to connect to PO designer 1706 via a PO client 1708. PO designer 1706 may be operated by an agent, administrator, or product developer (e.g., at agent device 120, analysis server 116 and/or interaction center 124 of FIG. 1).

PO client 1708 may transfer data in real-time from user computers to agent workstation 1702. The data may be transferred securely, for example, using license enforcement. Agent workstation 1702 may include a web player 1710 to play images or video of the user's current session. Agent workstation 1702 may include a playback interface (e.g., playback interface 1602-1604 of FIGS. 16A and 16B) to operate web player 1710.

PO designer 1706 may define, for example, one or more of the following parameters (other or additional parameters may also be defined):
- Website elements for analyzing:
  - Website
  - Web pages for data extraction.
- Web business entities.
- Web screen elements.
  - Customer identifier.
- Real-time guidance rules.

PO client 1708 may execute, for example, one or more of the following operations (other or additional operations may also be executed):
- Use web analyzer data extraction in real-time, for example, to issue real time guidance messages to agent workstation 1702.
- Evaluate real-time guidance rules based on the web analyzer data extraction.
- Launch web player 1710.

Connection server 1704 may return, for example, one or more of the following web session data to PO client 1708 upon request (other or additional session data may also be returned):
- Web sessions includes:
  - Ongoing session of the customer.
  - Past sessions of the customer.
- Web session data includes:
  - Session dates, duration, categories
  - Pages and their extracted values Web player 1710 (e.g., launched at agent device 120 of FIG. 1) may display, for example, the following (other or additional elements may also be displayed):
- Session pages.
- Session metadata.
- Page web display.
- Page Summary.

Figure 29A:
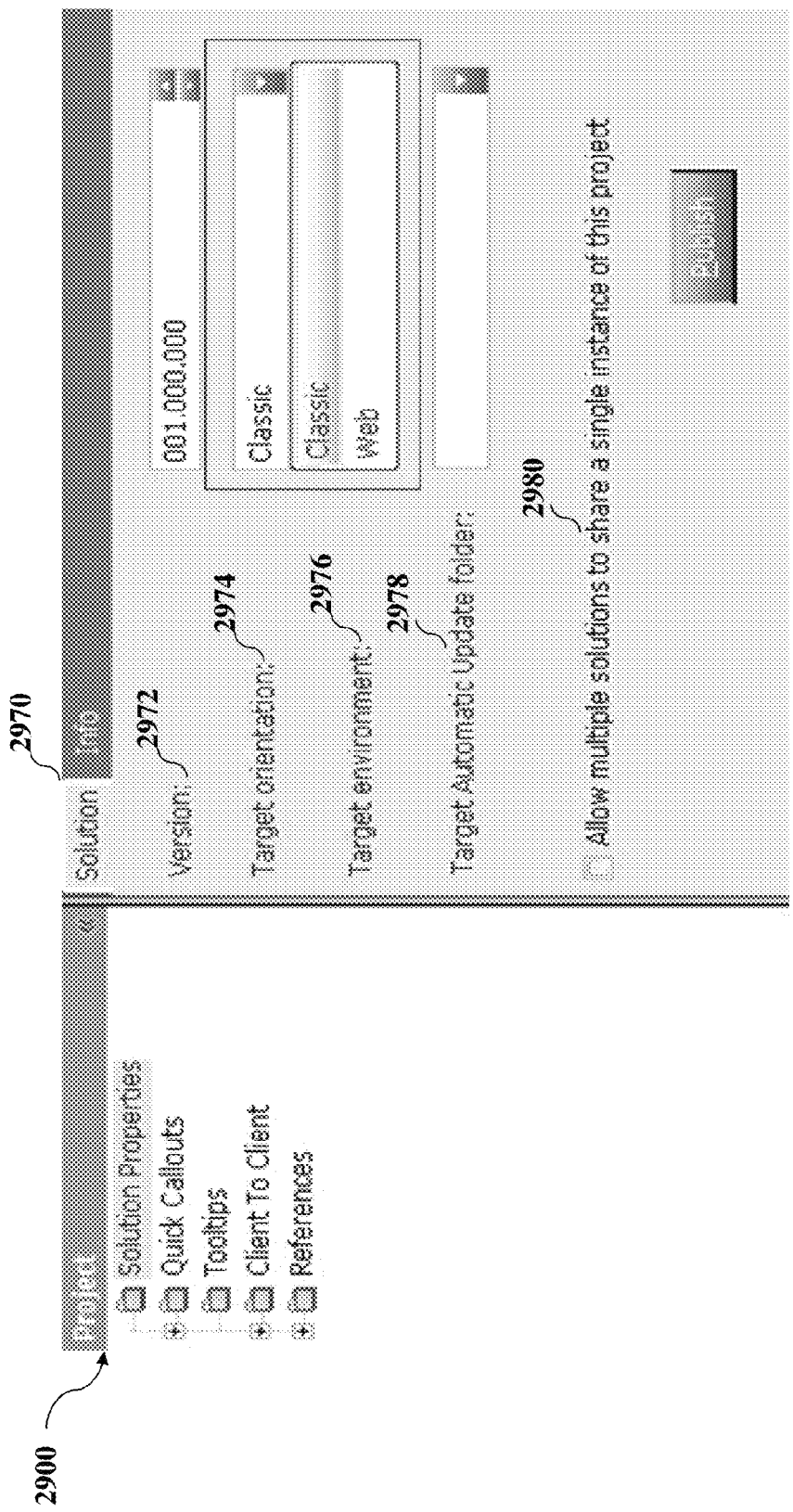
FIGS. 29A-29X schematically illustrate interfaces for configuring web analytics solutions in accordance with an embodiment of the invention.
Figure 29B:
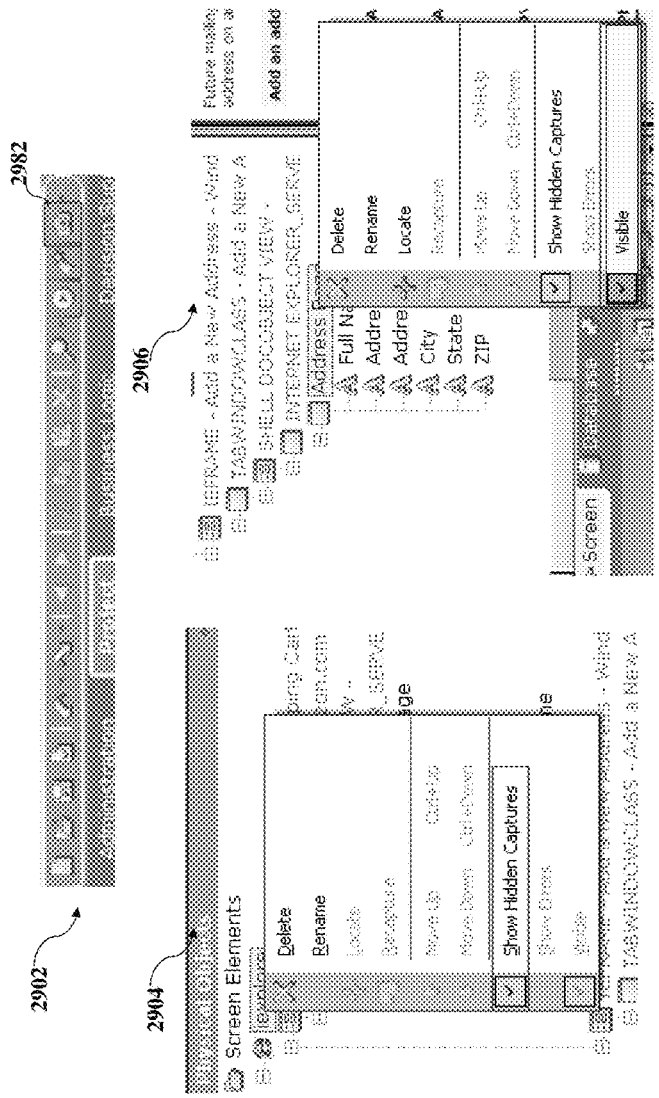
Figure 29C:
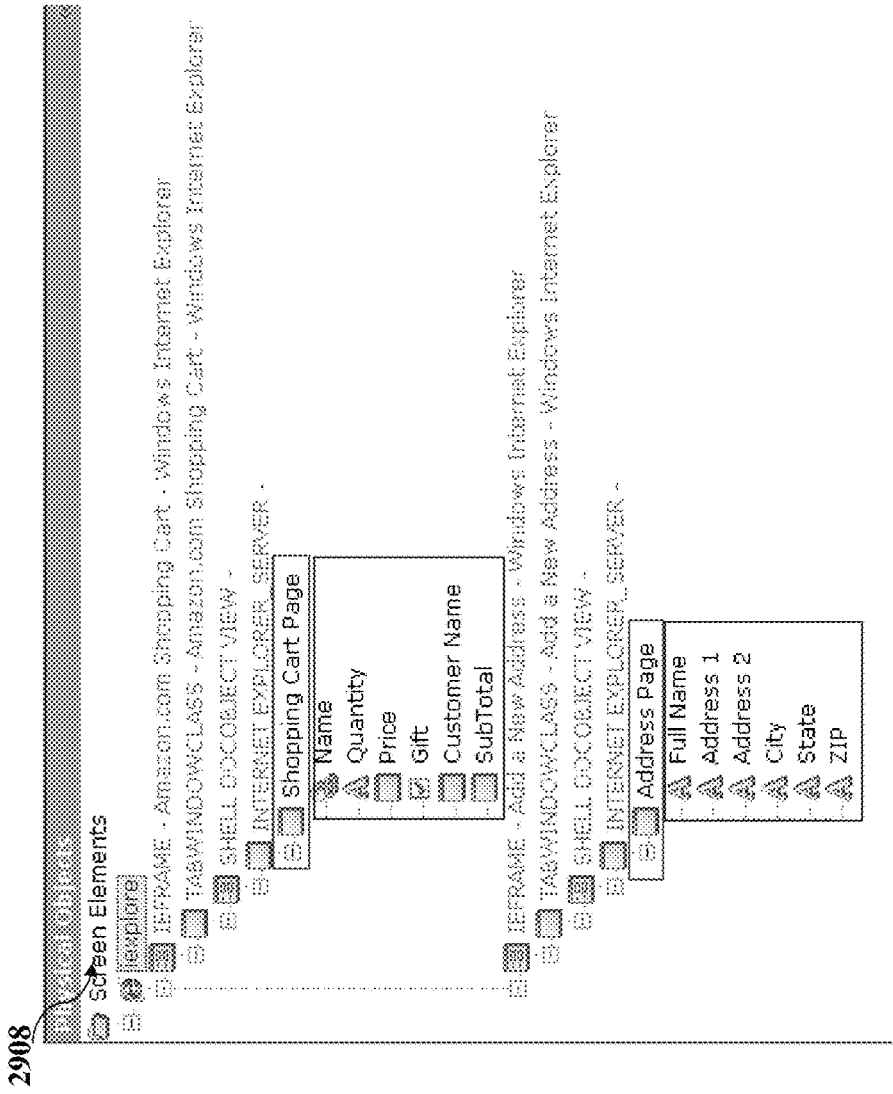
Figure 29D:
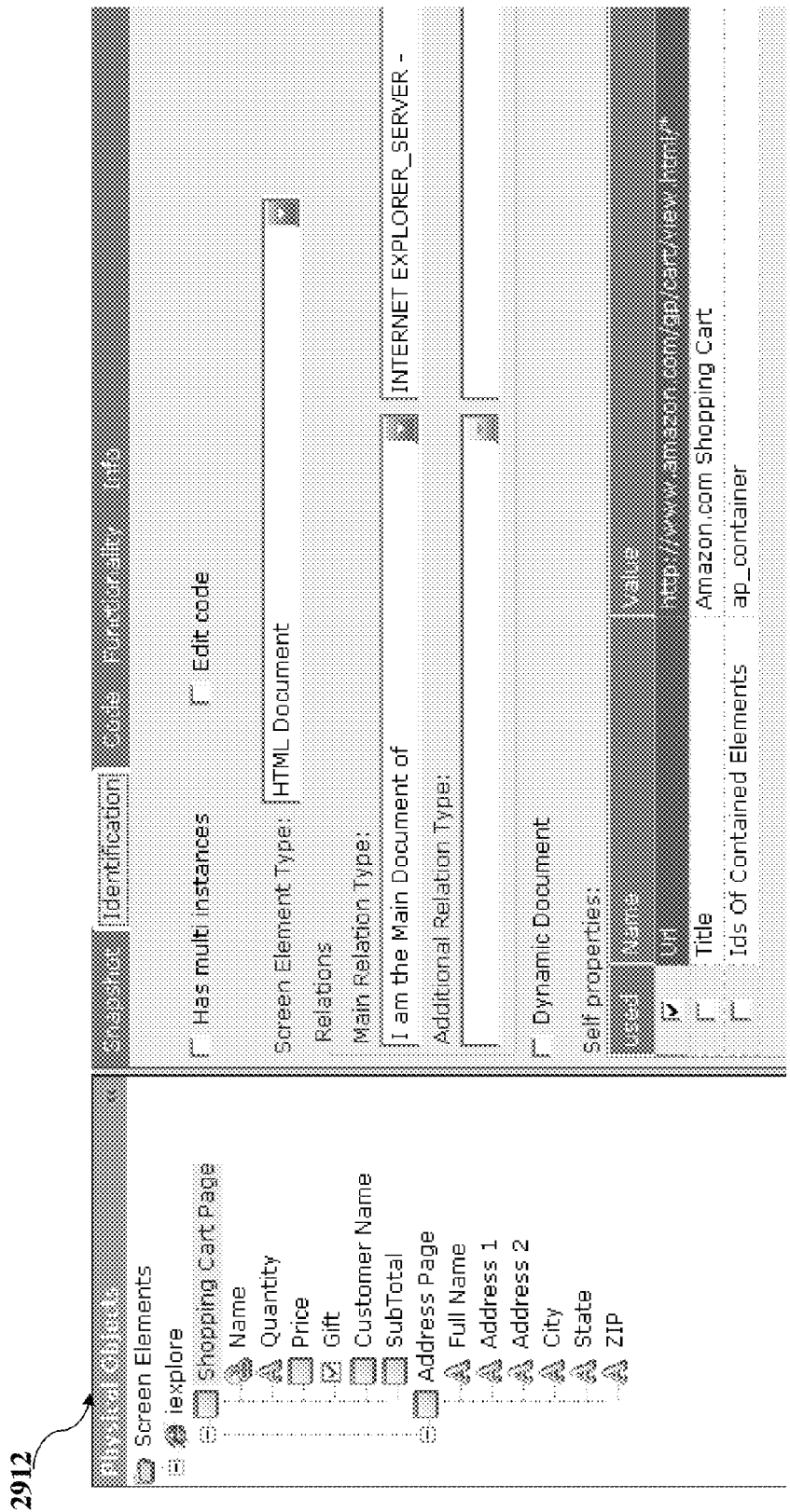
Figure 29E:
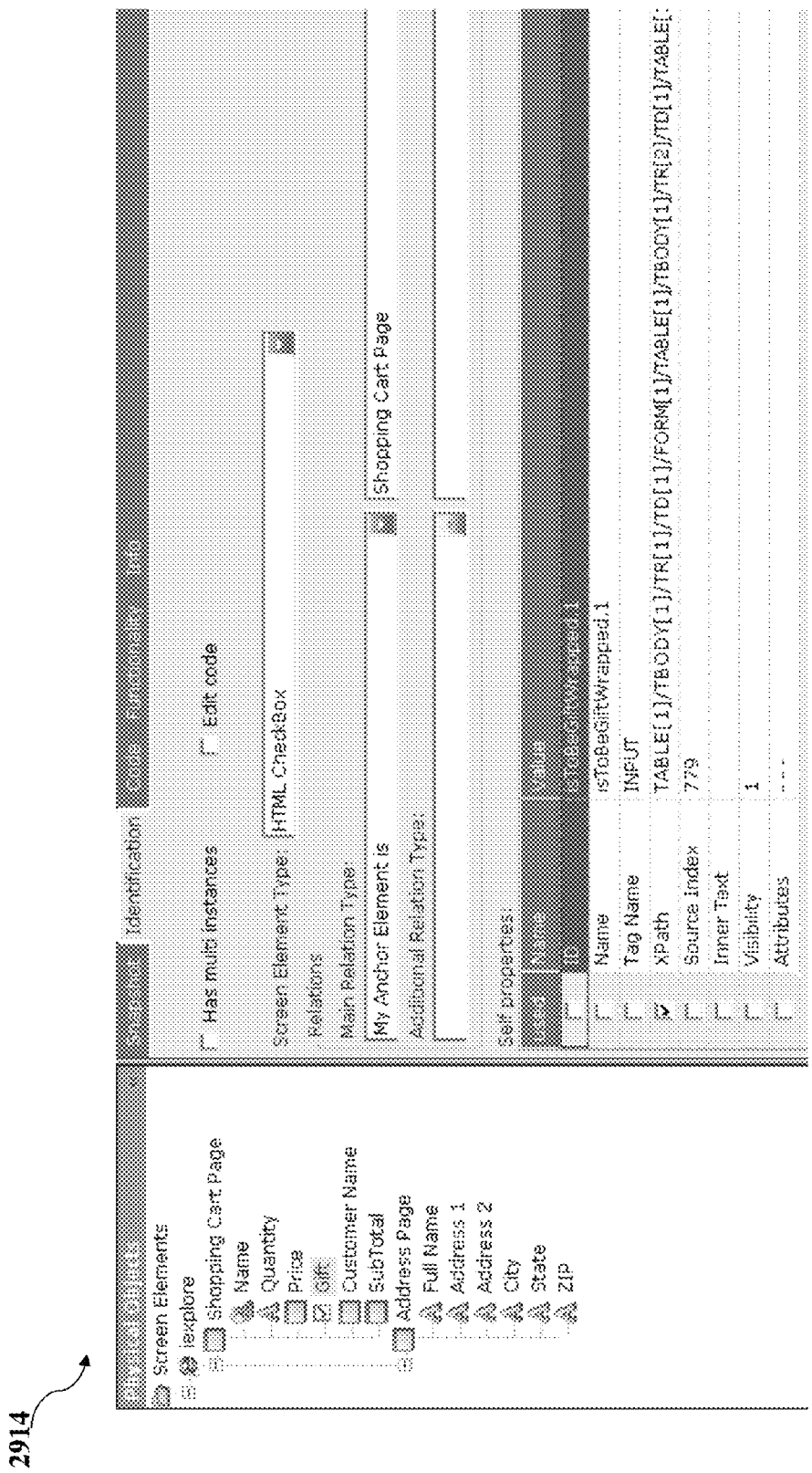
Figure 29G:
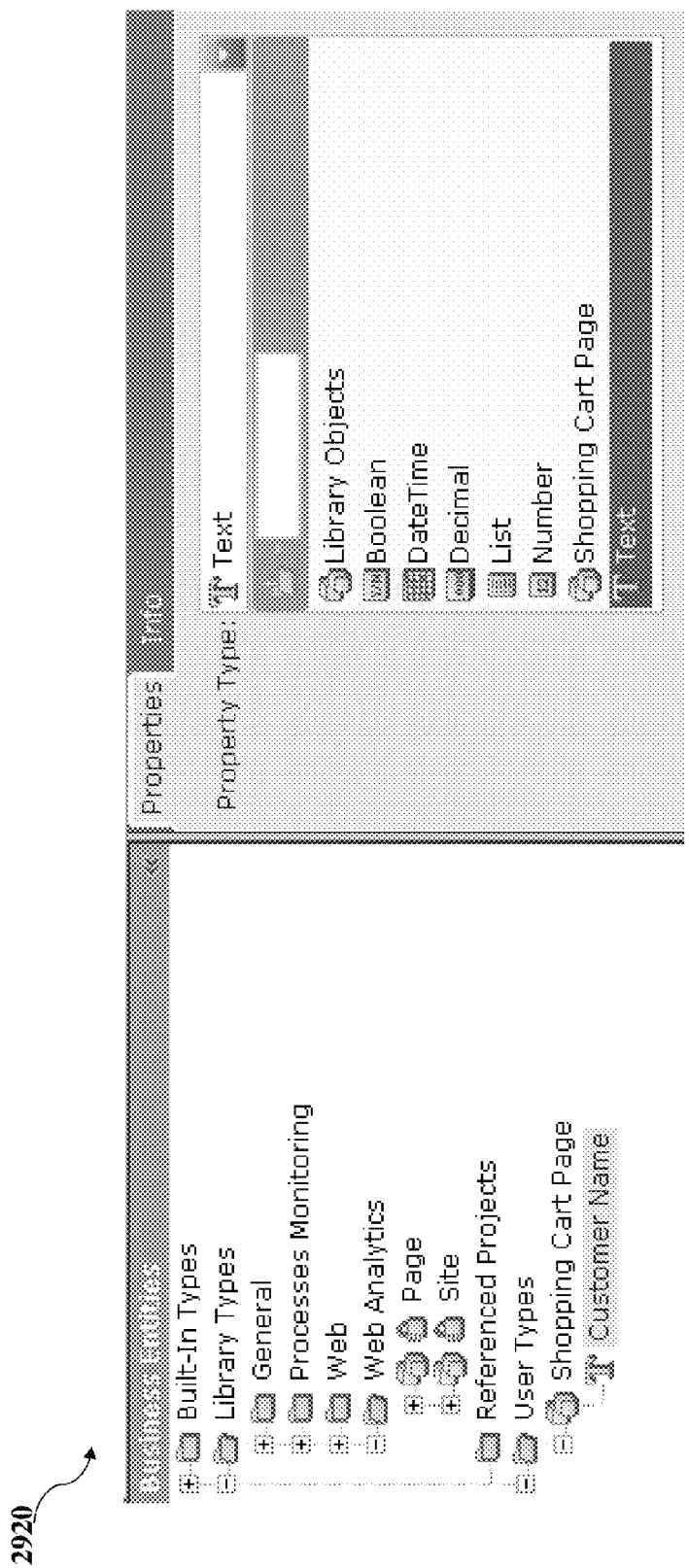
Figure 29H:
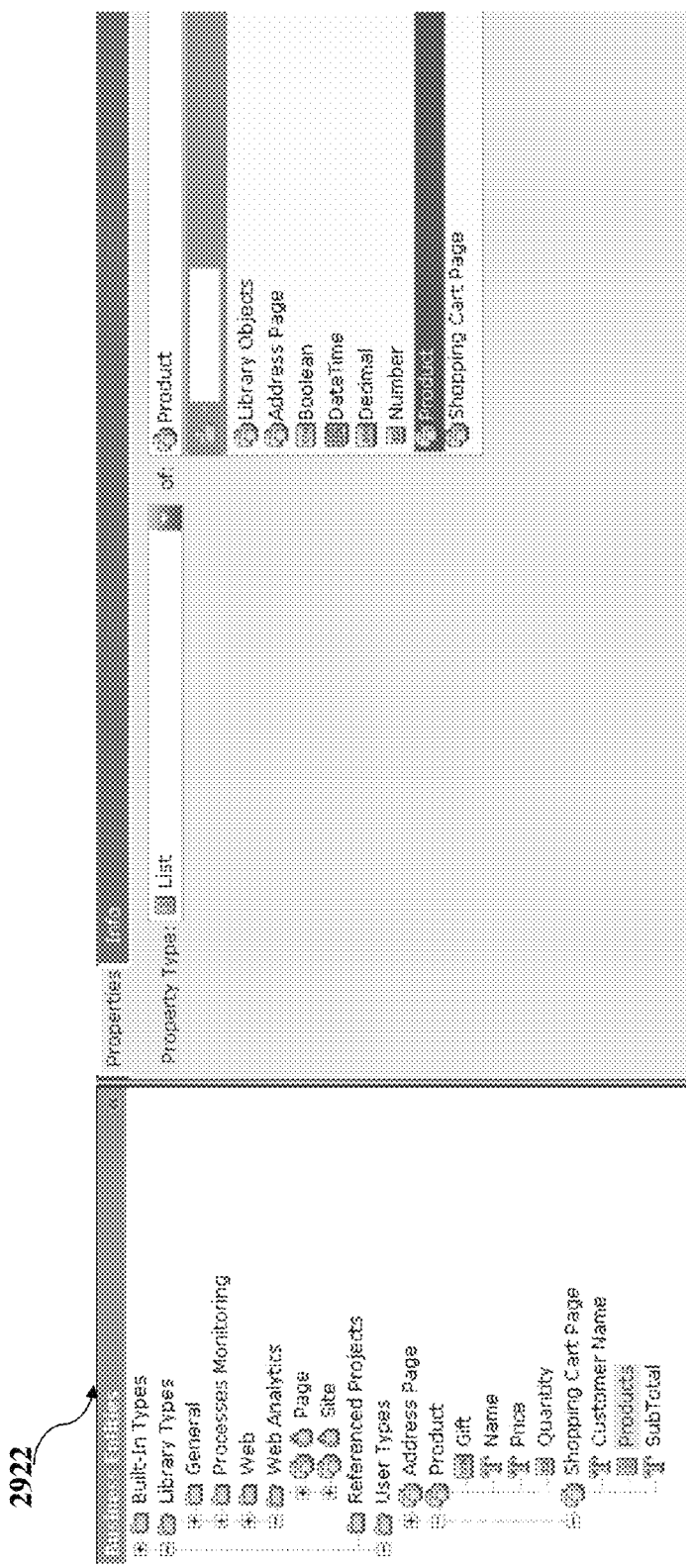
Figure 29I:
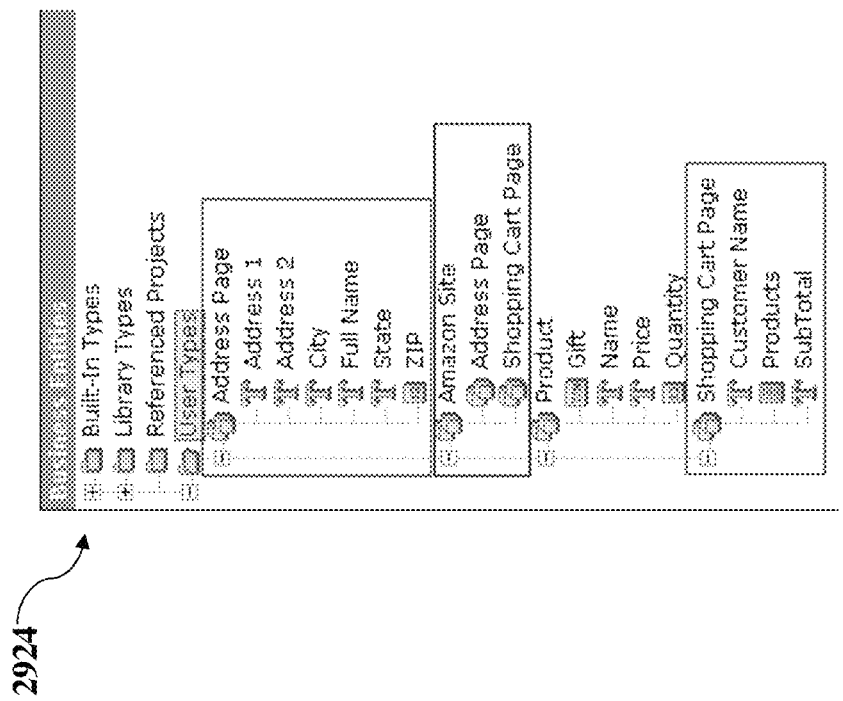
Figure 29J:
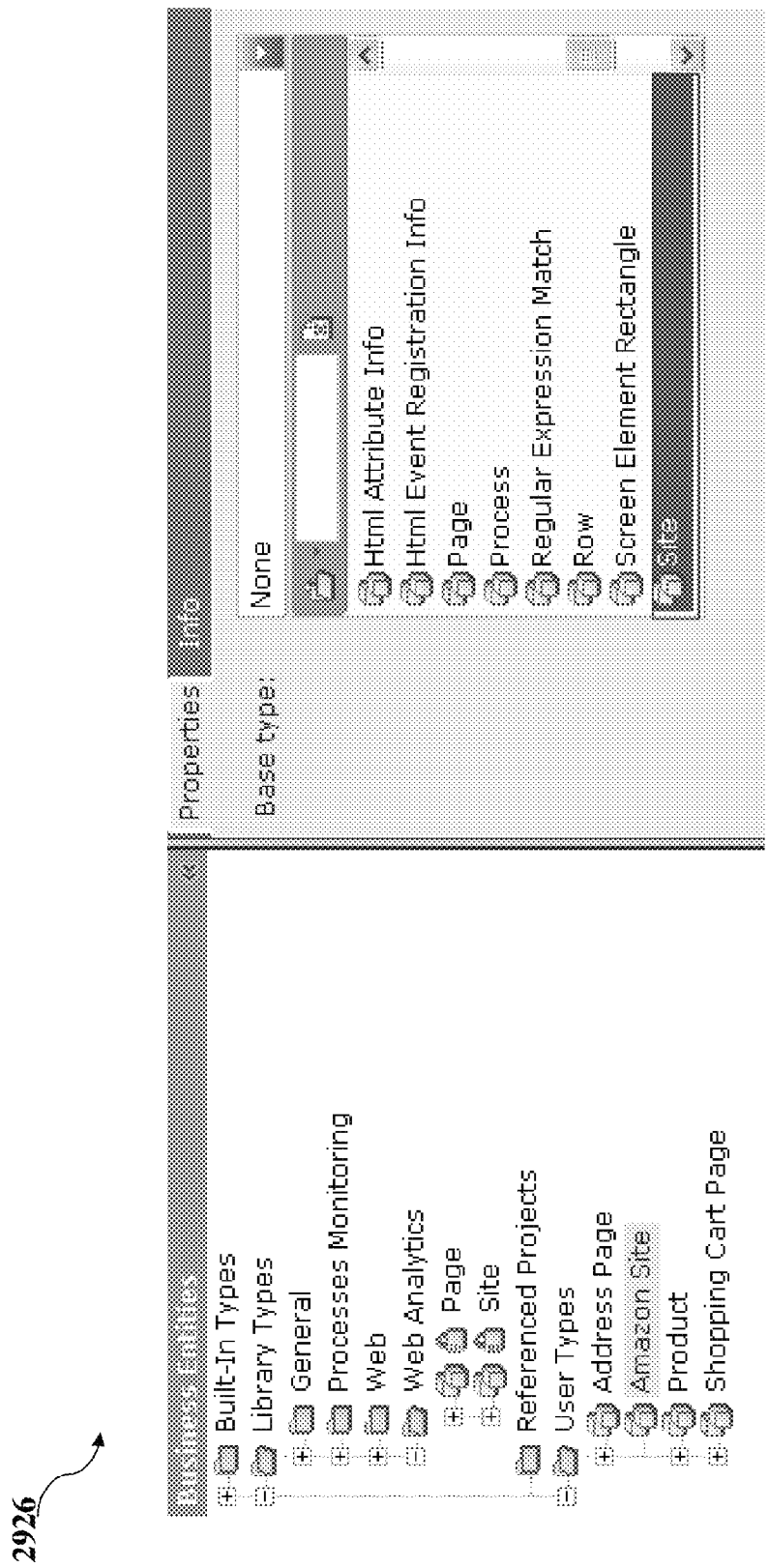
Figure 29K:
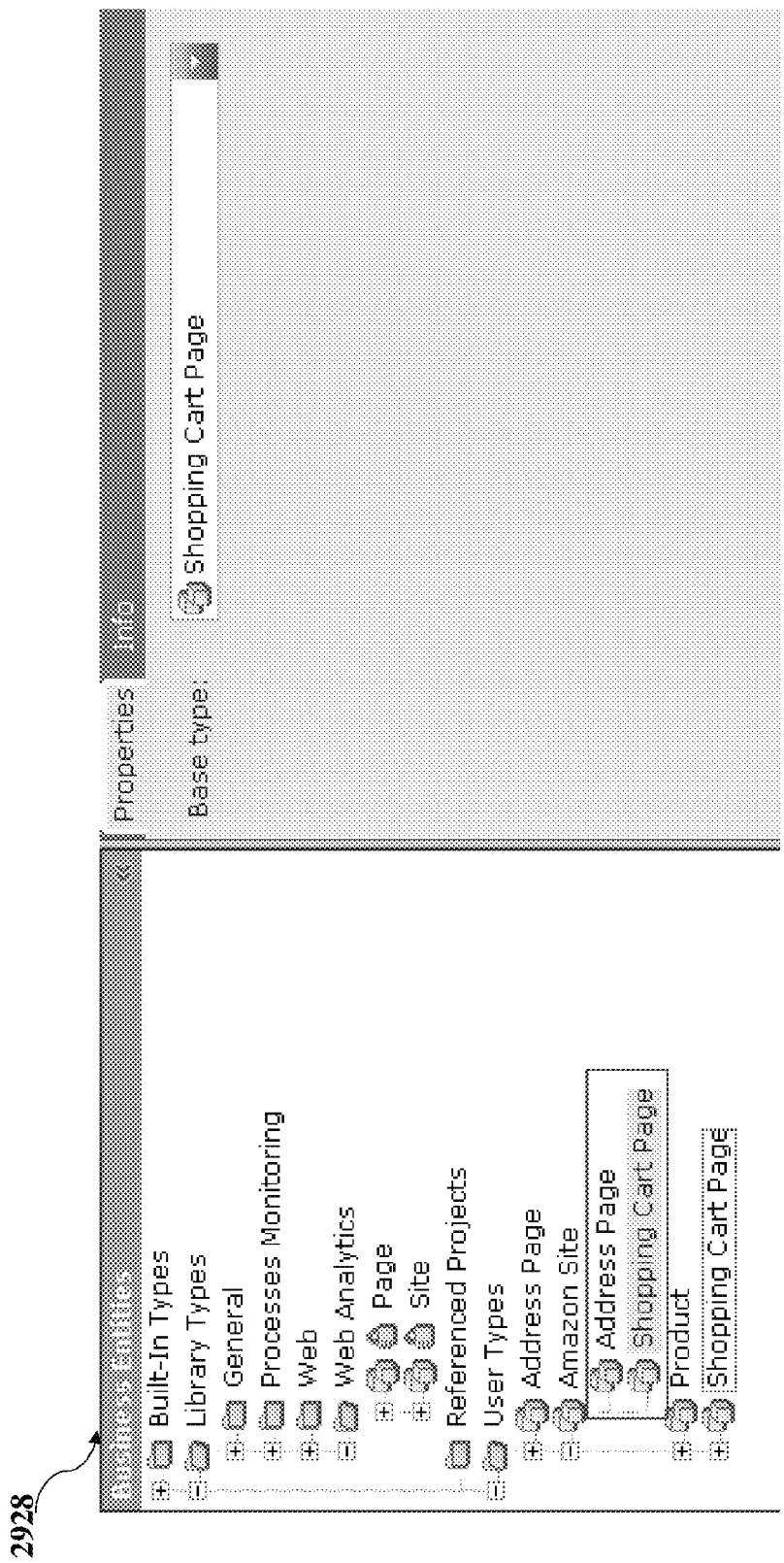
Figure 29L:
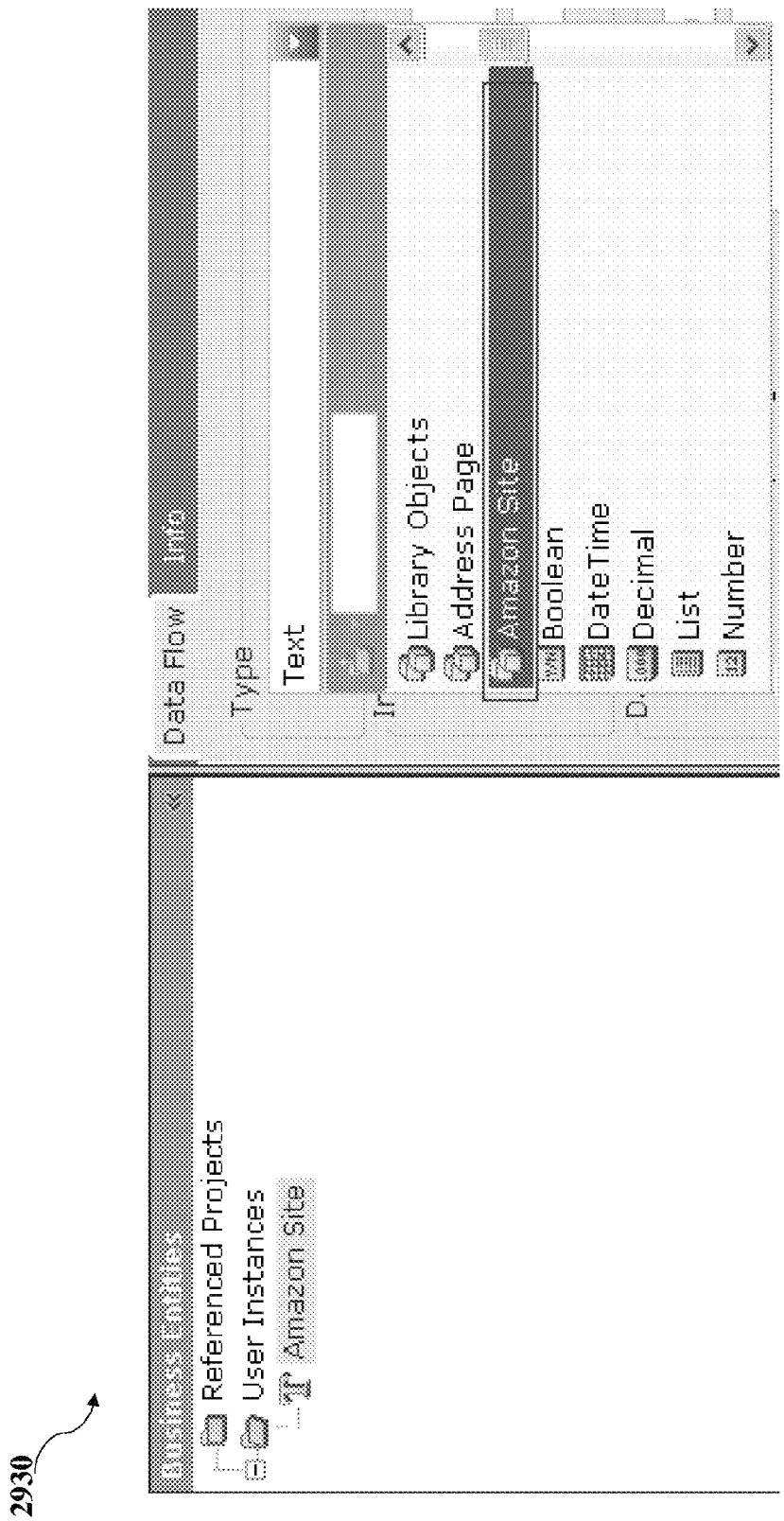
Figure 29M:
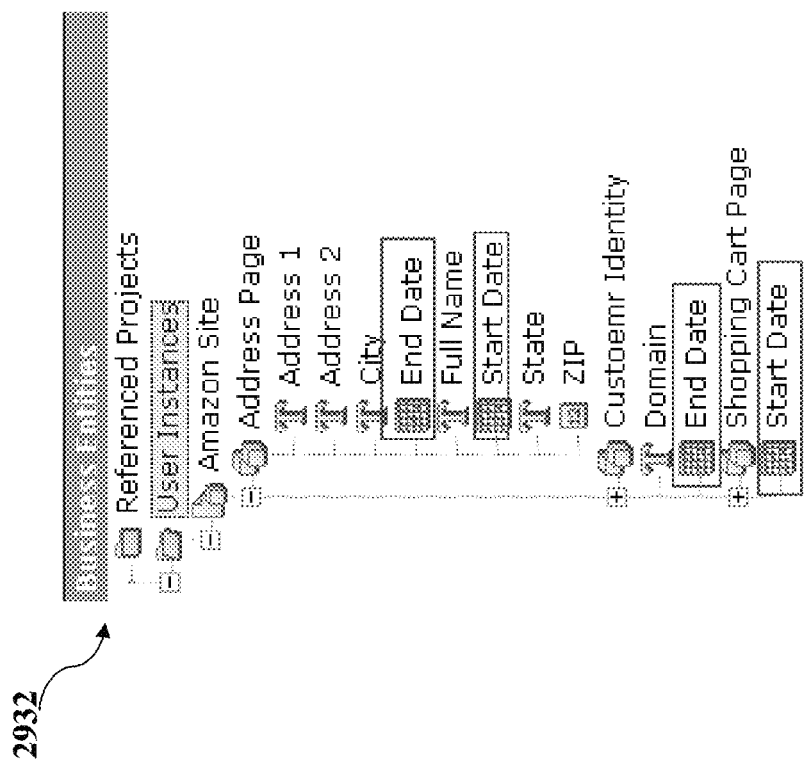
Figure 29N:
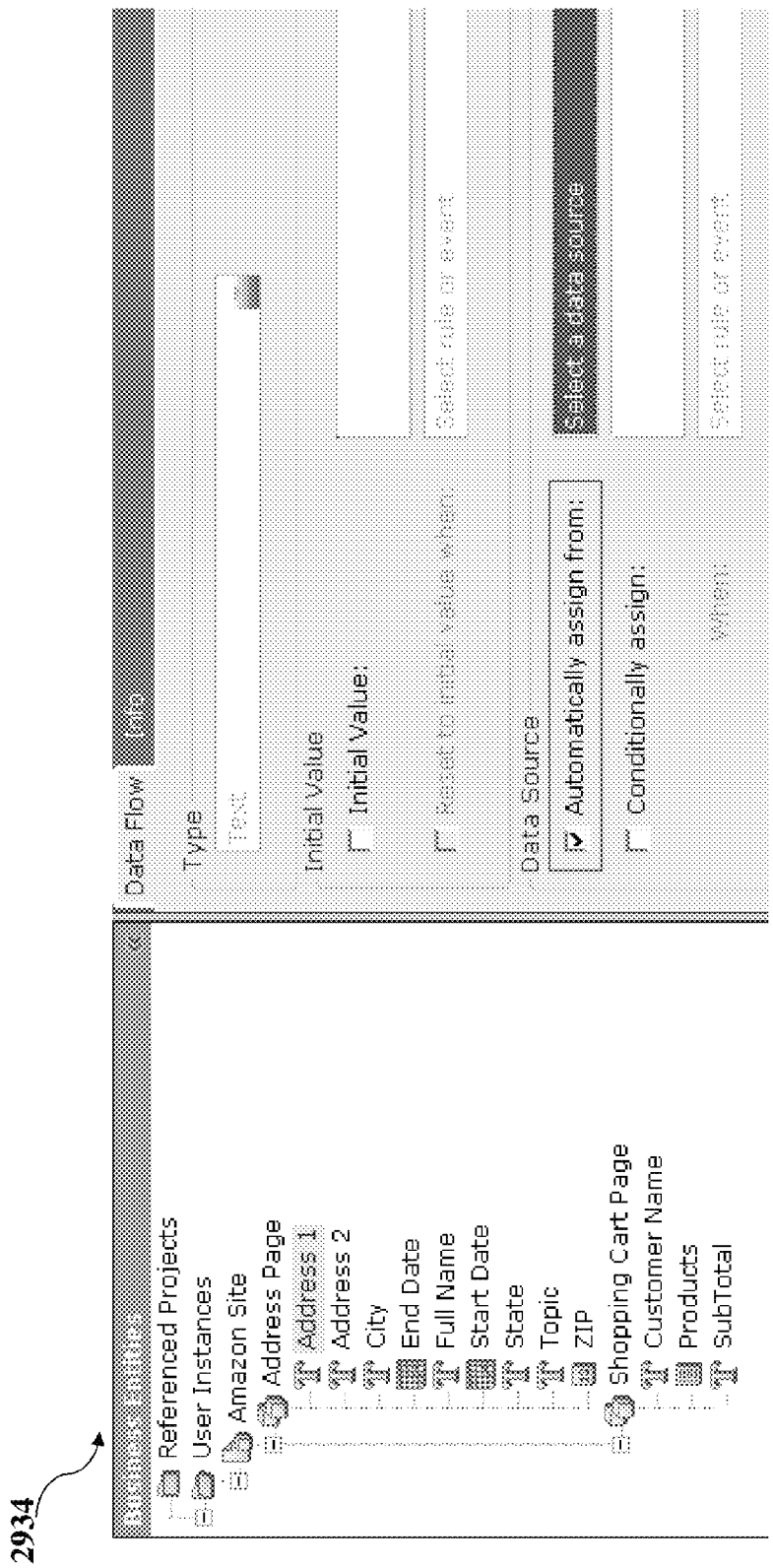
Figure 29O:
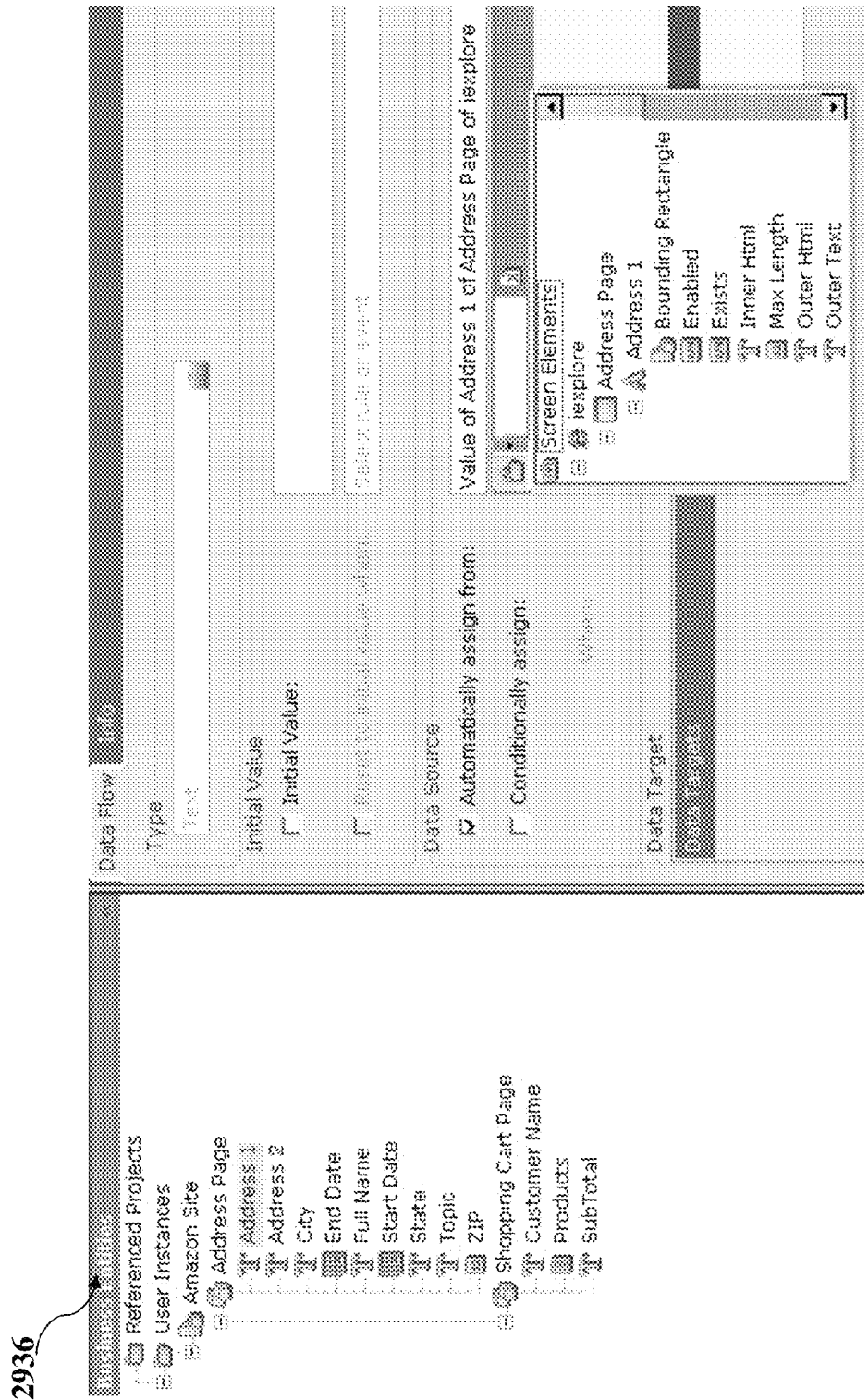
Figure 29P:
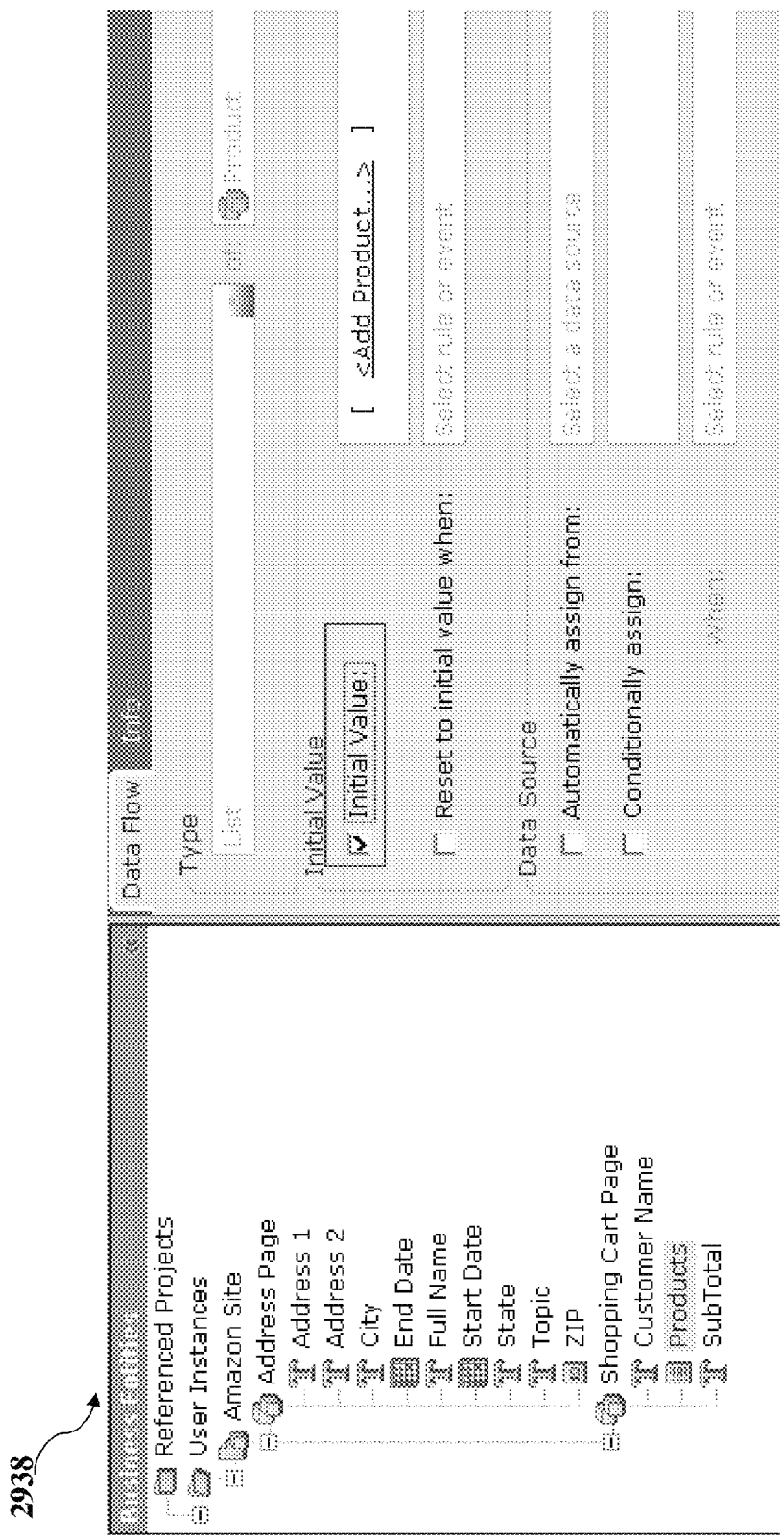
Figure 29Q:
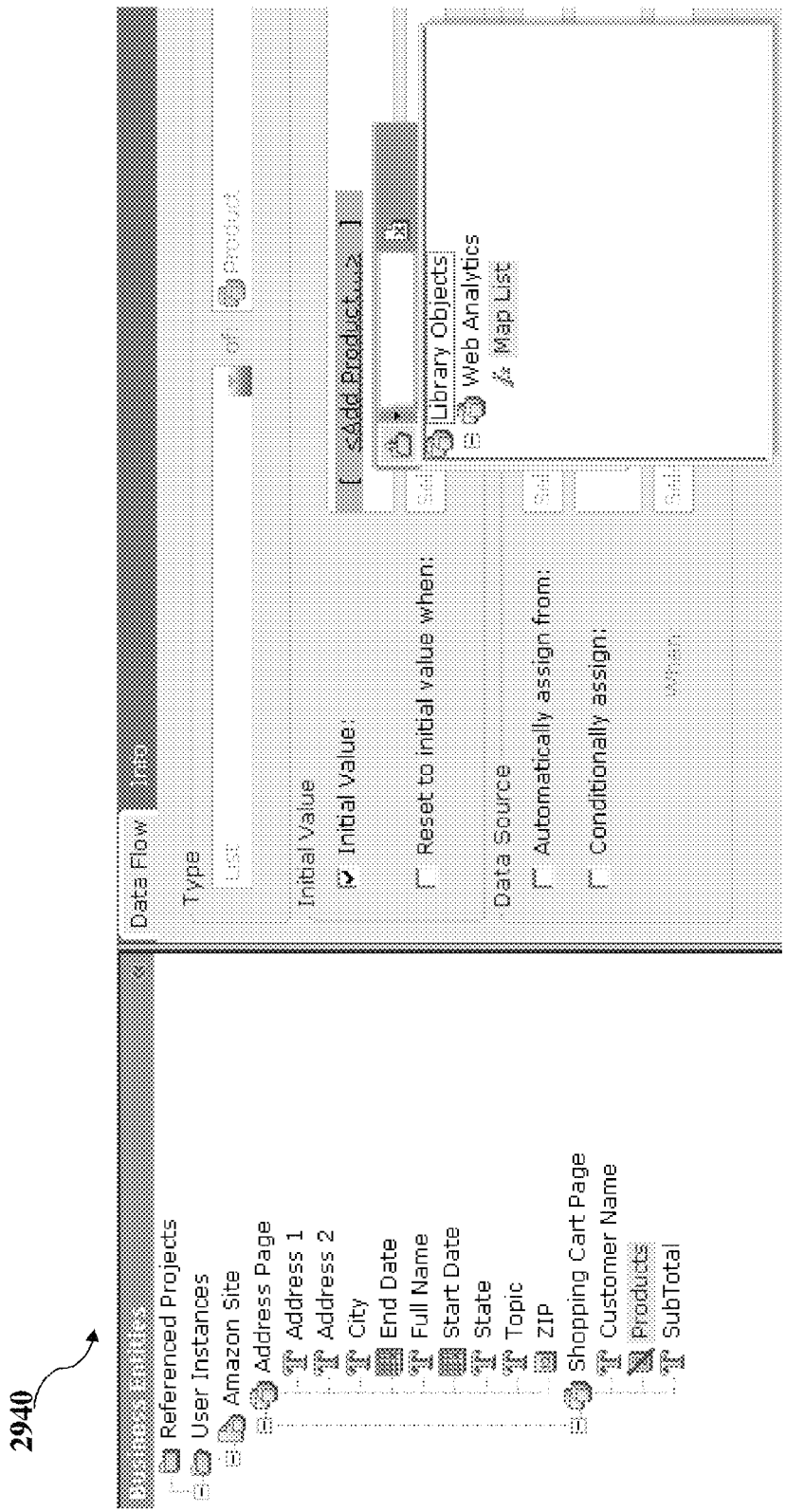
Figure 29R:
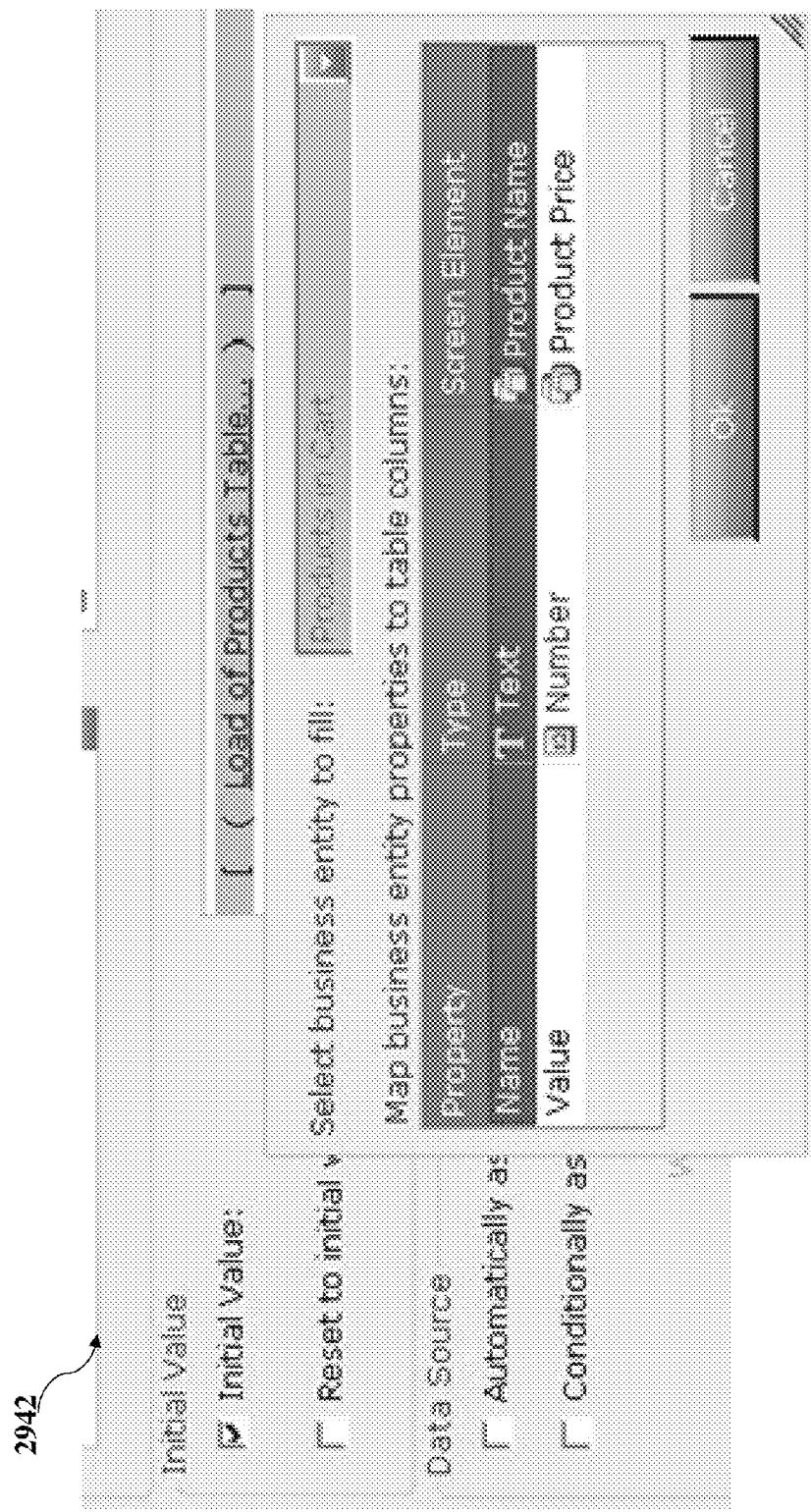
Figure 29S:
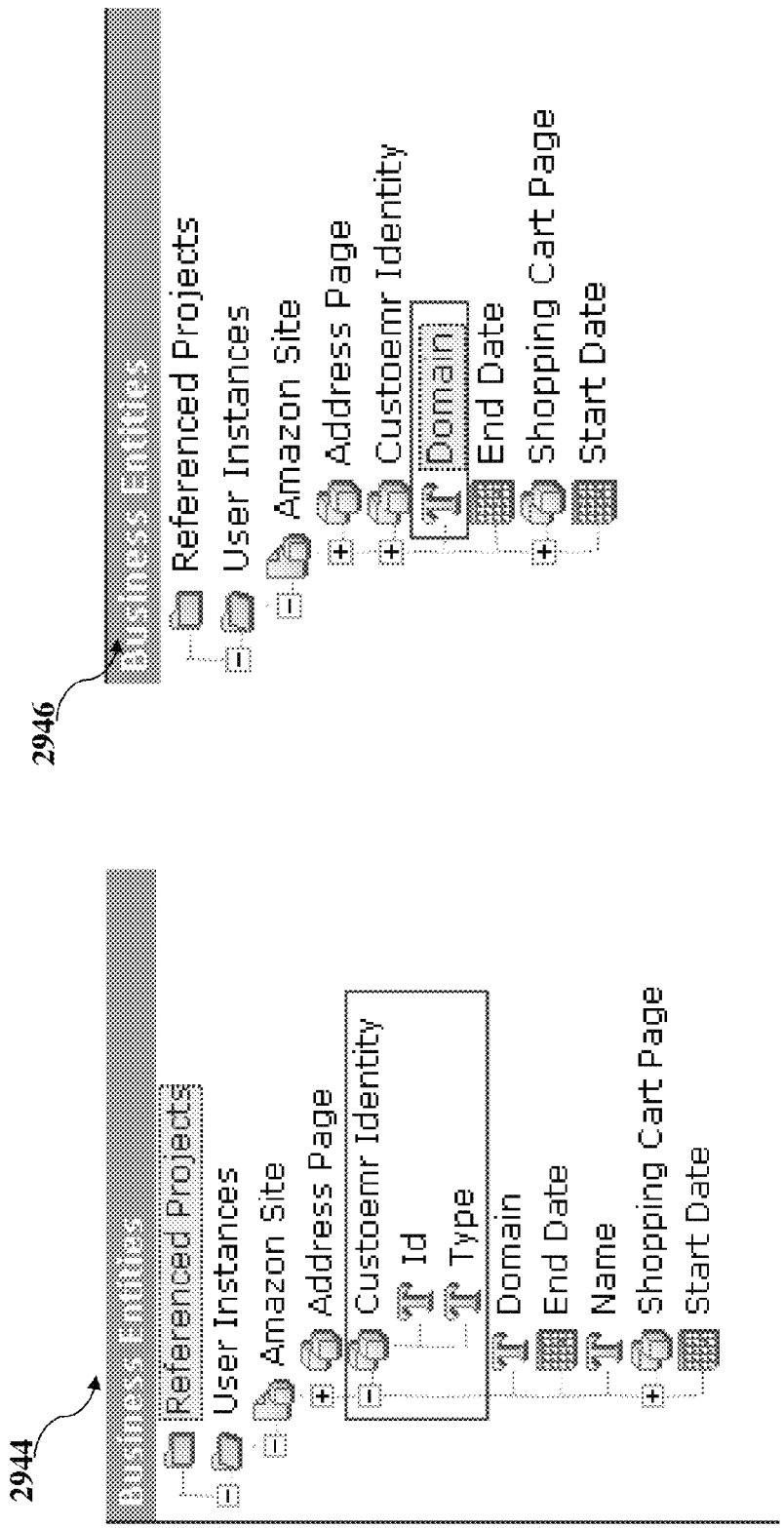
Figure 29T:
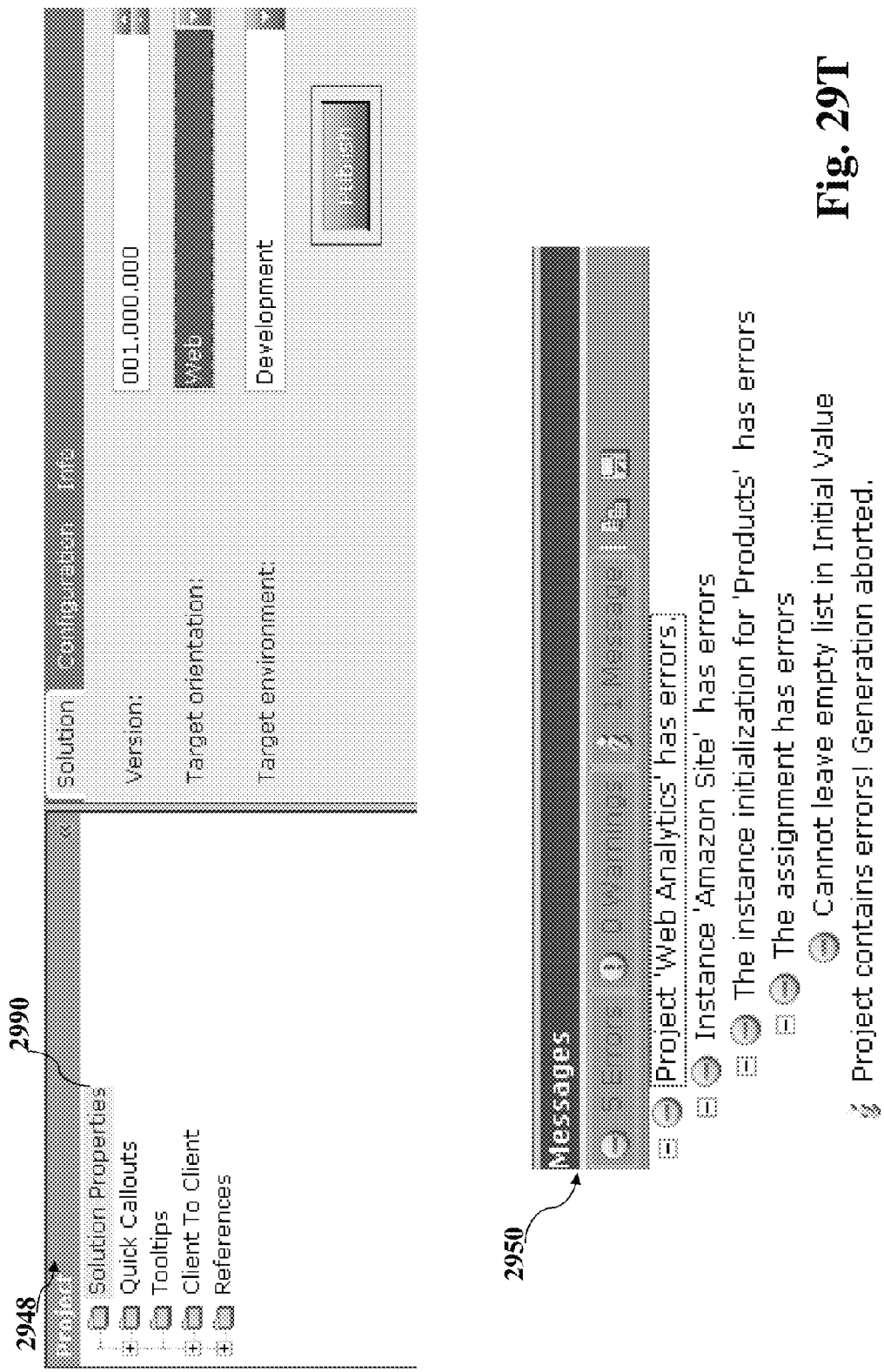
Figure 29U:
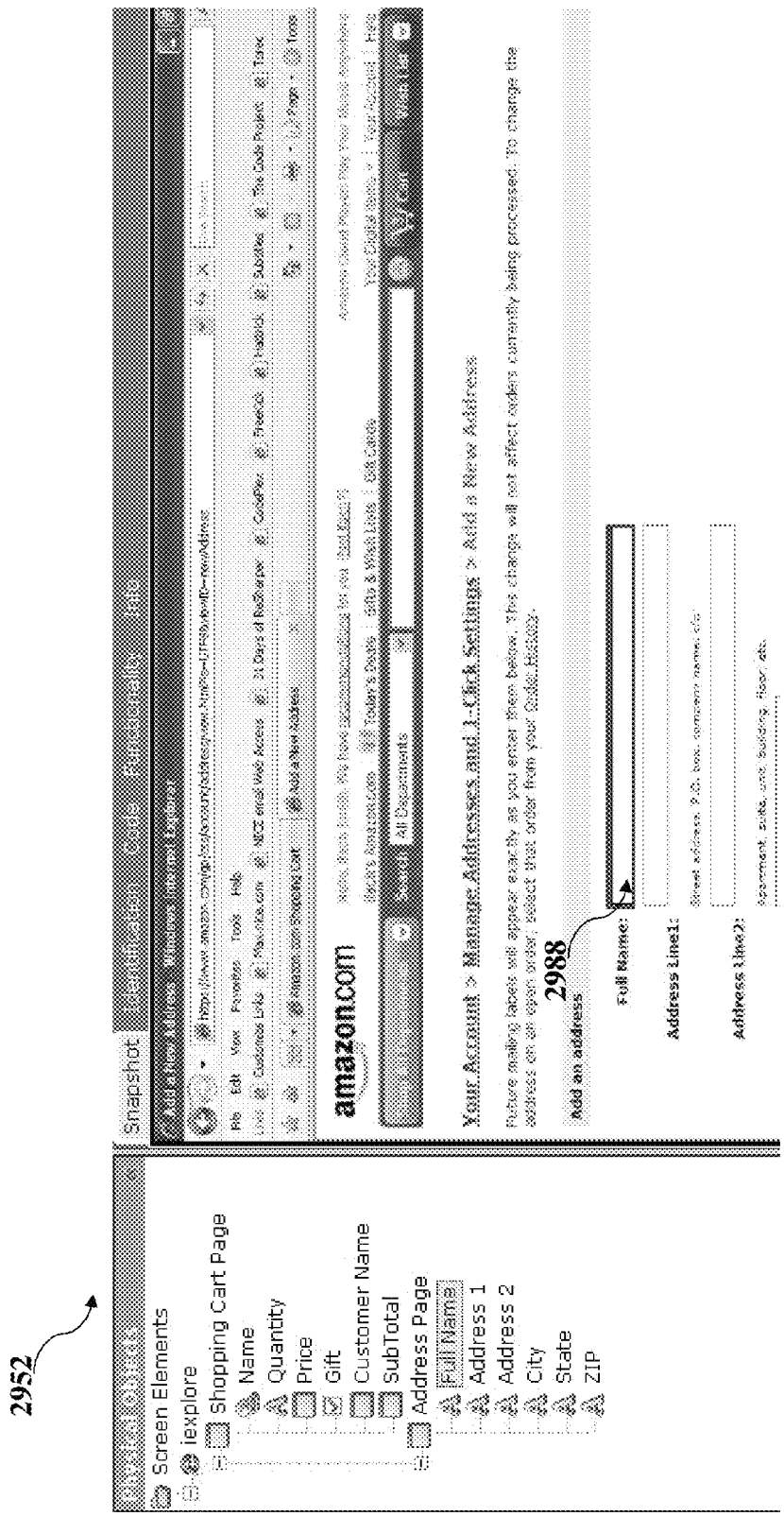
Figure 29V:
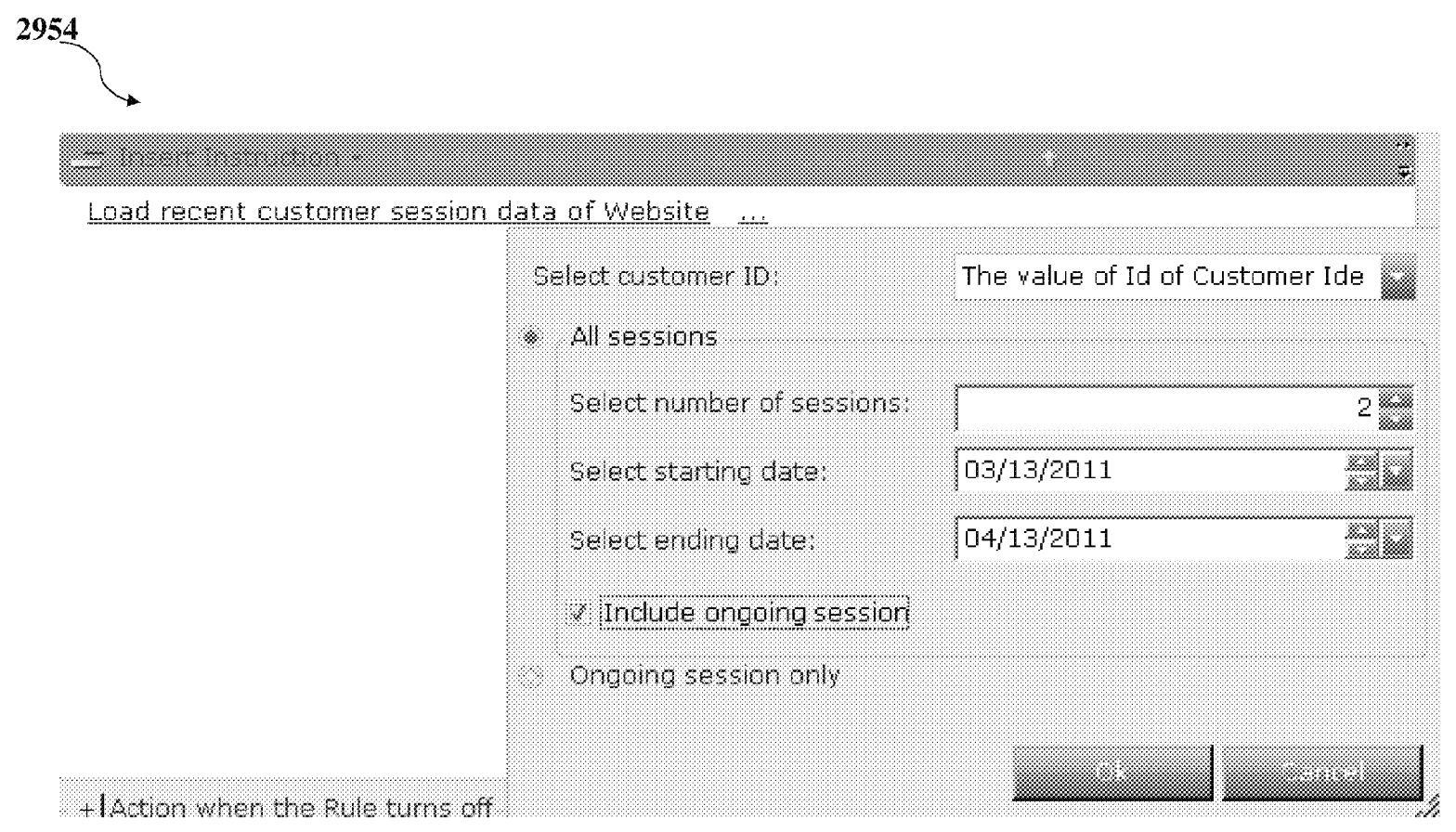
Figure 29W:
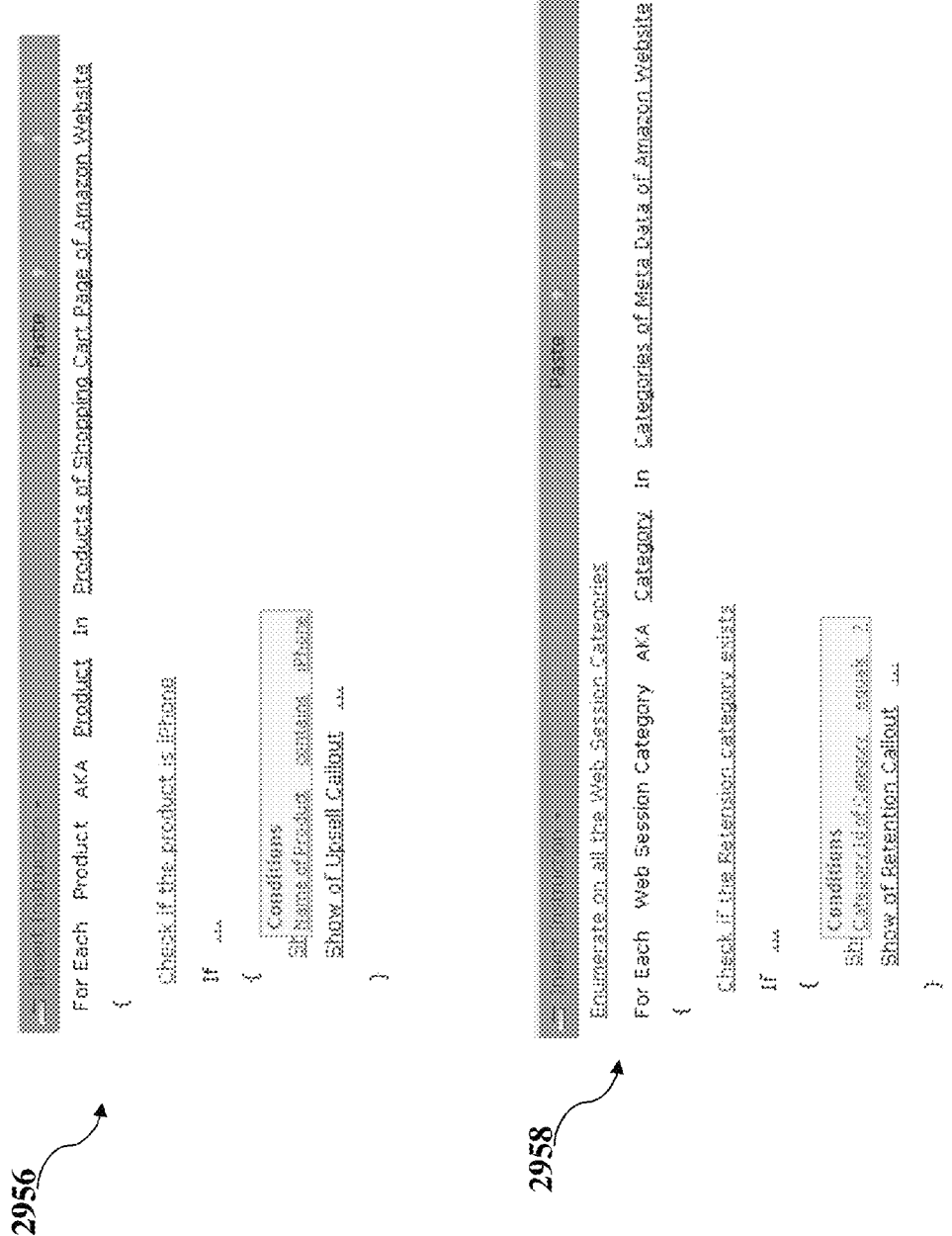
Figure 29X:
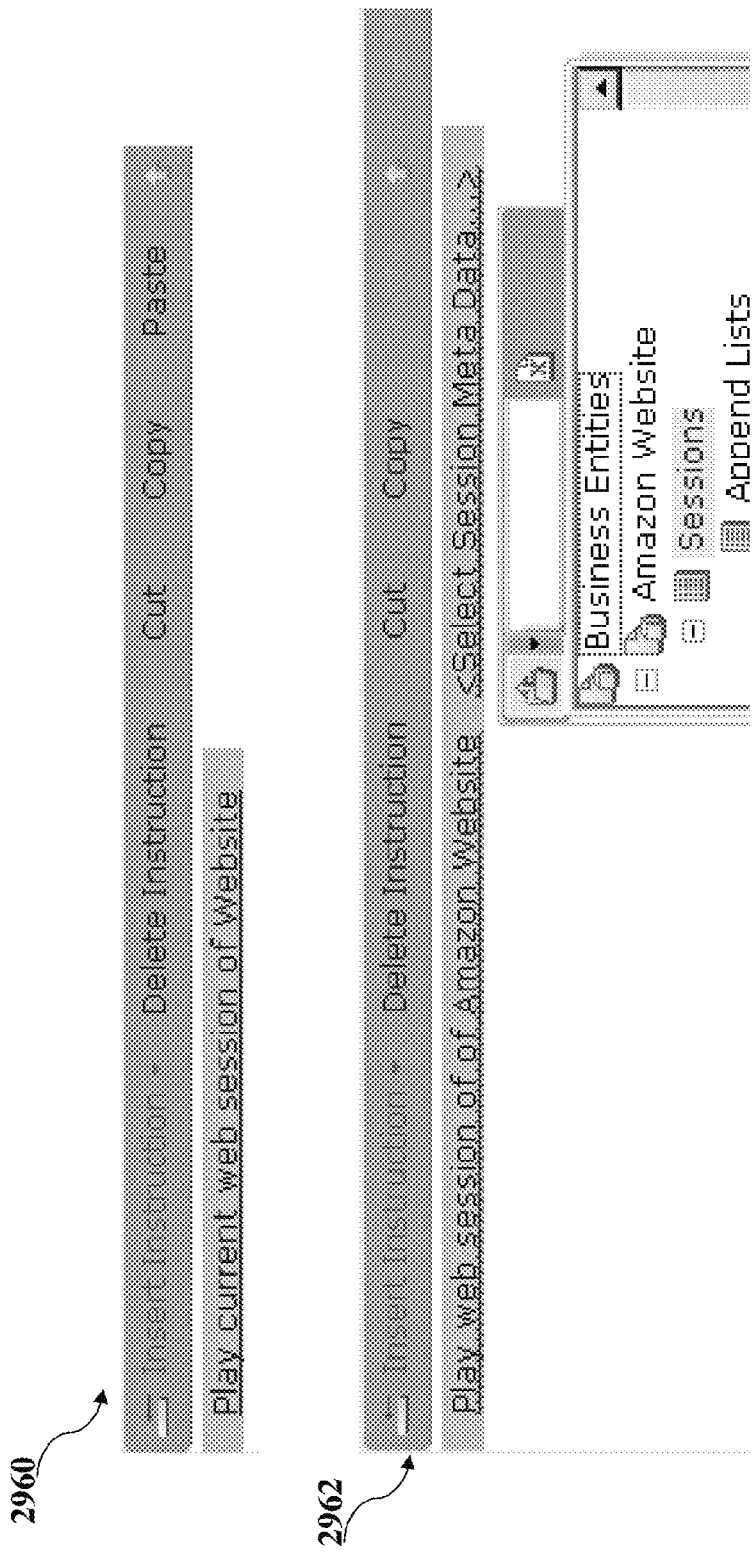

In some embodiments, a system administrator, product designer or company agent (e.g., agent device 120 or administrator at interaction center 124 of FIG. 1) may configure web analytics solutions for a web analyzer (e.g., analysis server 116 of FIG. 1), for example, as described in reference to FIGS. 29A-29X. Web analytics solutions may include projects created by a PO designer to include a web configuration defining parameters for monitoring, capturing and extracting elements from the user's web sessions.

Components in system 1700 may have, for example, the following functionality.
- PO Client 1708 may consume web session data for real-time guidance rules.
- PO Client 1708 may utilize connection server 1704 service upon demand.
  - Web analytics licenses may be enforced.
  - Synchronous and asynchronous functionality may be available.
  - 'Data Loaded' event may be exposed to the user (e.g., with asynchronous functionality).
- PO Client 1708 may launch web player 1710 upon demand with an interaction ID.
- PO Designer 1706 may include, for example:
  - A new 'web analytics' package.
  - A new solution orientation target, including:
    - A validation of web analytics configuration project.
    - XML generation.
  - New function editors, including:
    - A map of HTML table elements to Business Entity lists.
  - Consume web sessions data.
- PO Client 1708 may include, for example:
  - New library objects to:
    - Extend connection server 1704 service functionality.
    - Launch web player 1710.
- Setups may include, for example:
  - A web connector, such as, an Internet Explorer (IE) connector, to define the screen connectivity, for example, between the GUI controls of a desktop application. The screen connectivity layer in PO Client 1708 may include a set of connectors, for example, each responsible to communicate with a specific technology to uniquely identify a specific screen element within a given application screen. The web connector may be responsible for the communication with the Internet provider application. Web connector may be a code layer installed in one or more device in system 1700 for example, in PO Designer 1706 and/or PO Client 1708. Web connector may be setup in a default setup.
  - Deployment of web player 1710 dynamic link library (DLL) as part of a connection server 1704 upgrade.

System Optimization

Embodiments of the invention may optimize real-time guidance workflow performance for web analytics. In one embodiment, real-time guidance may provide an agent with information on user's web interactions and advice to recommend to the user in real-time, for example, as the user interacts with the web. A customer resolver may may resolve a customer resolving by using a customer data base to translate a user or customer identifier (e.g., extracted by web analyzer 418 of FIG. 4) into a customer ID. Customer resolving may be executed by a customer resolver (e.g., customer resolver 432 and/or 434 of FIG. 4) using stored procedures, which may be invoked at an agent device or interaction center (e.g., agent device 120 or interaction center 124 of FIG. 1) according to a real-time guidance workflow. The stored procedure may return a customer's web login from the identifier that is retrieved by a PO client. The stored procedure may run or execute on a customer database to support, for example, up to 50 million customers. As with other examples discussed herein, other capacities, numbers of customers, limits, etc. may be used. Customers' ongoing sessions may be retrieved, for example, upon demand or automatically after an agent connects e.g., via a telephone call, to the customer. In some embodiments, the ongoing sessions may be retrieved from a single web analyzer which stores the open sessions in a memory.

The web analyzer may support scale out and may store the open sessions, for example, in a distributed cache and/or interaction center. Scale out may duplicate instances at some servers, for example, to extend the load capabilities of the servers. The connection server may use a DLL provided by web analyzer to access the open sessions repository to retrieve (e.g., and register for events of) specific customer's open sessions.

Customers' past sessions may be retrieved. Customers' past sessions may include connection server queries for the individual customer's web interactions. A business analyzer service may generate the past sessions data for single and/or multi-site queries. In one embodiment, customers' past sessions may be stored in a cache that may hold, for each customer, the web interactions in a predetermined past time interval (e.g., the past N months). The cache may store session data only for customers that have interacted on the web within a predetermined past time interval (e.g., the last M days). The connection server may access the cache in the real-time guidance workflow. The cache may be configured, for example, as a distributed cache, for example, using a distributed cache wrapper infrastructure, or as a local cache or database in each web analyzer.

The connection server may query a long term data storage to search for the customers' past interactions. Using the long term storage to search for the customers past interactions may free the load from business analyzer services. However, using the long term storage may cause complications, for example, due to a possible wide area network (WAN) between the connection server and long term storage and due to the long term storage missing the most recent past interactions (e.g., occurring in the last hour). In order to include the most recent (e.g., last hour) customer interactions, sessions in a distributed cache may not be immediately cleared once they close, but may only be cleared after a predetermined time delay (e.g., one hour).

Embodiments of the invention may support definitions and deployment for multiple file access servers (FASs). For file access server (FAS) scale out, the load balancer may support routing to the different connect server instances, for example, by "sticky" routing. The FAS component may be responsible for streaming extracted data, such as, html files constructed by an IPS. If multiple FAS components are used, for example, in order, to increase processing capabilities, a load balancing mechanism may be implemented between all the FAS instances to evenly distribute the processing load therebetween. "Sticky routing" may provide a system in which once a user connects to a FAS instances, the user may continue to connect with this FAS instance until the end of the user's session.

Embodiments of the invention may scale out connection server to support concurrent requests for customer's web sessions. Such embodiments may have implications on the system and recordings infrastructure, which may use a load balancer to route requests to the different connect server instances.

Some embodiments of the invention may correlate an interaction to an account ID rather than to a customer ID. The web recording rules may allow selection of whether to correlate the web interaction to an account or customer ID.

Privacy standards, such as, PCI standards, may identify protected customer information that should not be extracted from posts. To conform to such standards, the PO designer may use a screen element option to "hide" such sensitive content in the playback. These protected objects may be "negative screen elements," which may define screen elements to be removed from the web player.

Web recording rules in rule manager may be used to manage many system specifics, such as, inserting authenticated sessions, identifying the user (e.g., whether to identify the user using metadata/cookies or screen elements and/or the column in the customer entity database with which the extracted values are to be associated), etc. When defining a rule, the rule manager may also need to define the customer mapping for each website (or globally for all websites). A rule scheduler may read voice/screen recording rules and may send the recording decisions to a recording manager (RCM) (e.g., in the Interaction center) or alternatively, may not refer to the web rules. The rule may support a hosting environment, i.e., the rule may be attached to a specific tenant. In some embodiments, all services may work with new/modified configurations without restarts.

Embodiments of the invention may support multiple web analyzers operating concurrently or in parallel. A single manager may distribute and divide the work among the multiple web analyzers. Dividing the work may improve the overall scale of the system and also ease the effort of developing the open calls events distribution (e.g., if the distributed cache solution is used).

Embodiments of the invention may optimize the web analyzer-IPS interface. In some embodiments, the interface may include a database and file system interface. However, in order to improve the performance and allow events in open sessions to occur almost immediately, the interface may be replaced by a direct call from the IPS to the web analyzer, where the IPS sends HTML data or each main page event to the web analyzer. In some embodiments, the IPS may have a proprietary implementation of a persistent queue. The queue may be stored in a memory and may point to constructed files. This pointer may provide communication between the IPS and the web analyzer. In other embodiments, the IPS and web analyzer may communicate via a queue based technology style, such as, Microsoft Message Queuing (MSMQ) and/or RabbitMQ.

Recording, Storage and Playback

Figure 18:
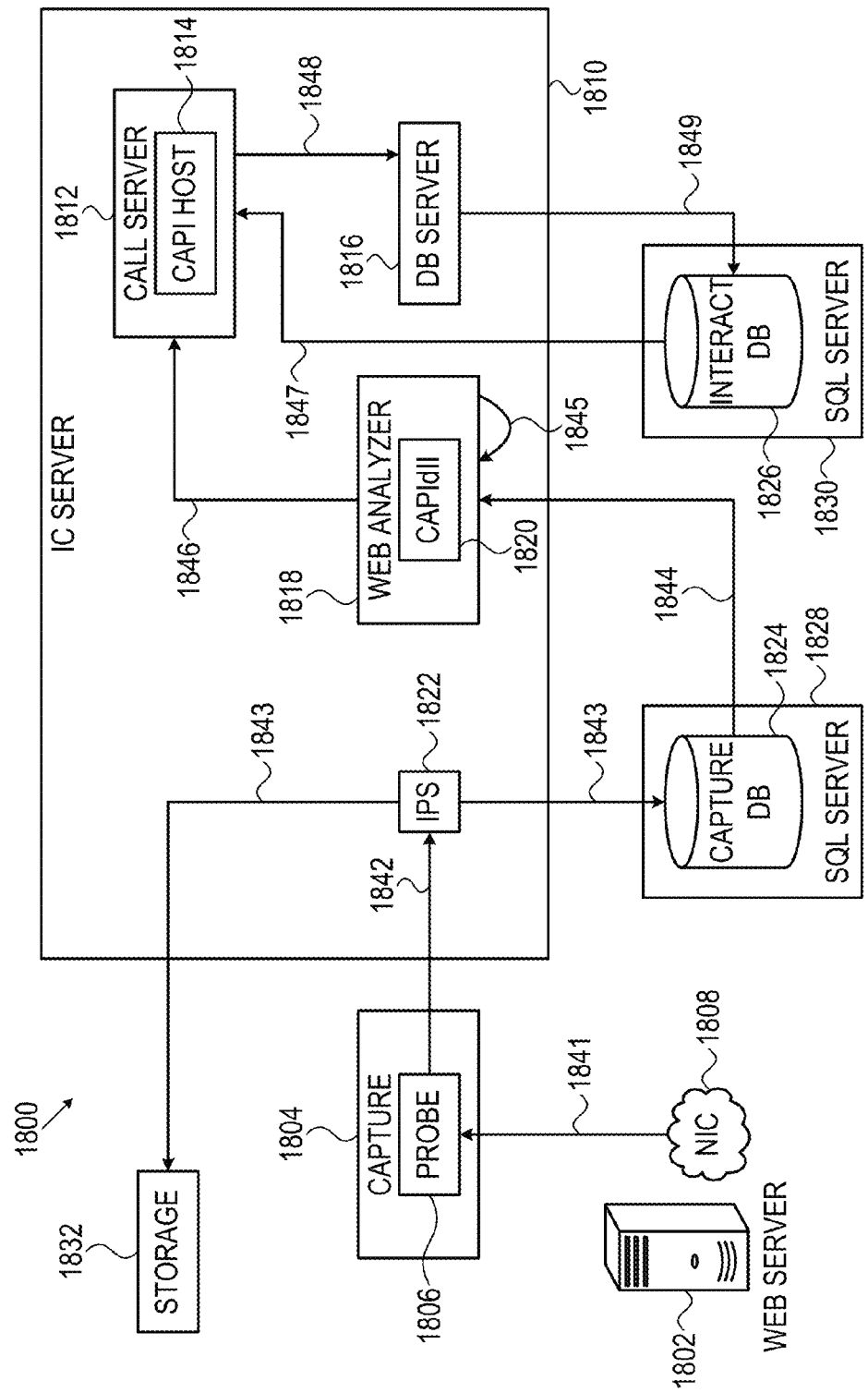
FIG. 18 schematically illustrates a system for recording a user's web interactions in accordance with an embodiment of the invention.

Reference is made to FIG. 18, which schematically illustrates a system 1800 for recording a user's web interactions in accordance with an embodiment of the invention.

System 1800 may include a web server 1802 (e.g., web server 122 of FIG. 1), a capture server 1804 (e.g., capture server 110 of FIG. 1) including a probe 1806 and an NIC 1808 (e.g., probe 410 and NIC 408 of FIG. 4) connecting web server 1802 and capture server 1804. System 1800 may include an interaction center server 1810 (e.g., interaction center 124 of FIG. 1) including an IPS 1822 (e.g., IPS 412 of FIG. 4) for receiving user web interactions from capture server 1804 and transferring it to storage 1832 (e.g., database 126 of FIG. 1), a call server 1812 (e.g., at interaction center 124 of FIG. 1) having a CAPI host 1814, a database server 1816, a web analyzer 1818 (e.g., analysis server 116 of FIG. 1) including a CAPI 1812 for connecting web analyzer 1818 to call server 1812. System 1800 may include a server 1828, such as a structured query language (SQL) server, connected to a capture database 1824 (e.g., capture database 416 of FIG. 4) storing interaction metadata and a server 1830 connected to an interaction database 1826 storing the interactions content.

System 1800 components may execute the following operations (other or additional operations may also be used):

In operation 1841, probe 1806 may capture web server 1802 traffic via the web server's NIC 1808.

In operation 1842, probe 1806 may send the captured traffic to IPS 1822, for example, in data packets.

In operation 1843, IPS 1822 may analyze the packets by reconstructing the captured web pages and embedding file ID links to external files, saving metadata to capture database 1824 and/or saving the web page files to storage 1832.

In operation 1844, web analyzer 1818 may sample capture database 1824 and search for new events that have not yet been processed.

In operation 1845, for each event identified, web analyzer 1818 may:
- Identify whether the new events are associated with a new session or not, for example, by searching for the session ID of the event in the memory cache objects of web analyzer 1818.
- If the new events are associated with a new session, web analyzer 1818 may:
  - Create the relevant session object and add all pages of this session as references to that object once the new pages are received.
  - Extract the customer identifier from the web cookie.
- Each new page identified in capture database 1824 may be sent to web analyzer 1818 for analysis, for example, as follows:
  - For the first page of the session: Find the web site project that this page is part of, e.g., based on the domain part of the page URL.
  - Check if this page should be extracted—e.g., if the page's URL/title/url+title is defined in the web site project pages.
  - If the page is defined:
    - Locate where the page is saved in storage 1832 as indicated in capture database 1824.
    - Load the HTML file from storage 1832 to a DOM.
    - Search for elements that are defined as screen elements for this page:
      - each screen element may be defined with a set of properties, for example, in tblWASEProperty. Properties may include, for example:
        FindByID—some_id
        FindByName—some_name
        FindByXPath—DIV[1]\DIV[2]\TABLE [1]\....
      - If a screen element is defined by all or multiple of these properties, then a matching screen element in the HTML may match all or multiple of these properties.
    - Each screen element found in the web page may have data extracted, for example, based on the nvcValuePopperty in tblWAScreenElement.
  - If a customer identifier is not extracted from the cookie and there is a screen element in the page that is of type customer ID, the screen element may be extracted as described above.
  - If this page is specified to be saved to interaction database 1826 (e.g., indicated in the configuration scheme or a flag turned on that determines recording all pages), the page metadata (and extracted data) may be saved in the cache memory referenced to the associated session object.
  - Update the page's URL: concatenate the URL of the page as retrieved from capture database 1824 with the fileID, for example, to enable playback from FAS proxy.

In operation 1846, after a predetermined time interval of inactivity (e.g., 15 minutes), web analyzer 1818 may close the current session. Web analyzer 1818 may create CAPI web objects and via CAPI 1820 may request to insert the closed session interactions into interaction database 1826, for example, after adjusting their end time (−15 minutes).

In operation 1847, CAPI Host 1814 may resolve the customers of the interactions based on their web login identifier (e.g., executed as a bulk operation for many interactions).

In operation 1848, CAPI Host 1814 may send a request to database server 1816 to store the interactions in interaction database 1826.

In operation 1849, database server 1816 may store the interactions in interaction database 1826.

Other operations or orders of operations may be used. Components and processes of FIG. 18 may be executed using devices and processors of FIG. 1, such as, for example, web capture server 110, analysis server 116, agent device 120, interactions center 124 and their processors 112, 132, 136 and 142. Components of FIG. 18 may be, for example, software executed on one or more processors.

Figure 19:
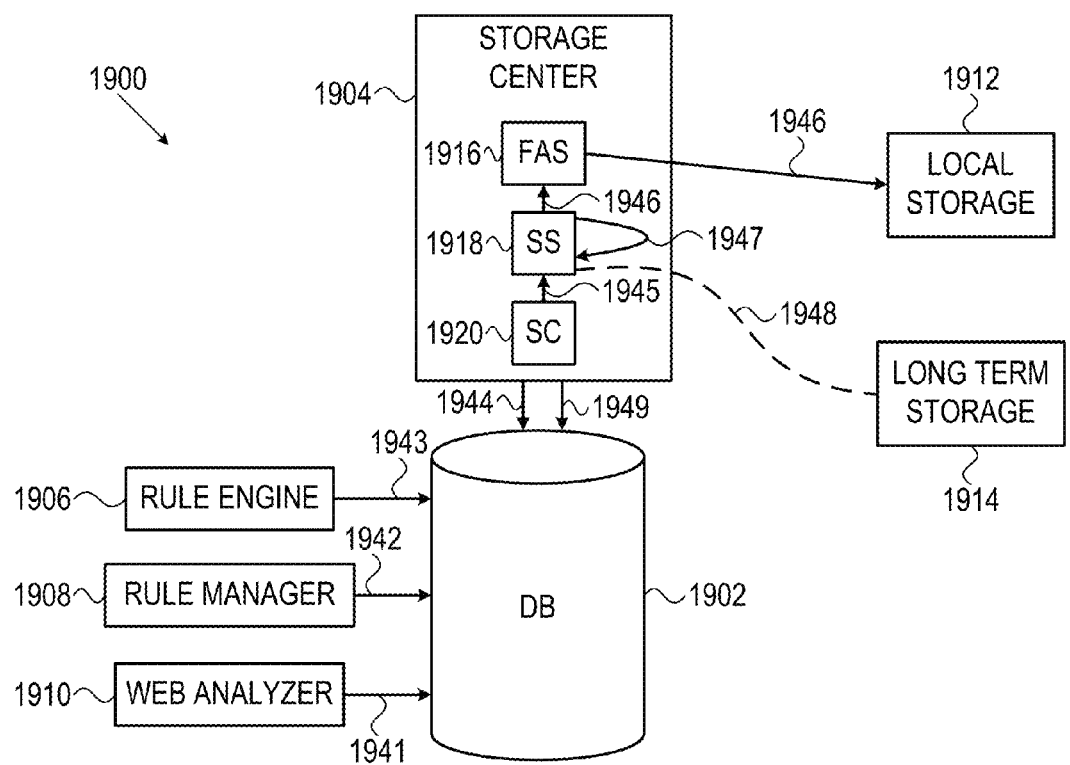
FIG. 19 schematically illustrates a system for archiving a user's web interactions in accordance with an embodiment of the invention.

Reference is made to FIG. 19, which schematically illustrates a system 1900 for archiving a user's web interactions in accordance with an embodiment of the invention.

System 1900 may include a database 1902 (e.g., database 126 of FIG. 1) for archiving or storing user's web interactions, a storage center module 1904 (storage centers 118 of FIG. 1) including a storage center (SC) server 1920, streaming server (SS) 1918 and FAS 1916 (for playback storage), each managing the storage of data in database 1902. System 1900 may include a rule engine 1906 to search for a list of web interactions that match a query or satisfy filters, a rule manager 1908 to define storage rule for web interactions and web analyzer 1910 (e.g., analysis server 116 of FIG. 1) to provide information to configure the storage of database 1902. System 1900 may include a local storage 1912 and a long term storage 1914 for storing files (e.g., image files) associated with the web interactions.

In operation 1941, once a web session terminates, web analyzer 1910 may insert new web session recordings into database 1902. Web analyzer 1910 may send a single file including the web pages of the session to database 1902 (e.g., as a single zip file) and may save the file path (e.g., in tblRecording).

In operation 1942, rule manager 1908 may insert storage rules into database 1902 to apply to web interactions. Rule manager 1908 may set the storage destination either to file system storage in the network or to an external storage device.

In operation 1943, rule engine 1906 may retrieve web interactions to which the storage rules apply and may update database 1902 with the retrieved web interactions and may inform storage center 1904 to archive those interactions.

In operation 1944, storage center 1904 may search database 1902 for the relevant web interactions (e.g., inserted by rule engine 1906 according to the rules in rule manager 1908) by the recording path (e.g., as written in tblRecording).

In operation 1945, SC 1920 may send SS 1918 data to locate the relevant web interactions to be archived.

In operation 1947, when a playback request is received, SS 1918 may check if the interactions data is still stored in local storage 1912. If so, a processor or process may proceed to operation 1946; otherwise a processor or process may proceed to operation 1948.

In operation 1946, playback may be performed streaming data from local storage 1912 using FAS 1916.

In operation 1948, playback may be performed using data from long-term storage 1914.

In operation 1949, SC 1920 may update database 1902.

Other operations or orders of operations may be used. Components and processes of FIG. 19 may be executed using devices and processors of FIG. 1, such as, for example, web capture server 110, analysis server 116, agent device 120, interactions center 124 and their processors 112, 132, 136 and 142. Components of FIG. 19 may be, for example, software executed on one or more processors.

Playback and storage configurations may be highly coupled since the way in which web page resources are saved may affect the way in which they are played. Playback and storage configurations may include, for example, multipurpose Internet mail extensions (MIME) HTML or MHT files, image files, zipped text, and local files (other or additional playback and/or storage configurations may also be used).

For an MHT file storage configuration, an MHT file may be stored, for example, for each web page. The IPS may generate the web page file as an MHT file (e.g., instead of using the FileID link in the HTML). The MHT file may be identified, for example, by file ID and/or special file type. In one example, the web analyzer may set a file field (e.g., tblRecording) with the file ID of the MHT file for each page. In such cases, the SC may simply copy the MHT files of the pages that are analyzed from local storage 1912 to long term storage 1914. Once the MHT file is copied, the SC may modify tblRecording to point to the MHT page in long term storage 1914. For the playback of MHT files, the web player may use SS 1918 to stream the MHT file. SS 1918 may either put the MHT file on a web browser control (e.g., there are no external links to the file so there is no need to set the proxy) or may transform the MHT file to an image on the client side. SS 1918 may reside in multiple servers and may be load balanced. In this solution, there may be no difference between playback of archived and non-archived calls. Like archived calls, non-archived calls may also be in the MHT format and may be streamed using SS 1918 from the local storage.

For an image storage configuration, an image may be created for each web page in the archiving flow (e.g., not by SC 1920 itself but by a dedicated component, such as, a dynamic-link library (DLL) (code library), that SC 1920 uses to create the image). During the archiving flow, web analyzer 1910 may indicate the storage location of the resources and/or files for each page in the web interaction to SC 1920. The location data may be stored, for example, in the FileEvents/http and File tables, in a database 1902. SC 1920 may receive HTML data from FAS 1916 after setting the proxy. SC 1920 may then generate an image and save the image in long terms storage 1914, thus updating the file ID field entries (e.g., in tblRecording) to point to the image file location in the long term storage. In one embodiment, the generation of the image may only come after the posts have been inserted into the page. In such embodiments, the images may remain uncompressed (compression may be used for textual resources). Transforming the HTML file to an image file may use client side components at the server side. For an image playback configuration, a different flow may be used to playback archived and non-archived calls, for example, as described in reference to FIGS. 20 and 21. Non-archived calls may be played through a player service (e.g., playback streaming) using FAS 1916. FAS 1916 may read the file locations from the capture database and may stream the files from their local storage 1912. If the pages have been through retention, e.g., saving recordings for some time period, then they may not be played. Posts may be built by the playback streaming service before displaying the HTML. In another embodiment, the player flow may be operated directly from the client side to FAS 1916. In contrast, archived calls may be played through SS 1918 from their long term storage 1914. In some embodiments, there may be no need to build the posts as they are part of the image. Using images may be problematic for enabling retroactive analysis of web pages. Once an image is created and the original files go through retention, it may be difficult to support capabilities, such as, retroactive/discovery analysis. To enable retroactive/discovery analysis, both the images and the original files may be saved. However, such embodiments may increase the storage volume and may also depend on configuring FAS 1916 to work with the current system storage and database 1902.

For a compressed (e.g., "zipped") text storage configuration, SC 1920 may copy all the page resources from their local storage 1912 to long term storage 1914 and may aggregate them to a single folder/zip file. The compression in this case may be useful since the resources include textual files such as CSS, JS, JSON and HTML, of which the size may be significantly decreased by compression. For playback of the zipped text file, a different flow may be used to playback archived and non-archived calls, for example, as described in reference to FIGS. 20 and 21. Non-archived calls may be played through a player service (e.g., playback streaming) using FAS 1916. FAS 1916 may read the file locations from the capture database and may stream the files from their local storage 1912. If the pages have been through retention, then they may not be played. Posts may be built by the playback streaming service before displaying the HTML. In another embodiment, the player flow may be operated directly from the client side to FAS 1916. Archived calls may also be played through playback streaming (or directly from the client) against FAS 1916 from their long term storage. If all the original interaction data (e.g., html files, xml files, image files, etc.) is saved in long term storage 1914, to playback the interaction data, the FAS may transform the separated files into a composed HTML. FAS 1916 may be enhanced in order to find resources according to their location in an interaction database (e.g., instead of a capture database). FAS 1916 may include a map from the old fileID to the location of the file in the long term storage 1914. Since the file might be compressed, FAS 1916 may also be able to uncompress and retrieve the file. Posts may be built by the web player and/or SS 1918 before displaying the HTML. Such embodiments may enable retroactive/discovery analysis of web pages.

For a local file storage configuration, instead of embedding calls to FAS 1916 in the HTML for downloading resources of the page (e.g., where Href=http://FASLocation\FileIDX), a link may locate a file system (Href=localFileLocation:\FileIDX). Accordingly, the IPS may embed the links using a file system pointer. Similar to the zipped text storage configuration, SC 1920 may copy all the page resources from their local storage 1912 to long term storage 1914 and may aggregate them to a single folder/zip file. The compression in this case may be useful since the resources include textual files such as CSS, JS, JSON and HTML, of which the size may be significantly decreased by compression. Playback of the local files may be identical for archived and non-archived calls. The only difference is that the files for archived and non-archived calls may be located in different places (e.g., as defined in tblRecording). The SS 1918 may stream all the page files to the web client player local file system, and the player may load the main HTML page into a web browser control, after it will embed the posts.

To store web media, archiving rules may define rules for archiving web. Rule engine 1906 may collect the interactions that match the archiving filter criteria for storage center 1904. If the archiving of an interaction matches the rule definition, all files generated by the IPS for that session may be stored, for example, using one of the four alternatives formats described above.

Figure 20:
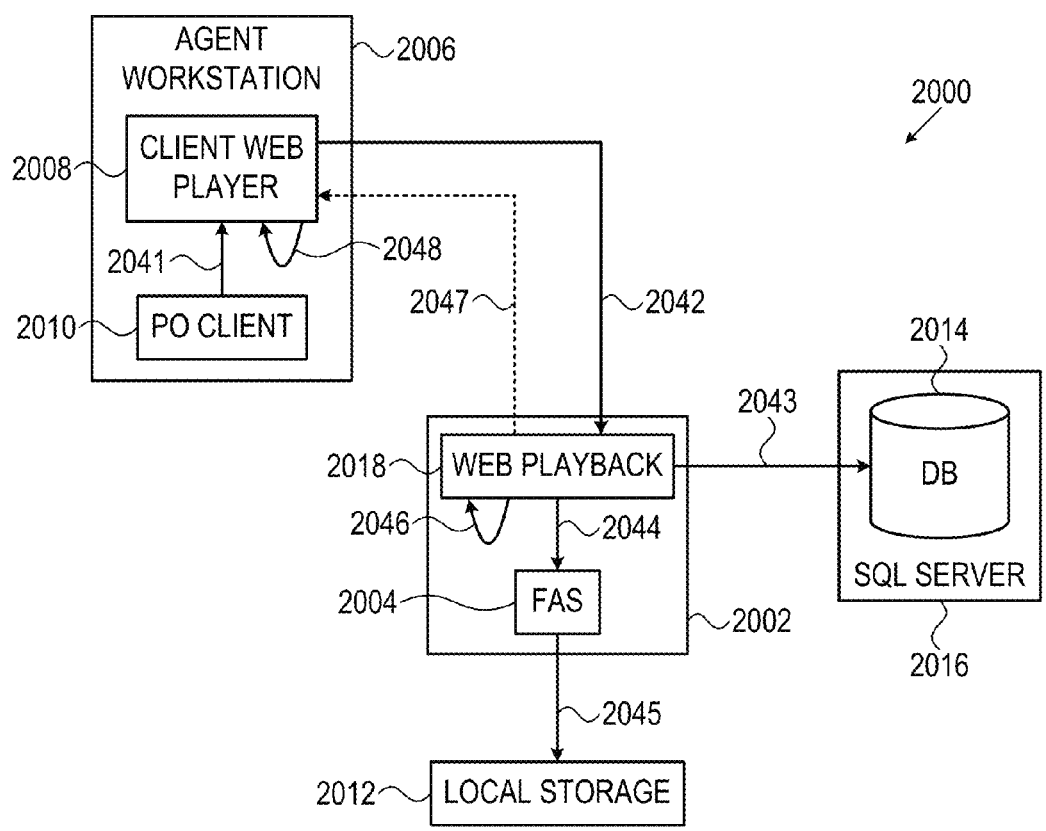
FIG. 20 schematically illustrates a system for playback of non-archived web interactions in accordance with embodiments of the invention.
Figure 21:
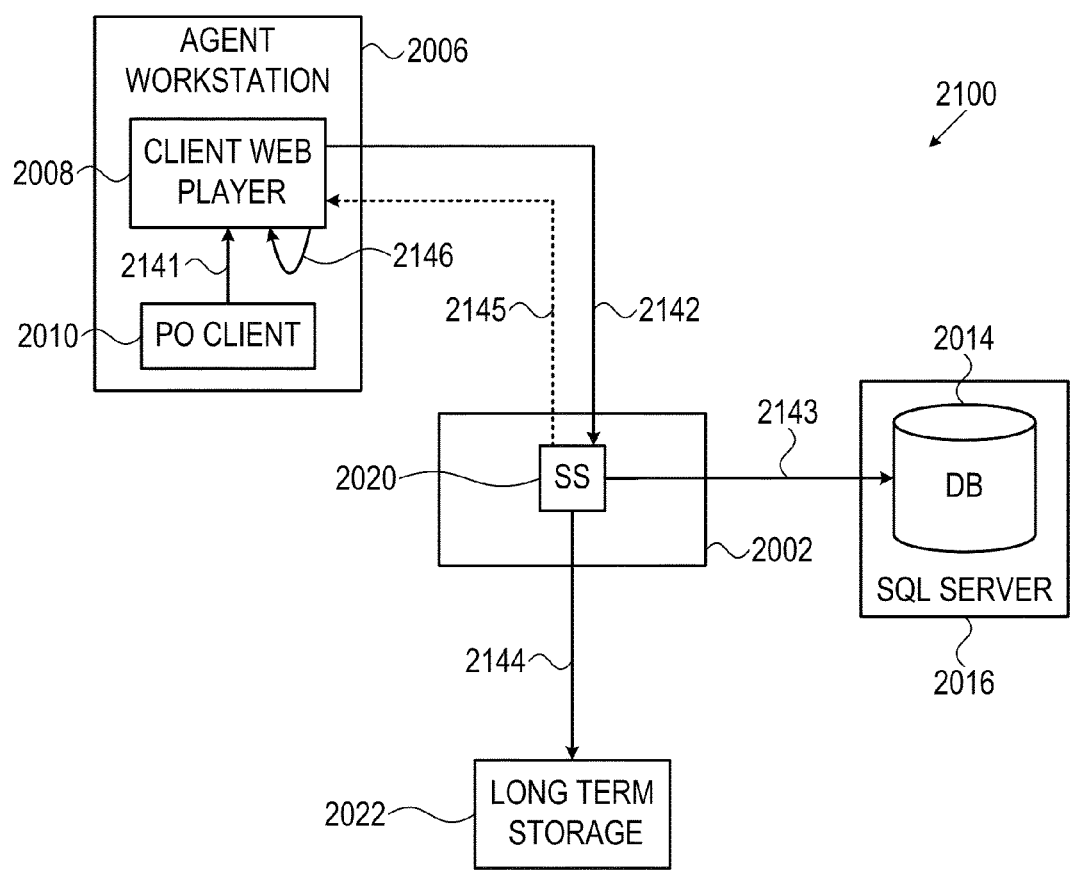
FIG. 21 schematically illustrates a system for playback of archived web interactions in accordance with embodiments of the invention.

Reference is made to FIGS. 20 and 21, which schematically illustrate systems 2000 and 2100 for playback of non-archived and archived web interactions, respectively, in accordance with embodiments of the invention.

Systems 2000 and 2100 may include an interaction center server 2002 (e.g., interaction center 124 of FIG. 1), an agent workstation 2006 (e.g., agent device 120 of FIG. 1) including a client web player 2008 and a PO client 2010, and an interaction database 2014 (e.g., database 126 of FIG. 1) operated by a database server 2016. Interaction center server 2002 in system 2000 may include a web playback client 2018 and a FAS 2004, while interaction center server 2002 in system 2100 may include an SS 2020. System 2000 may include a local storage 2012, while system 2000 may include a long term storage 2022.

In FIG. 20, system 2000 components may execute the following operations to playback non-archived web interactions (other or additional operations may also be used):

In operation 2041, agent workstation 2006 operating a real-time guidance module may select a playback button or functionality, for example, using a PO client 2010. PO client 2010 may request client web player 2008 to play an interaction with some interaction ID.

In operation 2042, client web player 2008 may send the interaction ID to web playback client 2018.

In operation 2043, web playback client 2018 may query interactions database 2014 to retrieve interaction data associated with the interaction ID. Web playback client 2018 may transform the retrieved data from interactions database 2014 to a web object (e.g., UnifiedWebData) and may return the web object to client web player 2008 in operation 2047.

In operation 2044, web playback client 2018 may send HTTP data to FAS 2004 using the web object, for example, for the first page URL from tblWebInteractionPagesXX. Web playback client 2018 may redirect the call to the web proxy, which may load the HTML file from their storage location and may load the linked files from their location. The merged HTML may be returned to the web client.

In operation 2045, FAS 2004 may send local storage 2012 the retrieved interaction data for storage.

In operation 2046, web playback client 2018 may process the interaction data, for example, transforming a webpage for playback into an image and sending the processed data to PO client 2010.

In operation 2047, web playback client 2018 may receive the following data for playback:
 Customer name.
 Web interaction metadata, including:
  1. Time of the interaction.
  2. List of pages and their data extraction.
 For each page: a URL, e.g., as saved in tblWebInteractionPagesXX. This URL may include the web file ID from capture database, which may be requested by FAS 2004.

In operation 8, client web player 2008 may load the in-memory HTML to a DOM and may search for elements input by the customer. The search may be based on an events table, where, for example, each post event may include an Xpath of the element, the element may be searched on the DOM, and the element may be set to the value in the events table. Client web player 2008 may then create web browser controls and may populate the web browser with the in-memory reconstructed HTML. Client web player 2008 may then display the web browser control and populate a web page summary pane.

FAS 2004 proxy may be responsible for accessing storage 2012 and constructing the HTML page with embedded links. For example, if there is a link to a java script (JS) file in the HTML, FAS 2004 may read the file ID in the link, find its file path in a capture database, load the JS file, embed the JS file into the HTML file, and download the embedded HTML file back to client web player 2008.

In contrast to FIG. 20, in FIG. 21, system 2100 may play archived calls through SS 1918 from their long term storage 2022. In one embodiment in FIG. 21, client web player 2008 may send an interaction ID of the desired web interaction to SS 2020. SS 2020 may load the interaction metadata associated with the interaction ID. Using the retrieved metadata, SS 2020 may load the interaction data associated with the retrieved metadata from long term storage 2022 and may stream the interaction data to client web player 2008 for playback.

Other operations or orders of operations may be used in FIGS. 20 and 21. Components and processes of FIGS. 20 and 21 may be executed using devices and processors of FIG. 1, such as, for example, web capture server 110, analysis server 116, agent device 120, interactions center 124 and their processors 112, 132, 136 and 142. Components of FIGS. 20 and 21 may be, for example, software executed on one or more processors.

When using an image file format, SS 2020 may be used to stream the image and display it on an image control instead of a web browser control. Similar adjustments may be used for MHT file formats. In another embodiment, FAS 2004 may fully control the adjustments used for playback when the interaction files are archived and non-archived.

Embodiments of the invention may include, for example, one or more of the following adaptations or improvements (other or additional adaptations or improvements may also be used):
 IPS enhancements to support MHT/local files.
 FAS 2004 adjustments to support working with storage 2012, 2022 and database 2014.
 Player enhancements to support image/MHT/local files.
 SC archiving.
 SC transformation of HTML to image files in the server side, for example, using non-client side components.
 FAS 2004 scale improvements (since FAS 2004 may be accessed more frequently in some embodiments) and scale out.
 SS 2020 scale out.

Client web player 2008 may include a user interface, for example, for an agent to view user interactions at agent workstation 2006. The user interface may include enhancements, for example, to change the way the page summary is displayed, such as, to a hierarchy or tree-structured view. In some embodiments, extracted information or values may be displayed in a key-value summary view, and the hierarchy of the elements may be reflected by concatenating the element names. In one example, a web page may include the following objects:
 Product
  Name
  Price
 Street
  Name
  City The web player user interface may display the objects, for example, as shown in Table 1:

TABLE 1

| Web player user interface display | |
|---|---|
| Key | Value |
| Product Name | iPhone |
| Product Price | 30 |
| Product Name | xBox |
| Product Price | 60 |

TABLE 1-continued

Web player user interface display

| Key | Value |
| --- | --- |
| Street Name | Broadway |
| Street City | New York |

Embodiments of the invention may process open (e.g., ongoing/unresolved) calls according to one or more of the following embodiments (other or additional embodiments may also be used):
1. Open calls may be managed, for example, in a distributed cache. The web analyzer may populate the distributed cache with open sessions and may remove sessions from distributed cache when the session ends.
    The web analyzer may use a distributed cache wrapper component. The web analyzer may also provide in-process DLL for the registering new pages/posts.
    In such embodiments, interactions may be stored in database 2014, which may be managed by the database server 2016 (e.g., instead of a call server 1812 of FIG. 18).
2. Interaction center server may hold open calls. The calls may be registered using a monitor server in the interaction center server (e.g., if monitor server supports scale out).
3. Open calls may be managed in the distributed cache. Registration and events may be managed through the call server/monitor server. Both client web player 2008 and PO client 2010 may use open session data and ongoing pages that the customer visits. Since both of these client devices use the events data, one solution may send the events data to PO client 2010 and another may send the event data to client web player 2008 (this may avoid sending each event twice to each agent workstation 2006). In some embodiments, events may only be registered and sent for customers that are currently in an ongoing web session and/or on the phone with an agent. In some embodiments, some events may only include metadata and not the HTML data, for example, if the page is only relevant for the shadow browsing.

To support shadow browsing, events may be registered in one of the following alternative embodiments, or other embodiments:
1. A connection server (e.g., connection server 424 of FIG. 4) may register open calls for a customer X, for example, using a web analyzer DLL. The web analyzer DLL may propagate events to the connection server. The web analyzer may operate in conjunction with the distributed cache.
2. The connection server may register open calls of the customer X against the monitor server. Monitor Server may register against the interaction center server. Events may be routed in a path through the interaction center server to the monitor server to the connection (in the forward and reverse path direction). Such embodiments may use monitor server scale out.

When shadow browsing, new pages visited by the customer and posts events (posts may only be relevant for the shadow browsing) may be propagated as events to PO client 2010, for example, to re-evaluate rules. In some embodiments, client web player 2008 may include a configuration option to indicate whether or not to shadow browse pages that are not defined in the configuration rules. In some embodiments, a default setting may send all page events to PO client 2010 and may update client web player 2008 accordingly.

Shadow browsing may provide a web page based streaming and playback mechanism. PO client 2010 may receive the current page metadata and may aggregate all the metadata for pages in memory. To shadow browse, HTML data may also be retrieved. When PO client 2010 receives a new event, PO client 2010 may notify client web player 2008. The event may include an open interaction ID, session ID and/or event page ID. Client web player 2008 may invoke SS 2020 requesting the HTML of the page ID of the interaction. SS 2020 may invoke the client web analyzer DLL, which may return a URL and file ID for the page. To increase the speed of HTML retrieval, client web player 2008 may retrieve HTML data directly via FAS 2004 and may avoid generating images for the HTML.

Figure 22:
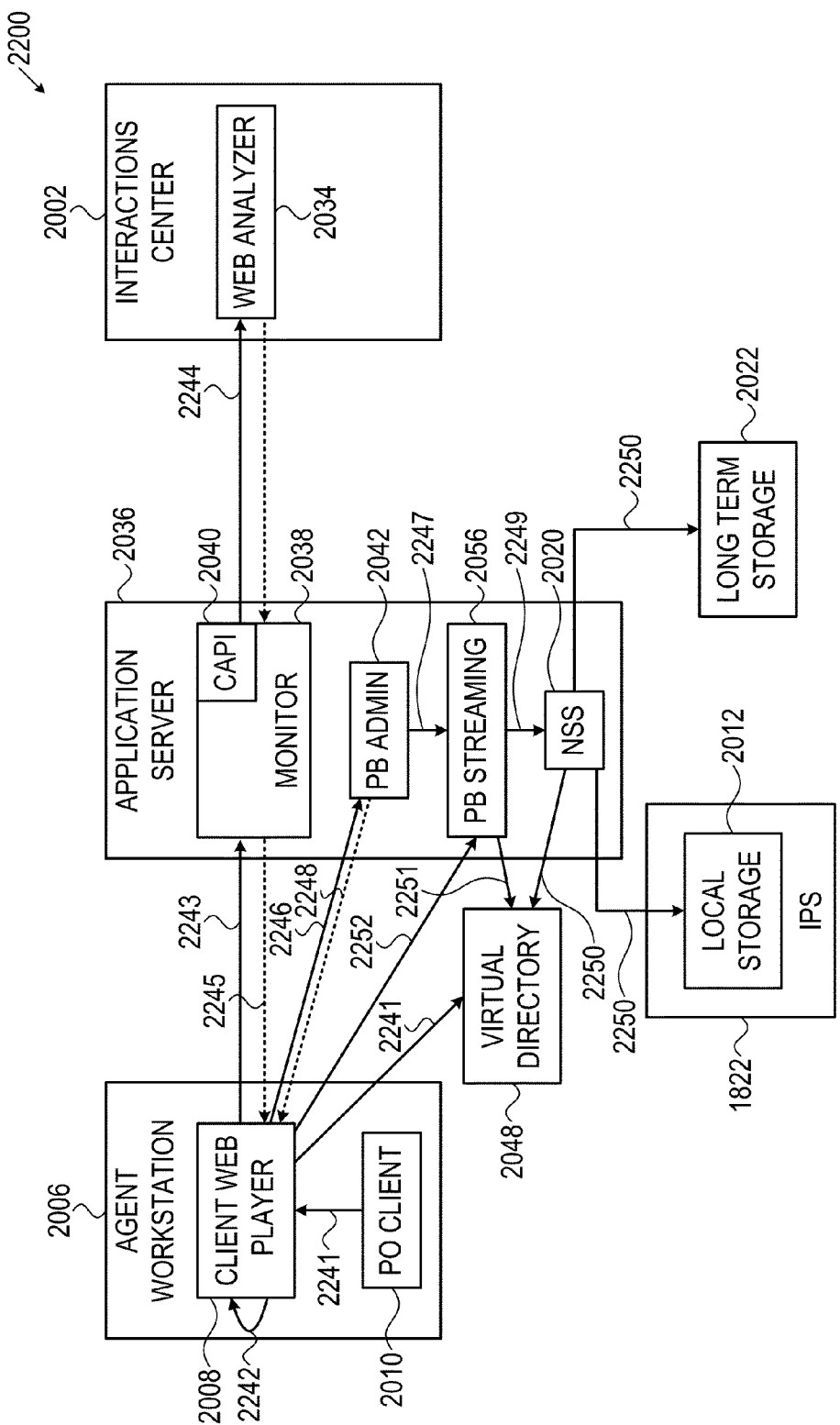
FIG. 22 schematically illustrates a system for shadow browsing a user's web interactions in accordance with embodiments of the invention.

Reference is made to FIG. 22, which schematically illustrates a system 2200 for shadow browsing a user's web interactions in accordance with embodiments of the invention.

System 2200 may include an interaction center server 2002 (e.g., interaction center 124 of FIG. 1) having a web analyzer 2034 (e.g., analysis server 116 of FIG. 1), an agent workstation 2006 (e.g., agent device 120 of FIG. 1) including a client web player 2008 and a PO client 2010, and an application server 2036 (e.g., analysis server 116 of FIG. 1) operating a monitor server 2038 including a CAPI 2040, a playback administrator 2042, a playback streamer 2056, and/or a SS 2020. System 2200 may also include a local storage 2012 (e.g., provided via an IPS 1822) and a long term storage 2022.

System 2200 components may execute the following operations to playback web interactions in real-time, e.g., "shadow-browse" (other or additional operations may also be used):

In operation 2241, agent workstation 2006 operating a real-time guidance module may select a playback button or functionality, for example, using a PO client 2010. The real-time guidance module may launch client web player 2008, for example, by transferring the systemAdminURL and interaction ID to playback administrator 2042 for playback.

In operation 2242, client web player 2008 may initialize and authenticate a user, for example, by using an active directory and/or a login service. The user authentication may provide a valid token.

In operation 2243, client web player 2008 may send monitor server 2038 an interaction ID for the web session, request monitor server 2038 to fill a web object (e.g., ExtendedCallData) with the open web session details, such as, a recording path, pages captured so far, topics, etc.

In operation 2244, monitor server 2038 may call web analyzer 2034, e.g., via CAPI 2040, to fill the web object from its memory based on the interaction ID. Web analyzer 2034 may return the relevant data to monitor server 2038.

In operation 2245, monitor server 2038 may build and return the web object to client web player 2008. The web object may include data for a current (or most recent) page the customer is browsing.

In operation 2246, client web player 2008 may call playback administrator 2042 to receive a play list, for example, including the web object.

In operation 2247, playback administrator 2042 may send a path of the page zip file that holds the page held in the web object to playback streamer 2056. Playback streamer 2056 may return a target URL to where the page may be streamed.

In operation 2248, playback administrator 2042 may return one or more of the following to client web player 2008:
- Open session metadata (e.g., customer name, date, etc.).
- Requested pages with file names.
- Page metadata (e.g., topic, data extraction, etc.).
- URL of a folder in a virtual directory 2048 that playback streamer 2056 creates for this page.

In operation 2249, playback streamer 2056 may call SS 2020 (e.g., asynchronously) to request the file containing the pages (e.g., zipped or otherwise compressed) be transferred from local storage 2012 to a local path, for example, as defined in a virtual directory 2048

In operation 2250, SS 2020 may stream the file containing the pages to the virtual directory 2048 path.

In operation 2251, playback streamer 2056 may uncompress (e.g., "unzip" or use another process) the file if necessary, and may transfer the file contents (e.g., HTML content and images and links in the page) to the URL virtual directory 2048 folder created for this page.

In operation 2252, client web player 2008 may continually try to playback the page, for example, until client web player 2008 receives an indication from playback streamer 2056 that the URL is ready. Client web player 2008 may create a web browser control, e.g., passing it the URL of the current page, and may display the current page. In order to playback the next page, client web player 2008 may repeat operations 1-5 to continue pulling page data via monitor server 2038. If client web player 2008 receives a new page (e.g., in the ExtendedCallData object), client web player 2008 may repeat operations 2246-2252 to playback the new page.

Other operations or orders of operations may be used. Components and processes of FIG. 22 may be executed using devices and processors of FIG. 1, such as, for example, web capture server 110, analysis server 116, agent device 120, interactions center 124 and their processors 112, 132, 136 and 142. Components of FIG. 22 may each be, for example, software executed on one or more processors.

In one embodiment, PO client 2010 may initiate shadow-browsing, e.g., as described in reference to FIG. 22, while in other embodiments, web analyzer 2034 may initiate shadow-browsing, for example, by sending real-time events to client web player 2008 through via monitor server 2038.

Client web player 2008 may be launched by real-time guidance or shadow browsing functionality, for example, an agent selecting a playback button in operation 1 of FIG. 22. However, before client web player 2008 actually displays the web pages, the user may be authenticated. Client web player 2008 may authenticate a user, for example, as follows:
1. Initialize a time resolver
2. Use a login helper to authenticate.
   2.1 The login helper may retrieve the authentication mode from a system administrator.
   2.2 If the authentication mode is a single sign on (SSO) (e.g., the authentication of the user uses the active directory), the login helper may authenticate against the SecuredLoginService and then receive an authentication token.
   2.3 If the authentication mode is native authentication mode:
      2.3.1 A user-password login page may be displayed to the user.
      2.3.2 The login helper may receive the user-password and may hash the password and send it to the login service, which may authenticate and generate the authentication token.

Figure 23:
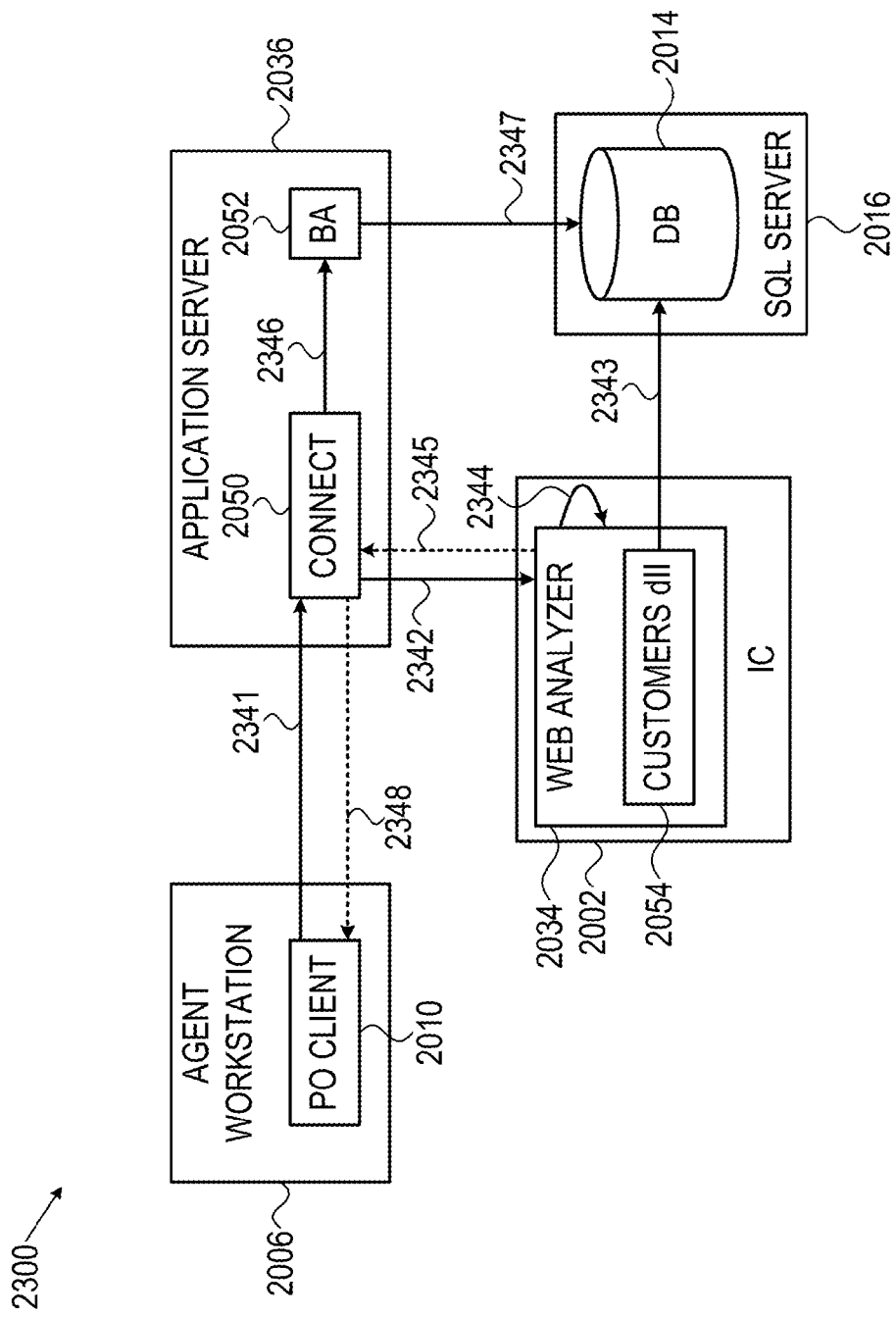
FIG. 23 schematically illustrates a system for an agent to provide real-time guidance in accordance with embodiments of the invention.

Reference is made to FIG. 23, which schematically illustrates a system 2300 for an agent to provide real-time guidance in accordance with embodiments of the invention.

System 2300 may include an agent workstation 2006 (e.g., agent device 120 of FIG. 1) including a PO client 2010, an application server 2036 operating a connection server 2050 and a business analyzer 2052, and an interaction center server 2002 (e.g., interaction center 124 of FIG. 1) having a web analyzer 2034 (e.g., analysis server 116 of FIG. 1) having a customer DDL interface 2054. System 2300 may also include a database 2014 managed by database server 2016.

System 2300 components may execute the following operations for real-time guidance (other or additional operations may also be used):

In operation 2341, a customer may browse or log into a web site. The customer may then call a contact center, reaching an agent operating agent workstation 2006. The agent may write the customer's identifier into a CRM user interface. The customer identifier may be extracted from the CRM user interface and sent to the connection server 2050, for example, as commanded by real-time interaction rules.

In operation 2342, connection server 2050 may call web analyzer 2034 and transfer the customer identifier extracted from CRM to web analyzer 2034. Connection server 2050 may request metadata from web analyzer 2034 associated with this customer's current open session(s) (if any such exist) and/or the customer's customer ID.

In operation 2343, web analyzer 2034 may activate a stored procedure provided by the customer entity, for example, using customers DLL 2054. The customer entity may receive the customer identifier (e.g., tenantID) and identity type (e.g., phone) and may return the customer's web identifier and the customer's customer ID.

In operation 2344, web analyzer 2034 may search for open session for the customer, for example, by searching for the customer's web identifier in the customer's cache.

In operation 2345, web analyzer 2034 may return metadata from the web session of the customer (e.g., if there is a current open session for the customer) and/or the customer's customer ID to connection server 2050.

In operation 2346, connection server 2050 may send business analyzer 2052 the customer ID and may ask for web interactions associated with this customer ID (e.g., only if the real-time interaction rules require metadata for past web interactions).

In operation 2347, business analyzer 2052 may query database server 2016 to find web interactions in web interaction tables in database 2014 that are associated with this customer ID, for example, over a requested or predetermined time period. Database server 2016 may return any matching interactions to agent workstation 2006, for example, from business analyzer 2052 to connection server 2050 and from connection server 2050 to PO client 2010.

In operation 2348, connection server 2050 may return web interactions associated with this customer ID to agent workstation 2006.

Other operations or orders of operations may be used. Components and processes of FIG. 23 may be executed using devices and processors of FIG. 1, such as, for example, web capture server 110, analysis server 116, agent device 120, interactions center 124 and their processors 112, 132, 136 and 142. Components of FIG. 23 may each be, for example, software executed on one or more processors.

Web analyzer 2034 may be integrated with a capture server (e.g., capture server 110 of FIG. 1) by pulling data for new web pages from an interaction database 2014, for example, periodically or every (N) seconds. Web analyzer 2034 may be responsible for managing sessions and performing data extraction.

Capture servers may include a probe (e.g., capture server 410 of FIG. 4) and an IPS (e.g., IPS 412 of FIG. 4), which may be configured, for example, as follows (as with other modules discussed herein, other languages, operating systems, and configurations may be used):

Probe:
- Runs or executes on Linux/written in c++ (other program language(s) may be used).
- Runs scripts to allow filtering URLs (e.g., default filtering of URLs may be based on domain name system (DNS) requests which may be captured by the probe during the runtime).
- Filters based on URL, IP and/or host name.
- Uses a time delay (e.g., default value=20 seconds) before transferring packets to IPS. Such embodiments may allow late matching of packets, for example, when the value used by a filter arrives with one of the following packets.

IPS:
- Written in c++ (other program language(s) may be used).
- Supports network capture mechanism.
- If network capture is used the network capture may be executed only on one thread.

General capture configuration (other configuration(s) may be used):
- Relate all files of the same page (HTML, images, java scripts, etc.)
- Option 1:
    - Save each main page in its own folder.
    - Save all files related to the main page in the same folder as a main page.
    - Replace all links inside the main page with a relative path to the files located in the same folder.
- Option 2:
    - Save the main page with all its content, for example, as an MHT file.

Integration of Third Party Customer Experience Management (CEM)

Some embodiments of the invention may use a third-party service or server (e.g., such as, the TeaLeaf™ CEM) to provide customer experience management (CEM) functionality instead of using a native system device (e.g., such as, the PO Designer).

Figure 24:
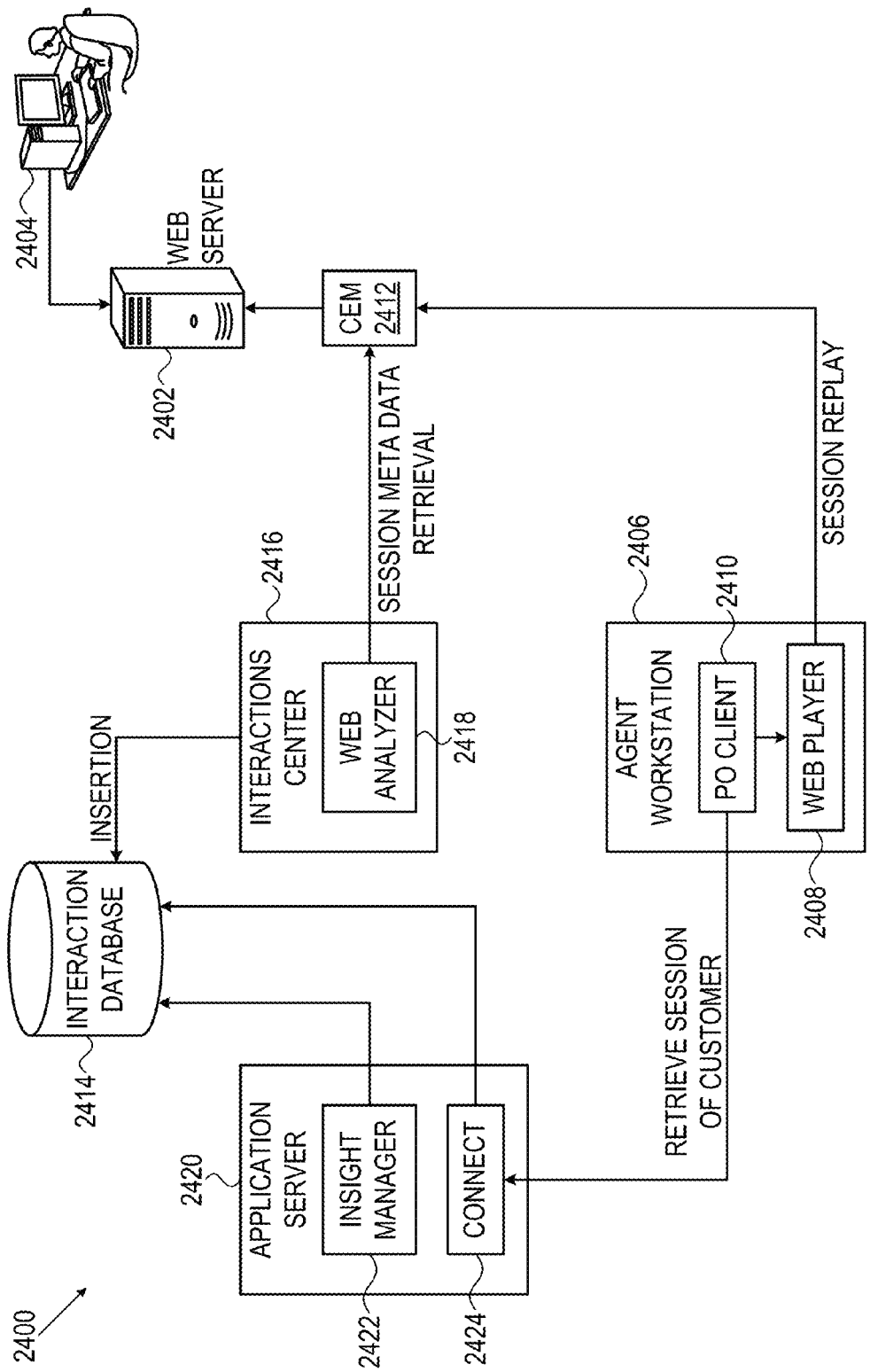
FIG. 24 schematically illustrates a system integrating a third-party customer experience management (CEM) server in accordance with embodiments of the invention.

Reference is made to FIG. 24, which schematically illustrates a system 2400 integrating a third-party CEM server 2412 in accordance with embodiments of the invention.

System 2400 native components may include an agent workstation 2406 (e.g., agent device 120 of FIG. 1) including a PO client 2410 and a client web player 2408, an application server 2420 operating a connection server 2424 and an insight manager 2422 (e.g., insight manager 1310 of FIG. 13), an interaction center server 2416 (e.g., interaction center 124 of FIG. 1) having a web analyzer 2418 (e.g., analysis server 116 of FIG. 1), and an interactions database 2414 (e.g., database 126 of FIG. 1). System 2400 non-native components may include a web server 2402 (e.g., web server 122 of FIG. 1) used by a customer 2404 (e.g., at user computer 102 of FIG. 1) viewing web server content and a third party CEM server 2412.

CEM server 2412 may be responsible for capturing and extracting web sessions, replaying sessions, and/or archiving sessions. To integrate CEM server 2412, system 2400 may import CEM server 2412 configured (e.g., by a third party HTTP based designer) that is compatible with system 2400. In one embodiment, the division of labor may allow native devices to retrieve the sessions' metadata and perform categorization on top of (OTO) the retrieved sessions. For example, a native PO designer may define web monitoring rules and these rules may be based on the session topics extracted by CEM server 2412. CEM server 2412 may provide an application programming interface (API) for native components of system 2400 to interact with non-native CEM server 2412. For example, a CEM 2412 API may be used to retrieve a list of web site areas and session attributes defined in CEM server 2412. This list may appear, for example, in one or more of the following devices:

1. Insight manager 2422 web filters, for example, when defining a category.
2. Business analyzer web filters, for example, when defining a query.
3. PO designer, for example, when defining a rule for real-time guidance based on web events.

For example, if CEM server 2412 is extracting "products purchased" screen elements, then "products purchased" may be a filter in the above 3 applications.

Embodiments of the invention may import the configuration from CEM server 2412 into native system 2400 components Importing the CEM server 2412 configuration may, for example, include a definitions project and consumption project, where the definitions project may be correlated to the imported configuration to define rules on the CEM server 2412 configuration scheme.

Web analyzer 2418 may periodically retrieve web sessions from CEM server 2412 and save them to interaction database 2414, for example, via a CAPI (e.g., CAPI 1820 of FIG. 18) and database server (e.g., database server 2016 of FIG. 23). Web analyzer 2418 may include a designated connection server to connect to CEM server 2412 or alternatively, may use an all purpose connection server. This connection server may periodically call the CEM 2412 API for batch retrieval of offline sessions that took place from a time the previous batch was loaded until a current time. The connection server may verify that sessions retrieved from CEM server 2412 are not duplicates. In one example, by the connection server may query CEM server 2412 for interactions (e.g., in the current set only) that have an original session ID column equal to the session ID received from CEM server 2412. If the connection server detects a match in IDS, the associated interaction(s) may be discarded/not inserted.

Components and processes of FIG. 24 may be executed using devices and processors of FIG. 1, such as, for example, web capture server 110, analysis server 116, agent device 120, interactions center 124 and their processors 112, 132, 136 and 142. Components of FIG. 24 may each be, for example, software executed on one or more processors.

Figure 25:
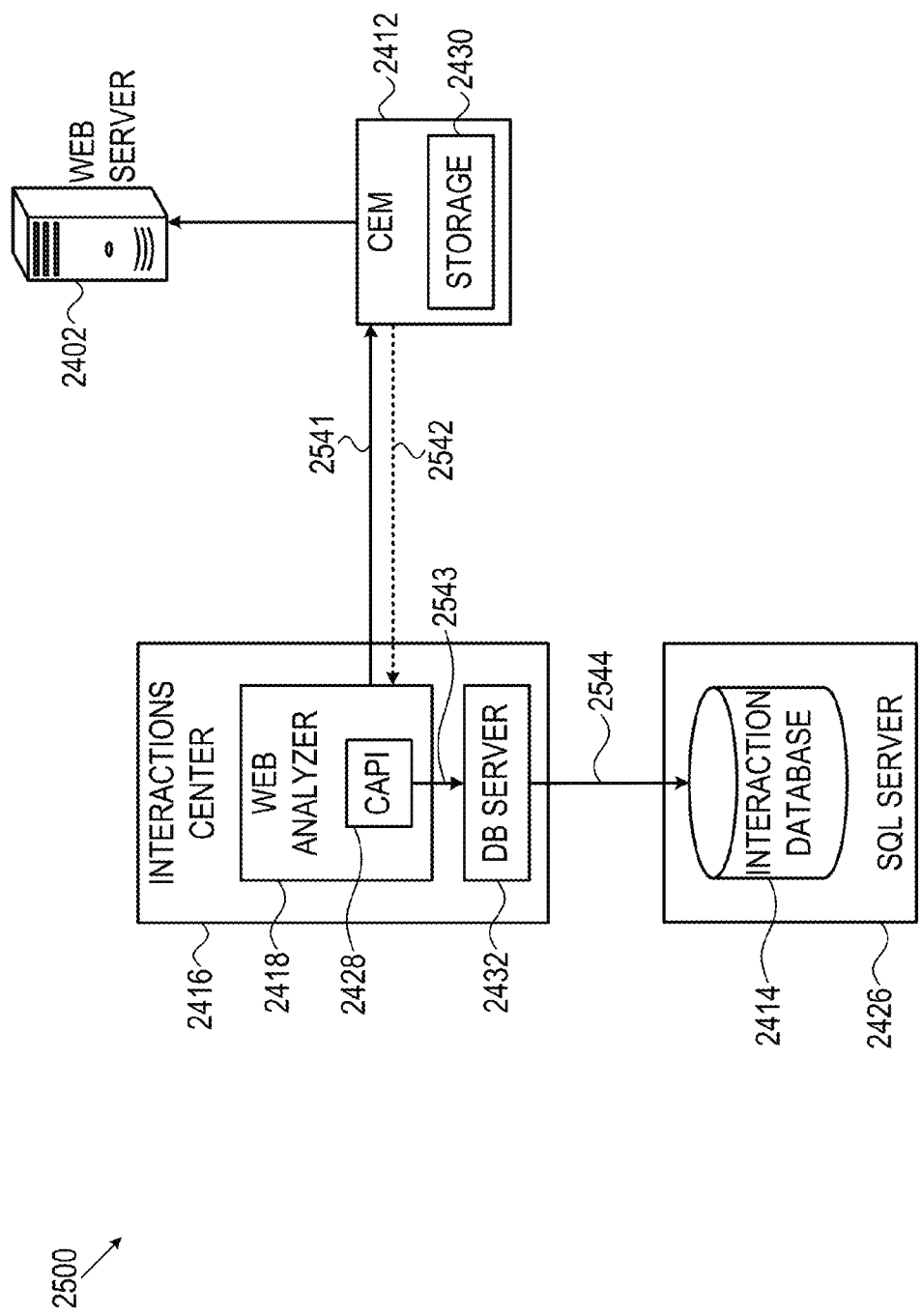
FIG. 25 schematically illustrates a system having an integrated third-party CEM server retrieving a plurality of offline web sessions in accordance with embodiments of the invention.

Reference is made to FIG. 25, which schematically illustrates a system 2500 having an integrated CEM server 2412 retrieving a plurality of offline web sessions in accordance with embodiments of the invention.

System 2500 native components may include an interactions database 2414 (e.g., database 126 of FIG. 1) and an interaction center server 2416 (e.g., interaction center 124 of FIG. 1) including a database server interface 2432, a database server 2426, and a web analyzer 2418 (e.g., analysis server 116 of FIG. 1) having a CAPI 2428 and a plug-in connection server to interact with CEM server 2412. System 2500 non-native components may include a web server 2402 (e.g., web server 122 of FIG. 1), CEM server 2412 and CEM storage 2430 for storing web interactions.

System 2500 components may execute the following operations for retrieving a batch of offline web interactions (other or additional operations may also be used):

In operation 2541, web analyzer's 2418 connection server plug-in may periodically request offline web interactions from CEM server 2412, for example, in batches or groups of web sessions or interactions. The connection server plug-in may send CEM 2412 the time of the last loaded session to avoid duplicate session transmission.

In operation 2542, CEM server 2412 may send web analyzer 2418 web session data from CEM storage 2430, for example, that were captured from a time after the last loaded session to the current time. In one example, only metadata may be imported. However, alternatively or additionally, entire web sessions, links, tags, embedded objects, and/or screen elements from sessions may be imported.

In operation 2543, web analyzer 2418 may use a local CAPI 2428 client API to insert a batch of web interactions in interactions database 2414, for example, by sending the structured web interactions metadata retrieved in operation 2 to database server 2426.

In operation 2544, database server 2426 may insert the web interactions into interactions database 2414.

Other operations or orders of operations may be used. Components and processes of FIG. 25 may be executed using devices and processors of FIG. 1, such as, for example, web capture server 110, analysis server 116, agent device 120, interactions center 124 and their processors 112, 132, 136 and 142. Components of FIG. 25 may each be, for example, software executed on one or more processors.

Figure 26:
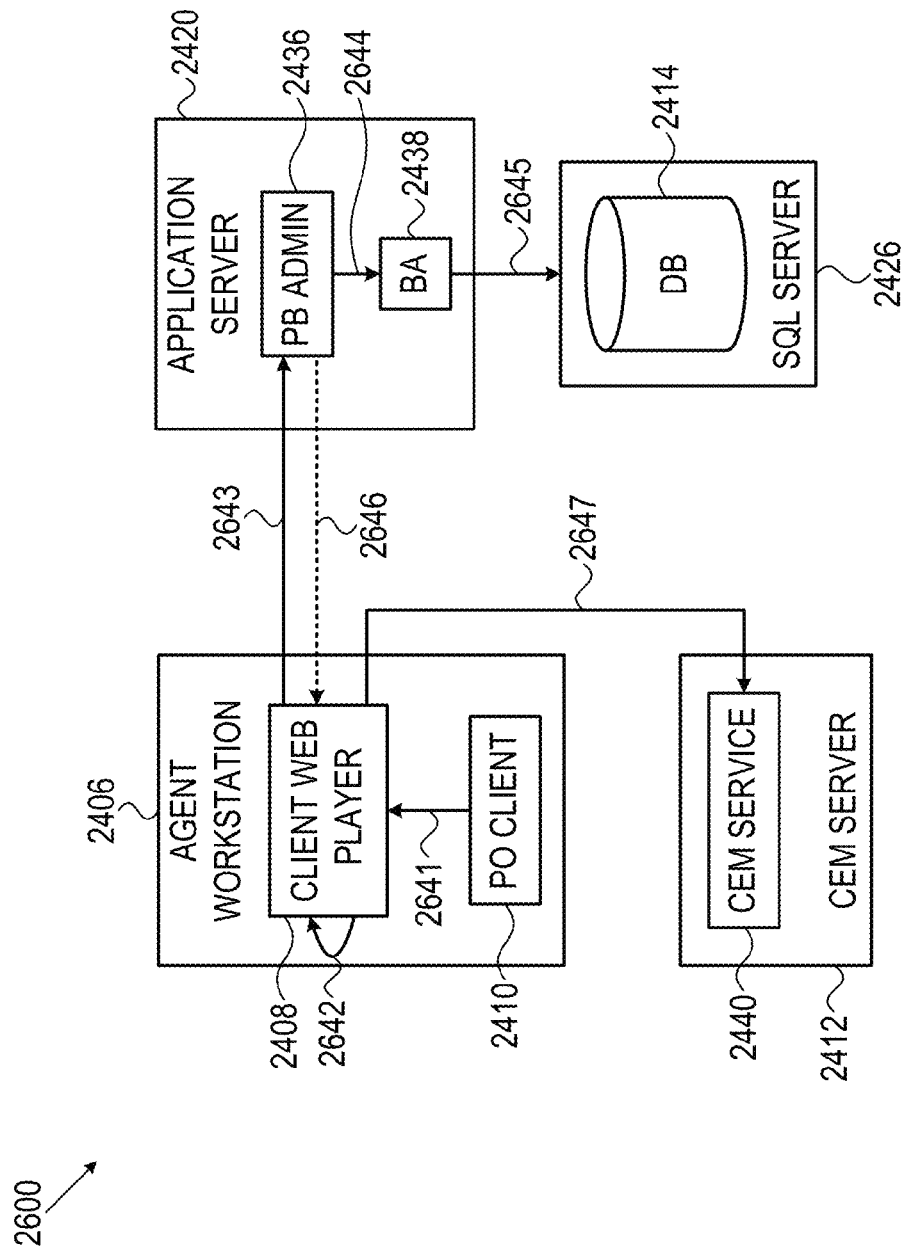
FIG. 26 schematically illustrates a system for playback of the offline web interactions retrieved in FIG. 25 in accordance with embodiments of the invention.

Reference is made to FIG. 26, which schematically illustrates a system 2600 for playback of the offline web interactions retrieved in FIG. 25 in accordance with embodiments of the invention.

System 2600 native components may include an agent workstation 2406 (e.g., agent device 120 of FIG. 1) including a PO client 2410 and a client web player 2408, an application server 2420 operating a playback administrator 2436 and a business analyzer 2438, and an interactions database 2414 (e.g., database 126 of FIG. 1) operated by a database server 2426. System 2600 non-native components may include a CEM server 2412 operating a CEM service 2440.

System 2600 components may execute the following operations for playback of a batch of web interactions retrieved offline (other or additional operations may also be used):

In operation 2641, agent workstation 2006 operating a real-time guidance module may select a playback button or functionality, for example, using a PO client 2010. The real-time guidance module may launch client web player 2008, for example, by transferring the systemAdminURL and interaction ID to playback administrator 2042 for playback.

In operation 2642, client web player 2008 may initialize and authenticates a user, for example, by using an active directory and/or a login service. The user authentication may provide a valid token In operation 2643, client web player 2008 may send playback administrator 2436 the interaction ID to playback.

In operation 2644, playback administrator 2436 may send a request to business analyzer 2438 to fill a web object (e.g., ExtendedCallData) from database 2414 based on the interaction ID. Business analyzer 2438 may fill the web object with the web interaction metadata, such as, a recording path, pages captured so far, topics, etc.

In operation 2645, business analyzer 2438 may fill the web object from database 2414 based on the interaction ID. Business analyzer 2438 may return the relevant data to playback administrator 2436.

In operation 2646, playback administrator 2436 may return the web object to client web player 2008.

In operation 2647, client web player 2008 may resolve the internal session ID from the data set and may invoke CEM service 2440 for session replay. Client web player 2008 may receive a web response from CEM server 2412, create a web browser control, and load a response to web browser control.

Other operations or orders of operations may be used. Components and processes of FIG. 26 may be executed using devices and processors of FIG. 1, such as, for example, web capture server 110, analysis server 116, agent device 120, interactions center 124 and their processors 112, 132, 136 and 142. Components of FIG. 26 may each be, for example, software executed on one or more processors.

To playback online or ongoing web interactions, embodiments of the invention may use a dedicated CEM 2412 API for real-time or ongoing session replay, which may receive the CEM 2412 internal session ID. The session internal ID may be stored in a native web interactions table.

The online web API may be invoked for playback, for example, when the agent is on a call with a customer. The following provides an example configurations for a system adapted to provide native web playback of online web interactions from a non-native CEM:

1. Non-native configurations may be integrated in a native interaction center, for example, via an application or plug-in. The plug-in may map relevant configuration options and move them to manageable locations.
2. After configuration changes, the system, in one embodiment, should not be re-started.
3. Configuration file parameters may be moved to a database.
4. Capture components may be defined (e.g., such as the FAS and storage manager) as part of the plug-in, for example, so that they may be routed and monitored via a native monitoring device or sentinel.

To monitor the web analyzer, the web analyzer may report on performance counters. Web analyzer may support component failover and DC failover for system resiliency. During component failover, a standby web analyzer may become active automatically when deployed on a local/geo cluster. A cluster may provide failover and increased availability of applications and a geo cluster may be enhanced to provide resiliency of applications across different data centers. At least until web analyzer supports an active-active resiliency mode, it may work in an active-standby resiliency mode. An active-active resiliency mode may run or execute a service in multiple server instances in order to achieve both higher scale and increased availability. An active-standby resiliency mode may run or execute only one service instance and hold another installed service instance in a standby mode. Such a mode may provide high availability, for example, if the active service becomes unavailable the standby service may become active instead. Such systems may use a high availability manager (HM) and/or a deployment Manager (DM).

System components and features for recording, storage and playback may include, for example, any combination of the following components (other or additional components may be used):

1.1. IPS (e.g., IPS 412 of FIG. 4) may, for example:
   Provide direct communication with web analyzer.
   Include IPS enhancements to support MHT/local files.

1.2. FAS (FAS 1916 of FIG. 19) may, for example:
   Provide FAS scale improvements (e.g., the FAS may be more frequently accessed) and scale out.
   Provide FAS adjustments to support working with an interaction storage and database (e.g., database 422 of FIG. 4).
1.3. Web analyzer (e.g., analysis server 116 of FIG. 1) may, for example:
   Use direct communication with the IPS.
   Support new event distribution solution for real-time guidance workflow (e.g., open sessions analysis may use a distributed cache and/or interaction center).
   Move all configuration file parameters to the database.
   Support scale out.
   Support versioning of web configuration projects, e.g., reflecting a PO designer version of these projects in the database.
   Provide Regex per screen element, e.g., where Regex is a language that enables sub-strings to be identified inside text.
   Provide combo box extraction, e.g., by providing a control that enables a selection from a drop down menu.
   Provide multiple customer ID screen elements.
   Provide a CEM open session flow API (e.g., where web analyzer may manage CEM open sessions API).
   Support reading recording rule definitions, for example, including a tenant ID and virtual agent.
   Not re-start the system after configuration changes.
   For monitoring, add performance counters and SNMP traps to alert the web analyzer when there are errors in the system.
1.4. Interaction center (e.g., interaction center 124 of FIG. 1) may, for example:
   Provide event distribution solution for the real-time guidance workflow and may store and/or manage an open or ongoing sessions repository or database (e.g., ongoing sessions database 538 of FIG. 5).
   If distributed cache is chosen and not the interaction center for the open calls, the workflow may be moved to the database server directly.
1.5. Rule manager (e.g., rule manager 426 of FIG. 4) may, for example:
   Support versioning to reflect a PO designer version of projects in the database.
   Support a direct API with a PO client and a connection server.
   Support web recording rules management.
   Support web archiving rules.
   Support import of third-party CEM configuration.
1.6. Rule engine (e.g., rule engine 1906 of FIG. 19) may, for example:
   Support web interactions archiving rules.
1.7. Storage center (e.g., storage center 118 of FIG. 1 or 1904 of FIG. 19) may, for example:
   Support web archiving flow (using MHT files, image files, zipped text, and/or local files.)
1.8. Stream server (SS) (e.g., SS 1918 of FIG. 19) may, for example:
   Be used to execute an offline playback workflow (e.g., as described in reference to FIGS. 24-26), for example, when the stream server is deployed on the application server.
   Shadow browse.
   Content mask, e.g., hiding or blocking sensitive data such as credit card numbers in a client web player.
   Copy/create webpage files in the long terms storage by the SC executing the archiving workflow.
   Stream page files from the long terms storage in the playback/shadow browsing workflow.
1.9. Client web player (e.g., client web player 2008 of FIG. 20) may, for example:
   Provide a new user interface.
   Provide a new playback workflow, for example, based on the stream server and pages configured as images.
   Shadow browse.
   Content Mask.
   Provide CEM (e.g., for closed and/or open sessions).
1.10. Connection server (e.g., connection server 424 of FIG. 4) may, for example:
   Provide project versions to reflect a PO designer version of projects in the database.
   Provide a direct API for a publishing project.
   Provide a new flow for retrieving customers' closed and open sessions for real-time guidance workflow.
   Publish API from a PO Designer to a rule manager with validation.
   Not re-start the system after configuration changes.
   For monitoring, add performance counters and SNMP traps. SNMP traps alert the web analyzer when there are errors in the system. Performance counters are numeric counters that applications expose in order to reflect their status, such as, a counter measuring the current number of open sessions.
1.11. Business analyzer (e.g., business analyzer 436 of FIG. 4) may, for example:
   Not re-start the system after configuration changes
   For monitoring, add performance counters and SNMP traps (e.g., unless the web real-time guidance workflow does not work with the business analyzer).
1.12. PO Designer (e.g., PO designer 1706 of FIG. 17) may, for example:
   Provide project version.
   Provide a direct API for publishing project.
   Provide combo box extraction.
   Provide a Regex for each screen element.
   Provide multiple customer IDs SE.
   Import CEM configuration into a definitions project, for example, which may be consumed by a PO client (e.g., PO client 420 of FIG. 4).
   Content Mask definitions for "negative screen elements," which may be blocked from extraction.
1.13. PO Client (e.g., PO client 420 of FIG. 4) may, for example:
   Provide project versions.
   Provide events for open web sessions and propagate the events to a web player for shadow browsing.
1.14. Recording agnostics may import interactions recorded using a previous version of the system to a current version of the system, for example by providing:
   Support for export of voice interactions.
   Support for importing of CEM.
1.15. Server infrastructure may, for example:
   Provide a distributed cache wrapper the distributed cache is selected to manage and store the open calls repository and event distribution.
1.16. Monitor server (e.g., monitor server 2038 of FIG. 22) may, for example:
   Support web event types.
   Support scale out.
1.17. Interactions database (e.g., database 126 of FIG. 1) may, for example:
   Scheme changes to support versioning.
   Support migration.

1.18. Load balancer (possibly for FAS and real-time interaction connect) may, for example:
  Support round-robin implementation in which tasks may be assigned to FASs from a list, in order, until the end is reached, after which the order is returned to the beginning of the list.
  Support affinity. Load balancing may distribute playback requests among different FAS instances to achieve better scalability for playback. When the requests are distributed, an affinity may be established between each client request and a specific FAS instance, for example, to enable recurrent connections for tasks such as streaming.
1.19. High availability manager (HM) may, for example:
  Support failover of web analyzer, for example, by changing the network location of the servers in tbl-SystemResource.
1.20. Deployment manager (DM) may, for example:
  Support deploying the web analyzer under a dedicated cluster group (e.g., not the one of the interaction center cluster groups).
  Provide distributed cache deployment.
1.21. Sentinel or manager may, for example:
  Monitor web analyzer service.
  Define and monitor performance counters.
  Monitor capture database for back log.
1.22. Distributed cache may, for example:
  Provide a distributed cache wrapper.
  Provide a distributed cache configuration.

Other or additional devices and features may be used. Each of these devices may be hardware or software executed by devices and processors of FIG. 1.

System Design

Figure 27:
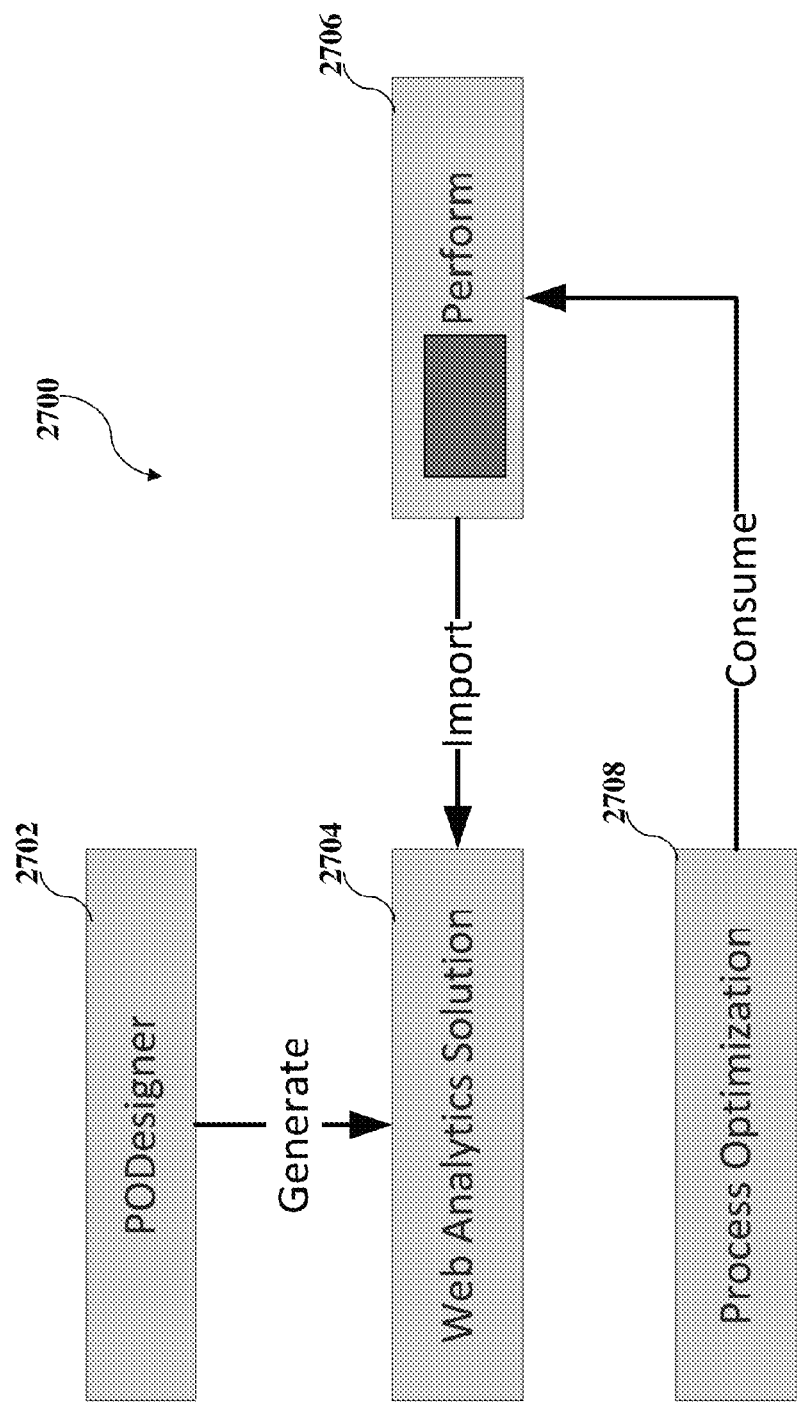
FIG. 27 schematically illustrates a system for defining the specific data items to monitor in a user's web interactions in accordance with embodiments of the invention.

Web monitoring systems may be designed to monitor and report specific data items of a user's web interactions, for example, as defined by a process optimization module, such as, process optimization module 2708 of FIG. 27.

Reference is made to FIG. 27, which schematically illustrates a system 2700 for defining the specific data items to monitor in a user's web interactions in accordance with embodiments of the invention.

System 2700 may include a PO designer 2702 (e.g., PO designer 1706 of FIG. 17) to generate a web analytics solution 2704 defining data items to monitor, a capture server 2706 (e.g., capture server 110 of FIG. 1) to import information to web analytics solution 2704 for each data item, and a process optimization product 2708 to design which data items to monitor and to manage feedback to the call center agent at real-time.

Process optimization module 2708 may design web analytics solution 2704 to monitor and report data items of a user's web interaction including, for example, session details (e.g., a start time and/or end time for closed sessions), user identity details, a list of webpages viewed during the session, metadata of the webpages viewed during the session, the websites providing the webpages, and/or any other interaction information.

Figure 28A:
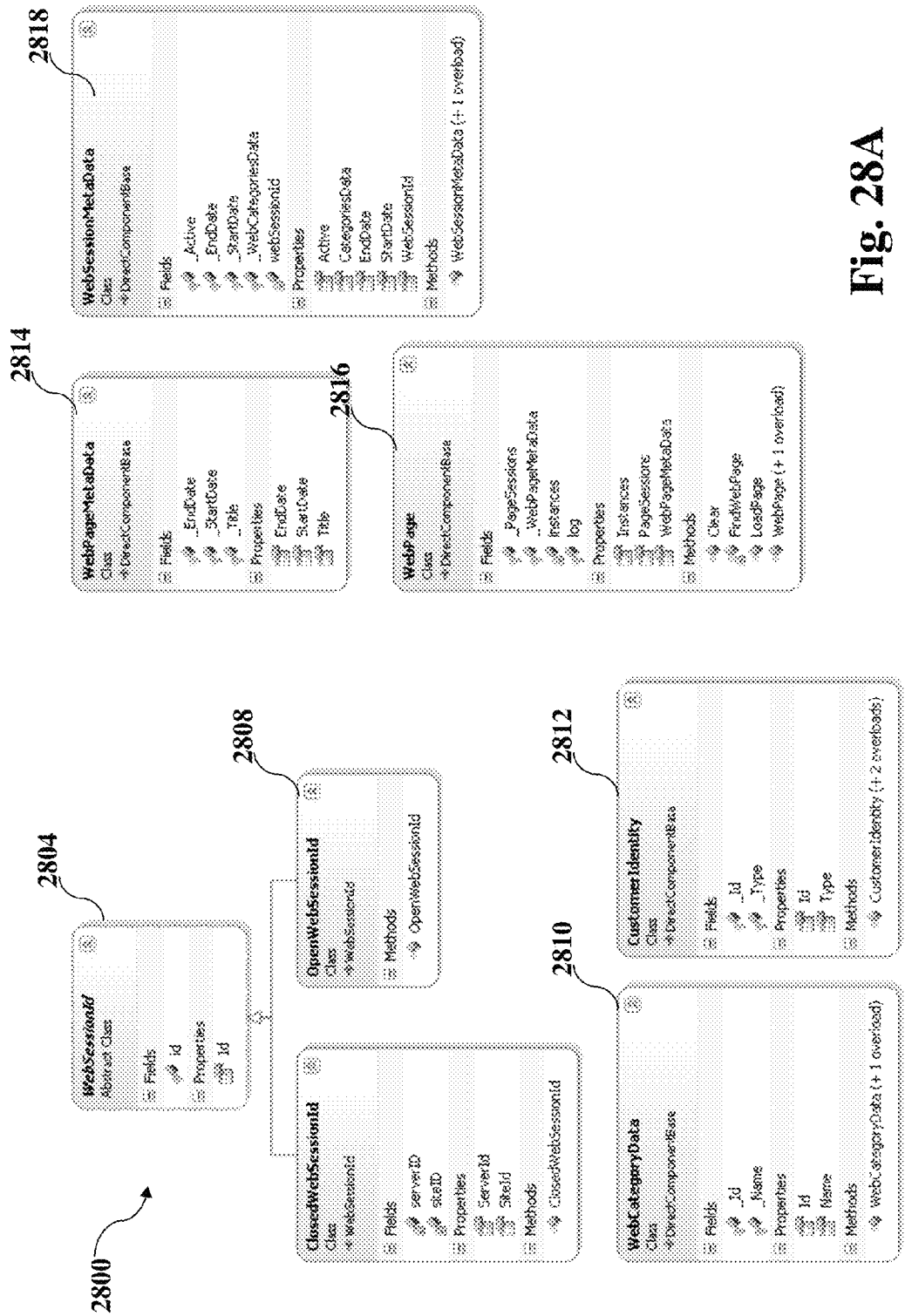
FIGS. 28A and 28B schematically illustrate file directories to access data items monitored in a user's web interaction in accordance with embodiments of the invention.
Figure 28B:

Reference is made to FIGS. 28A and 28B, which schematically illustrates file directories 2800 of code libraries 2802 to access data items monitored in a user's web interaction in accordance with embodiments of the invention. File directories 2800 or code libraries 2802 may be provided directly to an agent computer (e.g., agent device 120 of FIG. 1) for an agent to review raw interaction data or indirectly to the agent, for example, first sent to a web analyzer (e.g., analysis server 116 of FIG. 1) to process the data and then to the agent computer as a consolidated summary report.

File directories 2800 or code libraries 2802 may include, for example, one or more of the following data items (other or additional data items may also be used):

WebSessionID 2804 may include an abstract class that provides an interface that describes a way which uniquely identifies a web session. WebSessionID 2804 properties may include, for example:
  ID—an integer that uniquely identifies the web session.
OpenWebSessionID 2808 may represent a class derived from WebSessionID 2804 class. OpenWebSessionID 2808 may represent the ID of an open web session. In one example, an open web session may be identified by its interaction ID, as opposed to a closed session which may be identified by its session ID.
ClosedWebSessionID 2806 may represent a class derived from WebSessionID 2804 class. ClosedWebSessionID 2806 may represent the ID of a closed web session (e.g., the actually session ID). ClosedWebSessionID 2806 properties may include, for example:
  ServerID—an integer that uniquely identifies the server.
  SiteID—an integer that uniquely identifies the site.
WebCategoryData 2810 may represent a class that describes a category of data. WebCategoryData 2810 properties may include, for example:
  ID—an integer that uniquely identifies the category.
  Name—a name of the category.
CustmoerIdentity 2812 may represent a class that describes the identity of a customer entering the web site. CustmoerIdentity 2812 properties may include, for example:
  ID—an integer that uniquely identifies the customer. Commonly the value of the ID is taken from the an HTML screen element.
  Type—an integer representing the enum value (e.g., a code type which includes several values) of a customer identity type
WebPageMetaData 2814 may represent a class that is a container of the metadata of a web page and may, for example, include the following properties:
  EndDate—the date the page was left.
  StartDate—the date the page was entered.
  Title—the title of the page.
Webpage 2816 may define a class that represents a web page in the site that a customer enters. A user operating a PO Designer may divide this class into subclasses and create a custom web page. Webpage 2816 object may have multiple instances. These instances may be formed if there are repeated visits to the web page and may be stored internally in a list of webpage 2816 objects. Webpage 2816 properties may include, for example:
  Instances—a list of webpage 2816 instances.
  PageSessions—a collection of WebPageMetaData 2814 sessions.
  WebPageMetaData 2814—the web page metadata of the currently loaded webpage 2816.
Webpage 2816 functionality may include, for example:
Clear—Clears webpage 2816 data structures, such as, the webpage 2816 instances list and WebPageMetaData 2814 page sessions collection. Arguments (parameters that the functions or functionality may receive as input): None. Return value (parameters that the functions or functionality provide as output): None.

FindWebPage—Retrieves webpage 2816 by searching the instances list for a webpage that matches the specified WebPageMetaData 2814. Arguments: metadata, e.g., WebPageMetaData 2814 of the desired webpage 2816. Return value: webpage 2816 object, or null if no match is found.

LoadPage—Loads webpage 2816 object with the object stored in the internal webpage 2816 objects at the passed index argument. Arguments: pageIndx—an integer representing the index in the internal list of the webpage object to be loaded into webpage 2816. Return value: true if the appropriate webpage 2816 object from the internal list is successfully loaded, false otherwise.

WebSessionMetaData 2818 may represent a class that is a container of the metadata of a web session. WebSessionMetaData 2818 may, for example, include the following properties:

Active—specifies whether the session is active.

CategoriesData—a collection of WebCategoryData 2810 objects.

EndDate—The date the session ended.

StartDate—The date the session started.

WebSessionID—an object that provides the path to the web session ID.

Website 2820 may define a class that represents a website that the customer enters for performing some activities. A customer may enter the site several times. Each of these times may define a distinct session in the website and may be stored in an internal list of website 2820 objects. This class may be an abstract class and may be inherited by the user of the PO Designer to make a custom website that best suites the solution being developed. Website 2820 properties may include, for example:

Domain—The domain of the web site (e.g. www.amazon.com)

Manager—The direct framework manager.

MessageQueue—The direct MessageQueue.

MetaData—a WebSessionMetaData 2812 object that represents the current session metadata.

Sessions—A list of metadata about sessions accessing a specific website.

WebsiteKey—The direct fully qualified name (FQN) of the website 2820 object.

Website 2820 functionality may include, for example:

AsyncLoadCustomerSessionsDataCompleted—An asynchronous callback operation, for example, executed upon completion of a DoWorkOfLoadCustomerSessionsDataAsync operation. AsyncLoadCustomerSessionsDataCompleted may trigger the customer sessions data asynchronous results to be retrieved and the webpage to be loaded. Upon load completion, AsyncLoadCustomerSessionsDataCompleted may send a DataLoaded event. Arguments: asyncResult—defines the status of the asynchronous DoWorkOfLoadCustomerSessionsDataAsync operation. Return value: None.

AsyncLoadRecentCustomerSessionsDataCompleted— An asynchronous callback operation, for example, executed upon completion of the DoWorkOfLoadRecentCustomerSessionsDataAsync operation. AsyncLoadRecentCustomerSessionsDataCompleted may trigger the recent customer sessions data asynchronous results to be retrieved and the webpage to be loaded. Upon load completion, AsyncLoadRecentCustomerSessionsDataCompleted may send a DataLoaded event. Arguments: asyncResult—The status of the asynchronous DoWorkOfLoad RecentCustomerSessionsDataAsync operation. Return value: None.

Clear—Clears website 2820 data structures, e.g., including website 2820 instances list and WebSessionMetaData web sessions collection. Arguments: None. Return value: None.

CreateWebInteractionRequest—Creates an instance of a WebInteractionRequest to be sent to a connection server (e.g., connection server 424 of FIG. 4). Arguments: customerID a CustomerIdentity object that represents the identity of the customer, activeOnly—if the returned metadata is only about the current interaction, pastOnly—if the returned metadata is only about past interactions, count—the number of interactions for which metadata is to be retrieved, start—the starting date of the interactions for which metadata is to be retrieved, end—the end date of the interactions for which metadata is to be retrieved. Return value: WebInteractionRequest object.

DoWorkOfGetRecentSessionsMetaDataAsync—Gets interaction metadata from the connection server, regarding a certain interaction. Arguments: req—WebInteractionRequest object. Return value: Array of WebInteractionMetaData objects.

DoWorkOfLoadCustomerSessionsDataAsync—Gets the interaction data from the connection server, regarding certain customer sessions. Arguments: sessionsMetaData—a collection of WebSessionMetaData objects. Return value: Array of WebInteractionData objects.

DoWorkOfLoadRecentCustomerSessionsDataAsync— Gets the interaction data from the server, regarding certain recent customer sessions. Arguments: req—WebInteractionRequest object. Return value: Array of WebInteractionData objects.

FindWebsite—Retrieves a website by searching the instances list for a website that matches the specified WebSessionMetaData. Arguments: metadata—the WebSessionMetaData of the desired website. Return value: Website object, or null if no match is found.

FireDataLoadedEvent—Sends the website DataLoaded event to execute the load event. Arguments: None. Return value: None.

FireDataLoadedEvent—Sends the website DataLoaded event. Arguments: status—a Boolean value indicating whether or not the PO Designer successfully loaded the data. Return value: None.

GetRecentSessionsMetaData—Retrieves metadata about recent sessions. Arguments: customerID—a CustomerIdentity object that represents the identity of the customer, activeOnly—if the returned metadata is only about the current sessions, pastOnly—if the returned metadata is only about past sessions, count—the number of sessions for which metadata is to be retrieved, start— the starting date of the sessions for which metadata is to be retrieved, end—the end date of the sessions for which metadata is to be retrieved. Return value: true if the recent sessions metadata retrieval is successful, false otherwise.

GetRecentSessionsMetaDataAsync—Retrieves metadata about recent sessions asynchronously. Arguments: customerID—a CustomerIdentity object that represents the identity of the customer, activeOnly—if the returned metadata is only about the current sessions, pastOnly— is the returned metadata is only about past sessions, count—the number of sessions for which metadata is to be retrieved, start—the starting date of the sessions for which metadata is to be retrieved, end—the end date of the sessions for which metadata is to be retrieved. Return value: None.

GetRecentSessionsMetaDataAsyncCompleted—an asynchronous callback operation, for example, executed upon completion of a DoWorkOfGetRecentSessionsMetaDataAsyncmethod operation. GetRecentSessionsMetaDataAsyncCompleted may trigger the recent sessions metadata asynchronous results to be retrieved and the webpage to be loaded. Upon load completion, GetRecentSessionsMetaDataAsyncCompleted may send the MetaDataLoaded event. Arguments: asyncResult—The status of the asynchronous DoWorkOfGetRecentSessionsMetaDataAsync operation. Return value: None.

GetWebInteractionSessionArr—Gets interaction sessions of specified sessions metadata. Arguments: sessionsMetaData—a collection of WebSessionMetaData objects. Return value: Array of WebInteractionSession objects.

HandleNewPageType—Handle a new webpage type once discovered. Upon loading the website 2820 object with data, returned sorted from the connection server, the current page type may be compared to the type of the previous page. If the current page type is different from the previous page type, the new page type may be processed. Arguments: PageData object (pageData), Website object (ws), a list of WebPage objects (webPages), a list of WebPageMetaData objects (pagesMetaData), page IProperty holder (pageHolder). Return value: true if the new page type is handled successfully, false otherwise.

InitWebPlayer—Initializes the web player. Arguments: None. Return value: true if the web player is initialized successfully, false otherwise.

InnerLoadData—Loads the session data retrieved from the connection server into the website 2820 object. InnerLoadData may set the last session to be the current website session. Arguments: sessionsData—an array of WebInteractionData objects. Return value: true if the session data is loaded successfully, false otherwise.

InnerLoadData—Loads the session data retrieved from the connection server into the website 2820 object. InnerLoadData may set the last session to be the current website session. Arguments: wrapper—WebInteractionDataWrapper object that holds an array of WebInteractionData objects. Return value: true if the session data is loaded successfully, false otherwise.

InnerLoadMetaData—Loads the session metadata retrieved from the connection server into the website 2820 object. It sets the last session metadata to be the current website session metadata. Arguments: wrapper—WebInteractionDataWrapper object that holds an array of WebInteractionMetaData objects. Return value: None.

IsSafeToContinue—Validates whether it is possible to interact with the connection server, and whether a web recording feature is enabled. Arguments: methodName—The name of the method or operation scheduled to interact with the server. Return value: true if it is safe to continue executing the calling operation, false otherwise.

LoadCustomerSessionsDataFromMetaData—Loads data about sessions, e.g., defined by session metadata, into the website 2820 object. The data may be loaded into an internal collection. The last session metadata may be stored in the property CurrentSessionMetaData and its data may be loaded into the website 2820 object. Arguments: sessionsMetaData—a collection of WebSessionMetaData objects containing metadata about the session to be loaded into the website 2820 object. Return value: true on success, false otherwise.

LoadCompositeProperties—Loads all direct composite components properties into a direct component recursively. Arguments: page—IdirectComponentBase object to load the properties for, compositeData—an array of CompositeData objects, to load into the direct component, indx—an integer which indicates the position of the child composite data to process. Return value: None.

LoadCustomerSessionsDataFromMetaDataAsync—Asynchronously loads the data about sessions given by their metadata into the website 2820 object. The data may be loaded into an internal collection (e.g., not DirectDom). The last session metadata may be stored in the property CurrentSessionMetaData and its data may be loaded into the object. Arguments: sessionsMetaData—a collection of WebSessionMetaData objects containing metadata about the session to be loaded into the website 2820 objects. Return value: None.

LoadPageProperties—Loads all properties of the website 2820 object. Arguments: wp—WebPage object, pageData—PageData object, webPages—a list of webpage objects, pagesMetaData—a list of WebPageMetaData objects. Return value: None.

LoadPrimitiveProperties—Loads all direct primitive components properties into a direct component. Arguments: page—IdirectComponentBase object for which to load the properties, primitivePropsData—an array of PrimitiveData objects to load into the direct component. Return value: None.

LoadRecentCustomerSessionsData—loads data about sessions into the website 2820 object. The data may be loaded according to the arguments passed to the function's parameters. The CurrentSessionMetaData property may be updated with the last session metadata and its data may be loaded into the object. Arguments: customerID—a string that represents the ID of the customer, activeOnly—if the returned metadata is only about the current session, pastOnly—if the returned metadata is only about past sessions, count—the number of sessions for which metadata is to be retrieved, start—the starting date of the sessions for which metadata is to be retrieved, end—the end data of the sessions for which metadata is to be retrieved. Return value: true on success, false otherwise.

LoadRecentCustomerSessionsDataAsync—Asynchronously loads the data about sessions into the website 2820 object. The data may be loaded according to the arguments passed to the function's parameters. The CurrentSessionMetaData property may be updated with the last session metadata and its data may be loaded into the object. After the data is successfully loaded the event, DataLoaded may be sent. Arguments: customerID—a string that represents the ID of the customer, activeOnly—if the returned metadata is only about the current session, pastOnly—if the returned metadata is only about past sessions, count—the number of sessions for which metadata is to be retrieved, start—the starting date of the sessions for which metadata is to be retrieved, end—the end data of the sessions for which metadata is to be retrieved. Return value: None.

LoadSession—Loads a session data into the website 2820 object according to the metadata passed as an argument to the function. The CurrentSessionMetaData property may be updated accordingly. Arguments: sessionMetaData—an object containing the metadata about the session to be loaded. Return value: true on success, false otherwise.

LoadWebPageMetaData—Loads WebPageMetaData to the website 2820 object. Arguments: pageProp—an IProperty page holder object, pageData—a PageData object. Return value: None.

LoadWebPageMetaData—Loads WebPageMetaData to the website 2820 object. Arguments: wp—a WebPage object, pageData—a PageData object. Return value: None.

LoadWebsiteWithData—Loads web session data into the website 2820 object. Arguments: ws—a Website object, webSessionData—a WebInteractionData object. Return value: true if the data is loaded to the website 2820 object successfully, false otherwise.

PlayCurrentSession—Plays the currently loaded web session in the web player. This function may use an API provided by systems and recording components to launch the web player. The function may also ensures that only one instance of the player is running Arguments: None. Return value: true if the WebPlayer is successfully launched, false otherwise.

PlaySession—Plays a recorded web session according to the metadata passed as an argument to this function. Arguments: sessionMetaData—a WebSessionMetaData object containing metadata about the recorded session to be played. Return value: true if the WebPlayer is successfully launched, false otherwise.

SetPageInstancesAndMetaData—Sets the web pages instances and sessions metadata. Arguments: webPages—a List of WebPage objects, pagesMetaData—a collection of WebPageMetaData objects. Return value: None.

StartPlayer—Starts the web player, which may play the web session of the specified recorded session ID. Arguments: ID—a LongIDWithSiteAndServer object. Return value: None.

StartPlayer—Asynchronously starts the web player, which may play the web session of the specified session metadata. Arguments: sessionMetaData—an object containing the metadata about the recorded session to be played. Return value: None.

TestWebPlayer—Plays a hardcoded web session for debug purposes. Arguments: None. Return value: None.

Website 2820 events may include, for example:

DataLoaded—an event that is executed when the data is successfully loaded into the website 2820 object. Event parameters may include the status of the data load status (e.g., succeeded or failed).

MetaDataLoaded—an event that is executed when the metadata is successfully loaded into the website 2820 object. Event parameters may include the status of the metadata load status (e.g., succeeded or failed).

Design Interfaces

Reference is made to FIGS. 29A-29X, which schematically illustrate interfaces 2900-2962 for configuring web analytics solutions in accordance with an embodiment of the invention. Interfaces 2900-2962 may be provided, for example, via a PO designer (e.g., PO designer 1706 of FIG. 17), which may be operated at agent device 120 or interaction center 124 of FIG. 1. Operations for configuring web analytics solutions may include, for example (other or additional operations may also be used):

Capturing data extraction elements.
Defining a site structure, for example, using Business Entity parameters.
Creating a site, for example, using Business Entity instances.
Publishing a project.

In FIG. 29A, interface 2900 may allow an agent or other user to create or select a web analytics solution 2970 (e.g., at the PO designer). The creation of web analytics solution 2970 may be divided into different tasks or projects (e.g., executed at the PO designer), for example, such as:

Configuration project (generating metadata for the web analyzer).
Data consumption project (generating real-time guidance rules).
These projects may have a shared task, for example, the definition of the website data model (e.g., pages, data extraction elements). This data model may serve both the configuration solution and the consumption solution. A 'Shared Business Entity (BE) Types' project may be created to contain this data model of the website. The web analytics solution may be divided into 3 separate projects:
'Shared Business Entity (BE) Types' project—definition of the website data model.
'Definition' Project—definition of screen elements and website instances captured (e.g., may have a project reference to the 'Shared BE Types').
'Consumption' Project—definition of website instances and the real-time guidance rules (e.g., may have a project reference to the 'Shared BE Types').

Web analytics solution 2970 may be created by selecting different solution properties, for example, including a solution version 2972, a target orientation 2974 (e.g., classic or web), a target environment 2976, a target automatic update folder 2978 and/or if multiple solutions share a single instance of a project 2980. The target orientation 2974 may, for example:

Control the solution generation and distribution methods.
Define the functionality that is exposed to the operator of the PO designer.
Be operational or in-use when working on the 'Definition' project.
New solution orientation(s) may be added by the web analytics package. The solution orientation may be the target output of the solution, for example, one or more of the following:
PO Client
Thin Client
Web Analytics Each solution orientation may have a different output during the generation process (.NET Assembly, javascript files or xml for web analytics).

In the example shown in FIG. 29A, the target orientation 2974 may be "classic" for web analytics data consumption project or "web" for web configuration project, although other or target orientations may be used.

Capturing data extraction elements operations may be defined, for example, in the 'Definition' project. To initiate the capture operation, the PO Designer (e.g., operated by an operator selecting a capture button) may command a web analyzer (e.g., analysis server 116 of FIG. 1) to capture elements designated for extraction. The capture operation may distinguish between two types of extractions (e.g., which may be selected by the PO designer operator):

- "Single instance" element extraction commands the web analyzer to extract a single appearance of an element in a webpage. For example: 'Full Name' in a user's address.
- "Multiple instances" element extraction commands the web analyzer to extract multiple appearances of an element in a webpage. For example: 'Product Name' in a user's shopping cart.

When the PO designer operator designates a "multiple instances" element extraction for the web analyzer to extract all instances of the element (e.g., all products in an online shopping cart) the operator may modify 'Recognition Properties' of the element accordingly.

FIG. 29B illustrates an interface 2902, which the operator of the PO designer may use to command the web analyzer to initiate capturing web elements, for example, by selecting a capture button 2982.

FIG. 29B illustrates interfaces 2904 and 2906, which the operator of the PO designer may use to mark a 'Show Hidden Captures' and 'Visible' menu options, for example, to view the captured screen elements. When an agent captures a screen element using a PO designer, in some embodiment, only the captured screen element node is shown without the parents tree (e.g., the page node). The Show Hidden Captures menu option allows the entire tree to be shown. The visible menu option allows only nodes in the elements tree that are marked visible to be shown, e.g., for selection in the business objects tree.

FIG. 29C illustrates interface 2908, which shows a screen elements tree including all elements in the path of the screen element's to be extracted. The web analyzer may retrieve web (e.g., IE) nodes from the screen elements tree. The web nodes include web documents and web elements. In some cases, there may be more than one document in the element's path.

FIG. 29D illustrates interface 2912, which the operator of the PO designer may use to verify that 'recognition properties' of the web document are properly configured, for example, to identify all instances of the document. The PO designer may verify this, for example, using wild card values (* or %) for the recognition properties. Recognition properties used to identify a document may include, for example:

- URL—the URL of the document.
- Title—the title of the document. The title may identify the contents of the document and may be display in the header bar of the document window.
- IDs of Contained Elements—the ID of the elements contained in the document (if available).

By default the PO Designer may mark the minimum set of properties used for unique recognition (e.g., the URL property may be sufficient). The URL may include customer specific data, which the PO Designer may eliminate using the wild card recognition properties. In the example shown in FIG. 29D, the is modified to use the * wildcard: http://www.amazon.com/gp/cart/view.html/*

FIG. 29E illustrates interface 2914, which the operator of the PO designer may use to verify that 'recognition properties' of the web element are properly configured, for example, to identify all instances of the element. Recognition properties used to identify an element may include, for example:

- ID—the ID of the element.
- Name—the name of the element.
- Tag Name—the tag name of the element.
- XPATH—the HTML path to the element.
- Source Index—the ordinal position of the object, in source order, as the object appears in the document's collection.
- Inner Text—the text between the start and end tags of the object.
- Visibility—an indication whether the content of the object is displayed.

By default the PO Designer may mark the minimum set of properties used for unique recognition. However, the values captured by the PO designer may be insufficient in some cases and the PO designer may verify that the recognition satisfies all cases. The priority of the 'recognition properties' may be for example:

ID
Name
XPATH

FIG. 29F illustrates interface 2916, which the operator of the PO designer may use to define the structure of the site, for example, using Business Entity types. Interface 2916 may define the website structure, for example, by defining one or more of the following properties (other or additional properties may also be defined):

- Add new library types, for example, including web site and web page types.
- Create a new web site type.
- Create a new web page type for each captured web page. (This information may be defined, for example, in the 'Shared BE Types' project using Business Entity types.) In the example in FIG. 29F, the PO designer may have two predefined Business Entity types installed, for example: Web Page 2984 and Web Site 2986.

Each page (e.g., IE Document) that is captured may be represented by a Business Entity type. To create a new page type for each captured page, the operator of the PO designer may execute the following steps using interfaces 2918-2922 of FIGS. 29F-29H.

To initiate the process, the operator may create a new type using a 'New Type' button and may set the name of the new type.

In interface 2918 of FIG. 29F, the operator of the PO designer may change the base type to a page library type (e.g., using a library objects folder).

In interface 2920 of FIG. 29G, the operator of the PO designer may create one or more new properties or change the properties to primitive types, such as, text, number, date, etc. (e.g., using a library objects folder). The PO designer may repeat this step to define all the primitive properties of the captured page. If the page contains complex data structures (e.g., product data structure in a shopping cart webpage), the PO designer may repeat configurations in interfaces 2920-2922.

In interface 2922 of FIG. 29H, if the property is a list, the operator of the PO designer may choose a property type contained in the list. For example, a shopping cart webpage type may be assigned a 'List of Products' property type.

FIG. 29I illustrates an example interface 2924 showing a file directory structure for recording data using a 'Product' Business Entity type and two Page Business Entity types (Address Page and Shipping Cart Page) for each captured page, which may be defined, for example, follows:

Product: contains the following properties:
Name (Text)
Quantity (Number)
Price (Text)
Gift (Boolean)
Address Page: contains the following properties:
Address 1 (Text)
Address 2 (Text)
Full Name (Text)
City (Text)

State (Text)
ZIP (Number)
Shipping Cart Page: contains the following properties:
Customer Name (Text)
SubTotal (Text)

To create a new website type, the operator of the PO designer may execute the following steps using interfaces 2926-2928 of FIGS. 29J-29K.

To initiate the process, the operator may create a new type using a 'New Type' button and may set the name of the new type.

In interface 2926 of FIG. 29J, the operator of the PO designer may change the base type to a site library type (e.g., using a library objects folder).

In interface 2928 of FIG. 29K, the operator of the PO designer may add a property types for each page defined (e.g., by dragging and dropping the property types into the new site type).

To create a site Business Entity instance and to link its properties to the screen elements, the operator of the PO designer may execute the following steps using interfaces 2930-2946 of FIGS. 29L-29S. (This information may be defined, for example, in the 'Definition' project.)

To initiate the process, the operator may create a new instance using a 'New Instance' button and may set the name of the new instance. Alternatively, the new instance may be created by selecting the Site Business Entity type and the 'Create an instance of . . . '.

In interface 2930 of FIG. 29L, the operator of the PO designer may change the type to a site business entity type.

In interface 2932 of FIG. 29M, the operator of the PO designer may select properties to be ignored (e.g., which are only relevant in the consumption project), such as, start date and end date in the site and page Business Entity types.

In interfaces 2934 and 2936 of FIGS. 29N and 29O, the operator of the PO designer may select the screen element data source representing each primitive property of the pages. The operator may select an 'Automatically assign from' data field in interface 2934 and select a screen element property to be extracted by the web in interface 2936.

In interfaces 2938-2942 of FIGS. 29P-29R, the operator of the PO designer may map the corresponding screen element data source to the relevant property within the list's contained object for each list property of the pages. The operator may select an 'Initial Value' data field in interface 2938, select a "Map List" function of the library object type in interface 2940, and map each property of the Business Entity type to the relevant screen element (e.g., by opening a new dialog box) in interface 2942.

FIG. 29S illustrates an example interface 2944 showing a file directory structure where the site instance includes, for example, a 'Customer Identity' complex property with attributes: ID and Type. If the web analyzer cannot obtain the customer ID from a cookie, the operator of the PO designer may repeat operations using interface 2932 to link the Customer Identity ID property and the corresponding screen capture. If the ID is mapped, then The Customer Identity Type property may also be initialized using the 'Initial Value' data field.

FIG. 29S illustrates an example interface 2946 showing a file directory structure where the site instance includes, for example, a 'Domain' property that may be initialized, for example, an the 'Initial Value' data field. A sample value may be, for example: www.google.com.

FIG. 29T illustrates an example interface 2948 for publishing the project to the web analyzer, where the web analyzer receives the web configuration created by the PO Designer.

Once the web configuration is created, a user may select to generate the project in solution properties 2990 (e.g., using a 'Publish' button), which may initiate the project validations and creation. The publish operation may create an XML file, which may be uploaded to the database using a rule manger (e.g., rule manager 426 of FIG. 4). The web analyzer may read the web configuration from the database.

FIG. 29U illustrates an example of an interface 2952 of a website and screen elements 2988 monitored and/or extracted. Interface 2952 and screen elements 2988 may be defined by the web analytics configurations defined in interfaces 2900-2950 of FIGS. 29A-29S.

The PO designer definitions for real-time guidance may include, for example, one or more of the following rules (other or additional rules may also be executed):
  Create a new project and add project reference to the 'Shared BE Types' project.
  Create a website Business Entity instance.
  Create logic to handle one or more of the following:
    Web sessions data consumption (e.g., metadata and/or web site data).
    Rules for web session data identification, filtering or extraction.
    Launching the web player.
(This information may be defined, for example, in the 'Consumption' project.)

In interface 2954 of FIG. 29V, the operator of the PO designer may set parameters defining which user web sessions are to be monitored by the web analysis system. Interface 2954 may include fields defining a user's information (e.g., the value of their customer ID) and/or session information (e.g., all sessions, sessions at specific dates or ranges of dates, and/or including any ongoing sessions) to monitor only specified user sessions. Interface 2954 may include a dedicated function editor added by a web analytics package. In different embodiments, web interactions in the specified user sessions may be extracted in their entirety or with metadata only.

FIG. 29W illustrates examples of rule interfaces 2956 and 2958 for evaluating extracted web session information. Rule interface 2956 may define an instruction for web analyzer to evaluate screen elements, for example, associated with products in a shopping cart. Rule interface 2958 may define an instruction for web analyzer to evaluate a session categorization of extracted screen elements. Other or additional rules may be used.

FIG. 29X illustrates an example of interfaces 2960 and 2962 to launch a web player (e.g., web player 1710 of FIG. 17). Interface 2960 may launch the web player with current user sessions for shadow-browsing and interface 2962 may launch the web player with sessions metadata.

It may be appreciated that "real-time" may refer to instantly or, more often, at a small time delay of, for example, between 0.01 and 10 seconds, during, concurrently, or substantially at the same time as. In one example, playing the user's current Internet interactions in a real-time simulation may include playing the user's interaction (or an edited version thereof) on the agent's display (e.g., output device 125 of FIG. 1), for example, at the same time as, at a time delay from, or during the same communication (e.g., telephone and/or web) session as, the user executes the interaction. In another example, sending the agent device recommendations in real-time may include, sending the agent device recommendations, e.g., via agent monitor, while an agent is communicating or conversing with the user e.g., via telephone (or other media communications, such as on-line text chat). The recommendations may be provided in text or as automatically generated speech.

It may be appreciated that although certain devices and functionality are assigned to "users," "customers," "agents," and "operators" these are only example scenarios and such functionality may be implemented by any users. The users may include two or more live users, two or more automated user(s) or a combination of live user(s) and automated user(s).

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for monitoring a user's interactions with Internet-based programs or documents, the method comprising:
   extracting content from Internet server traffic according to predefined rules;
   associating the extracted content with one or more of a user's Internet interaction sessions;
   storing and indexing the user's Internet interaction sessions;
   automatically comparing, by a web analyzer using a processor, one or more of the user's Internet interaction sessions to one or more modeled sessions to generate a recommendation of one or more future session paths from the modeled sessions for guiding the user's Internet interactions; and
   providing the recommendation of the future session paths from the modeled sessions on screen to a contact center agent while the contact center agent is communicating with said user during a telephone call initiated by the user between the agent and the user.

2. The method of claim 1 comprising identifying the user by text captured on a screen element of a webpage used in the one or more of the user's Internet interaction sessions.

3. The method of claim 1, wherein the predefined rules define content to be extracted according to parameters selected from the group consisting of: a title of webpage(s), date/time webpage(s) created, product(s) viewed, prices offered, product categories (used vs. new, wholesale vs. retail, etc.), customer search words, customer highlighting or selection of products, a type of web object, the presence or frequency of certain key-words, how long ago a webpage was viewed, the amount of time a webpage is viewed, a number of times or which different items are selected on a webpage, and the order in which the webpage was viewed.

4. The method of claim 1 comprising generating a summary of the user's past or current Internet interaction sessions and providing said summary to the contact center agent while the contact center agent is communicating with said user for guiding the user's Internet interaction.

5. The method of claim 4, wherein the summary comprises data selected from the group consisting of: a description of the user's interaction sessions, product viewed, and prices offered.

6. The method of claim 1 comprising, using a web player, providing the agent with a playback of the user's past or current Internet interaction sessions during the telephone call between the agent and the user.

7. The method of claim 1 comprising capturing the Internet server traffic using a passive sniffing device.

8. The method of claim 1, wherein the Internet server traffic is captured over one media channel and the agent and user communicate over another media channel.

9. The method of claim 1, wherein the information analyzed in the user's Internet interaction sessions includes keywords the user used for searching.

10. The method of claim 1, wherein the recommendation includes information for technical support, selling, "up-selling," "cross-selling," or filling in surveys.

11. The method of claim 1, wherein the recommendation is provided to the contact center agent in real-time.

12. A system for monitoring a user's interactions with Internet-based programs or documents, the system comprising:
    a processor to extract content from Internet server traffic according to predefined rules, associate the extracted content with one or more of a user's Internet interaction sessions, index the user's Internet interaction sessions, automatically compare one or more of the user's Internet interaction sessions to one or more modeled sessions by executing a web analyzer to generate a recommendation of one or more future session paths from the modeled sessions for guiding the user's Internet interactions and to provide the recommendation of the future session paths from the modeled sessions on screen to a contact center agent while the contact center agent is communicating with said user during a telephone call initiated by the user between the agent and the user; and
    a storage device to store the one or more of the user's Internet interaction sessions.

13. The system of claim 12 comprising a passive sniffing device to capture the Internet server traffic.

14. The system of claim 12 comprising a first media channel over which the Internet server traffic is captured and a second different media channel over which the agent and user communicate.

15. The system of claim 12 comprising a computer and telephone operated by the user, wherein an Internet connection at the user's computer is monitored for Internet server traffic and the telephone call between the contact center agent and the user telephone triggers the processor to send the contact center agent the recommendation.

16. The system of claim 12 comprising a text capturing module, wherein the text capturing module identifies the user by capturing text on a screen element of a webpage used in the one or more of the user's Internet interaction sessions.

17. The system of claim 12, wherein the processor generates a summary of the user's past or current Internet interaction sessions provided to the contact center agent while the contact center agent is communicating with said user for guiding the user's Internet interaction.

18. The system of claim 12 comprising a workstation operated by the contact center agent, the workstation having a display and a web player, wherein the display uses the web player displays a playback of the user's past or current Internet interaction sessions during the telephone call between the agent and the user.

19. The system of claim 12 comprising a semi-automated and semi-live contact center agent.

20. The method of claim 1, wherein the one or more modeled sessions are real-life sessions generated by interactions of one or more other users.

21. The method of claim 1, wherein the one or more modeled sessions are generated in a computer-training environment by a trainer.

22. The method of claim 1, wherein the one or more modeled sessions are retrieved from a pool of sessions that most closely matches features used in the user's current Internet interaction session.

23. The method of claim 1, wherein the one or more modeled sessions include a fixed linear path of webpages to browse.

24. The method of claim 1, wherein the one or more modeled sessions include a dynamic tree-structure of paths, where each chosen webpage path leads to a different predicted modeled future session path.

25. The method of claim 1, wherein the information analyzed in the user's Internet interaction sessions includes product details viewed.

26. The method of claim 1 comprising automatically and passively determining the user identity of the extracted content, by the web analyzer using the processor, by passively sniffing the Internet server traffic.

27. The method of claim 1 comprising displaying to the agent, during the telephone call between the agent and the user, a key-value summary of the extracted content associated with one or more of the user's Internet interaction sessions.

28. The method of claim 1 comprising receiving the predefined rules from a user which determines the web elements to be extracted on a web page.

29. A method for monitoring a user's interactions with Internet-based programs or documents, the method comprising:
    extracting a webpage screen element, by a web analyzer using a processor, from Internet server traffic according to predefined rules;
    associating the extracted webpage screen element with one of a plurality of a user's Internet interaction sessions;
    storing and indexing the plurality of the user's Internet interaction sessions;
    automatically analyzing, by the web analyzer using the processor, the plurality of the user's Internet interaction sessions to generate a recommendation for guiding the user's Internet interactions; and
    providing the recommendation, which is generated based on said automatically analyzing the user's plurality of Internet interaction sessions, on screen to a contact center agent while the contact center agent is communicating with said user during a telephone call initiated by the user between the agent and the user.

\* \* \* \* \*